INVENTOR.
Robert N. Knosp.
BY
Wood, Herron & Evans.
ATTORNEYS.

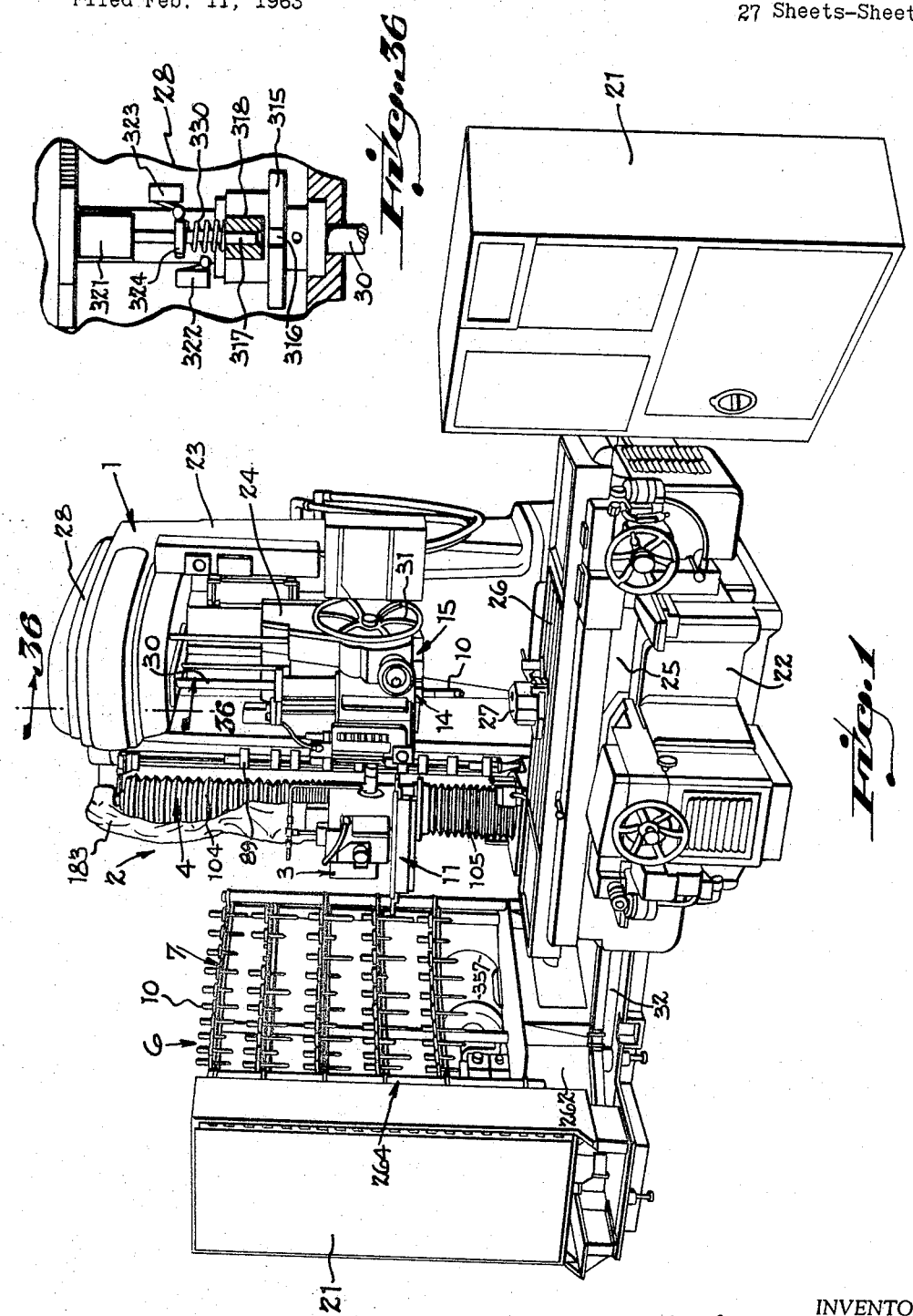

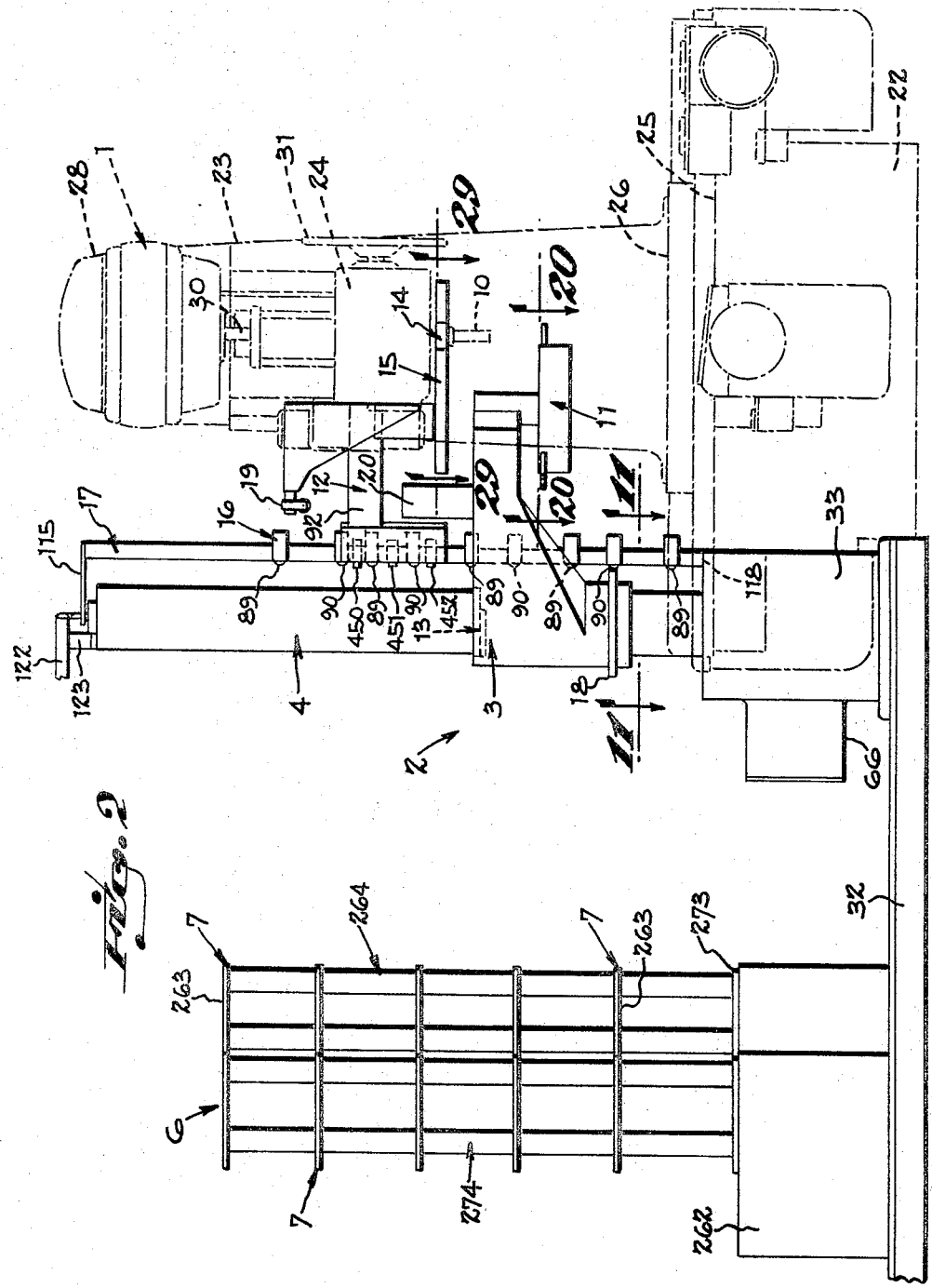

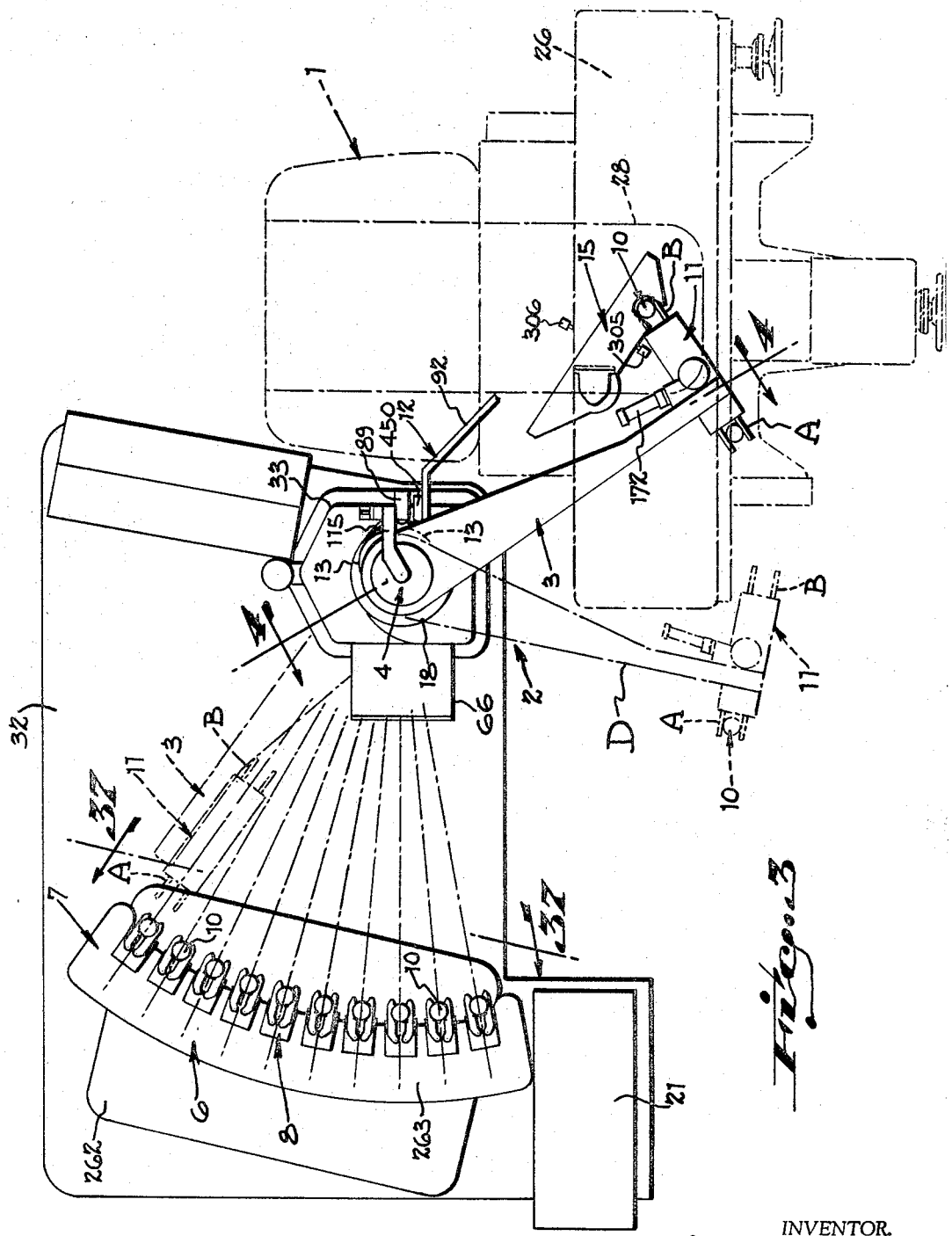

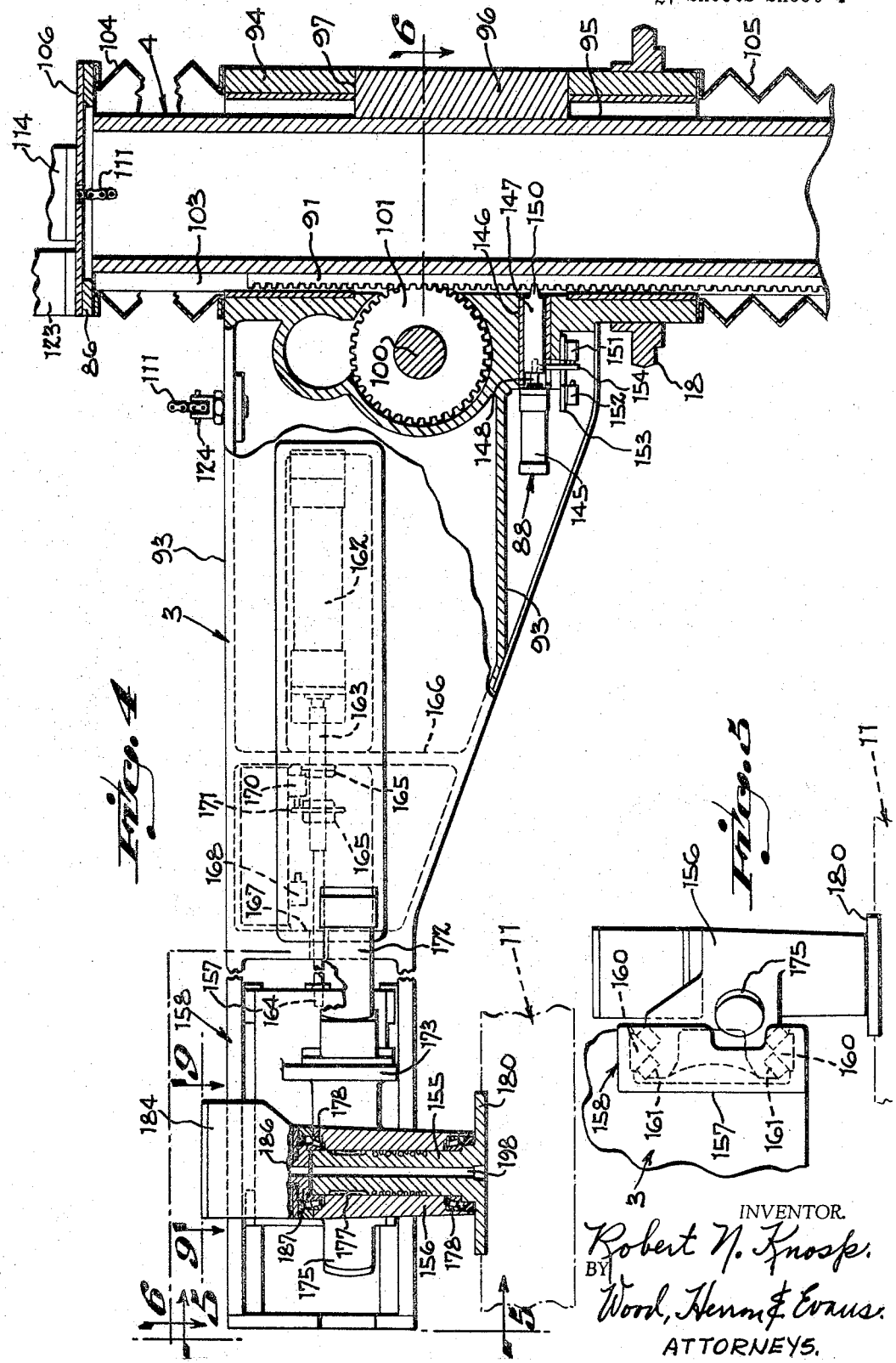

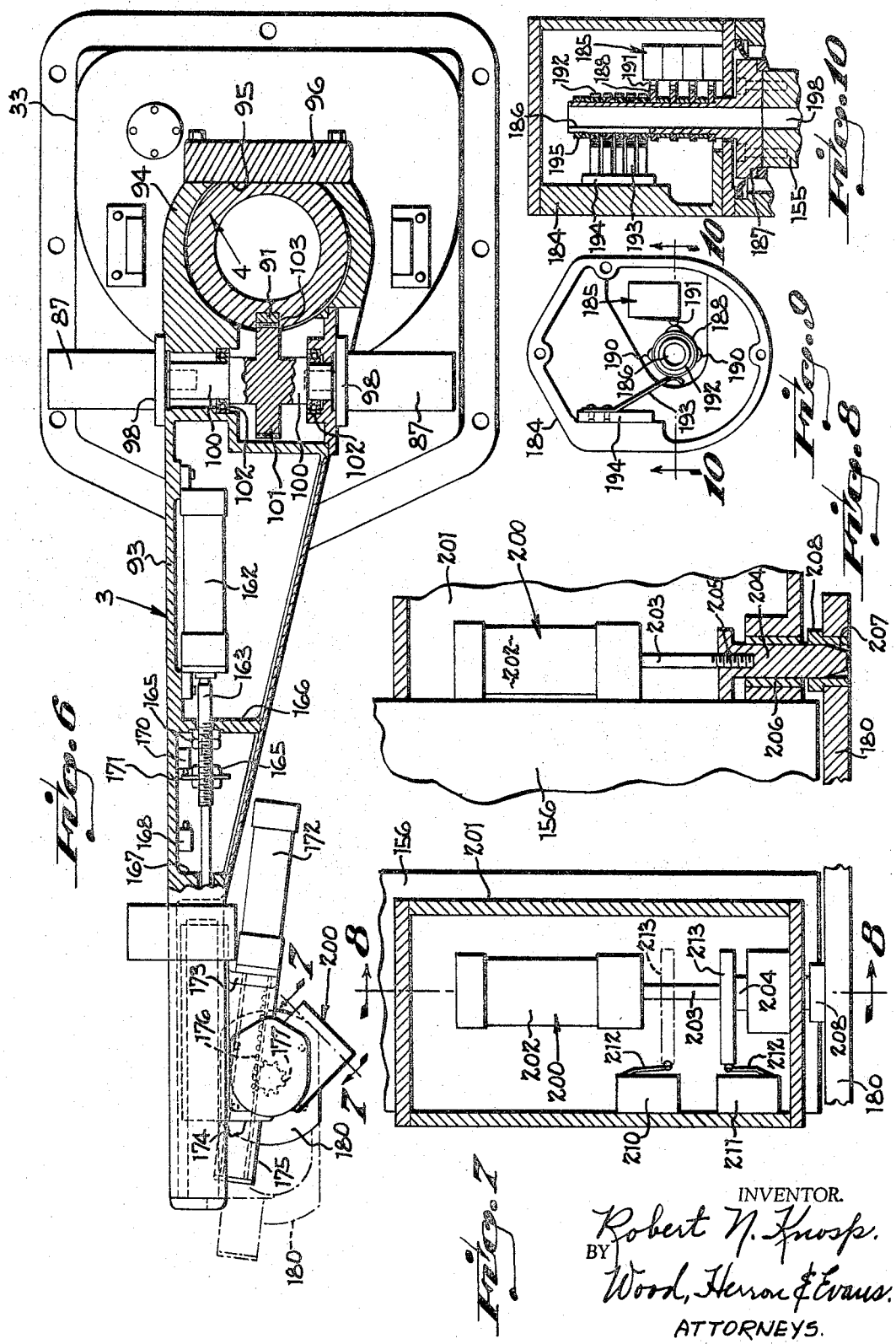

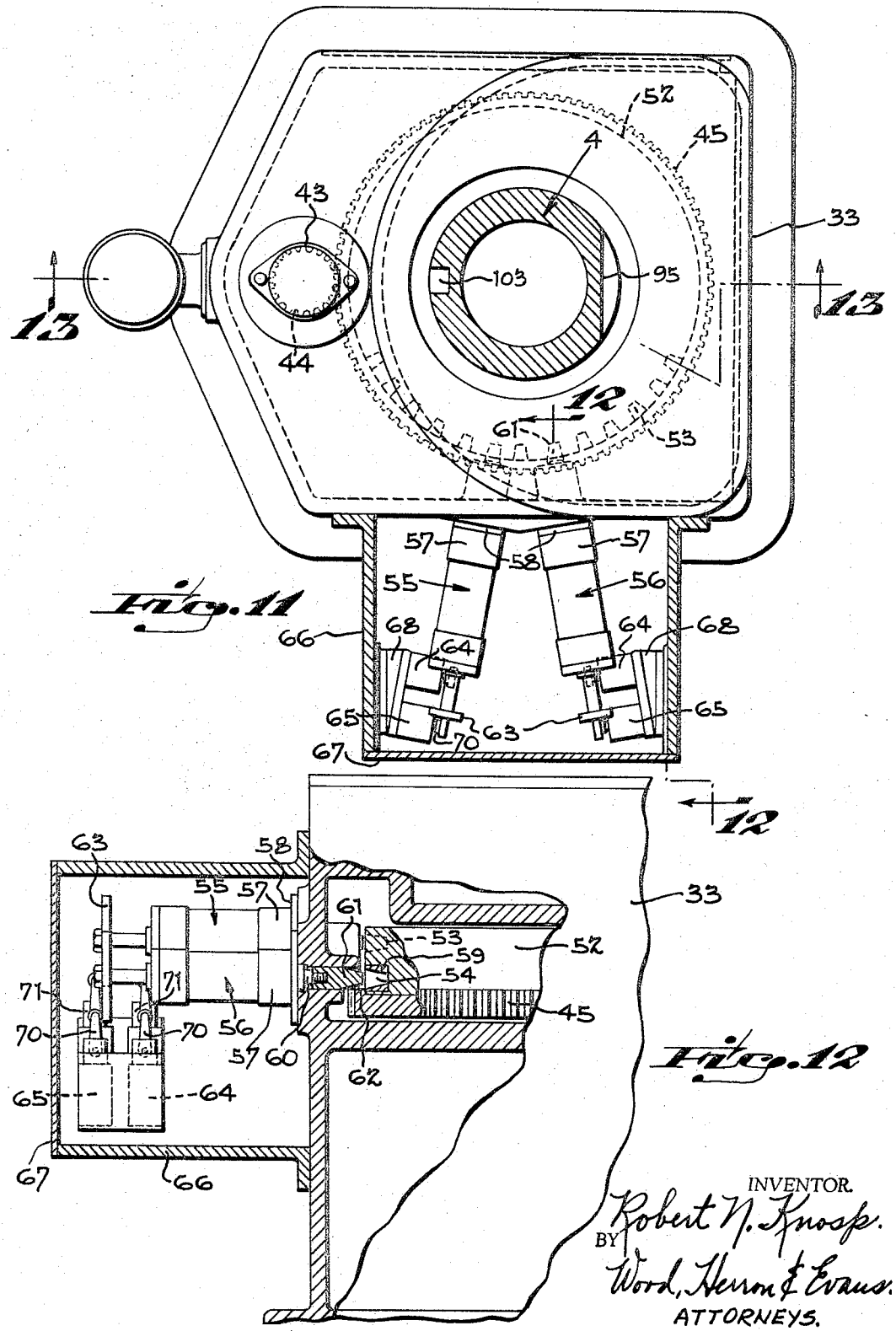

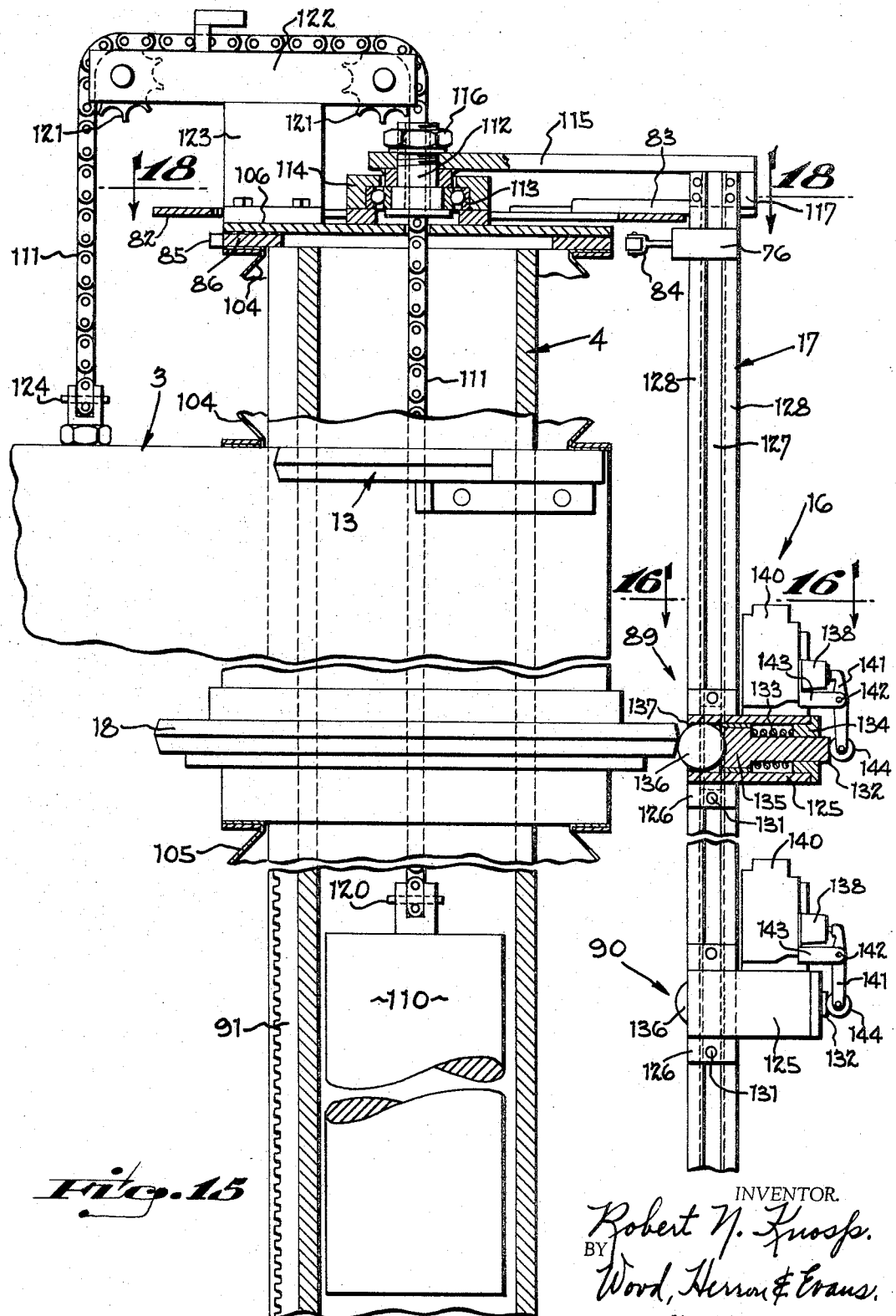

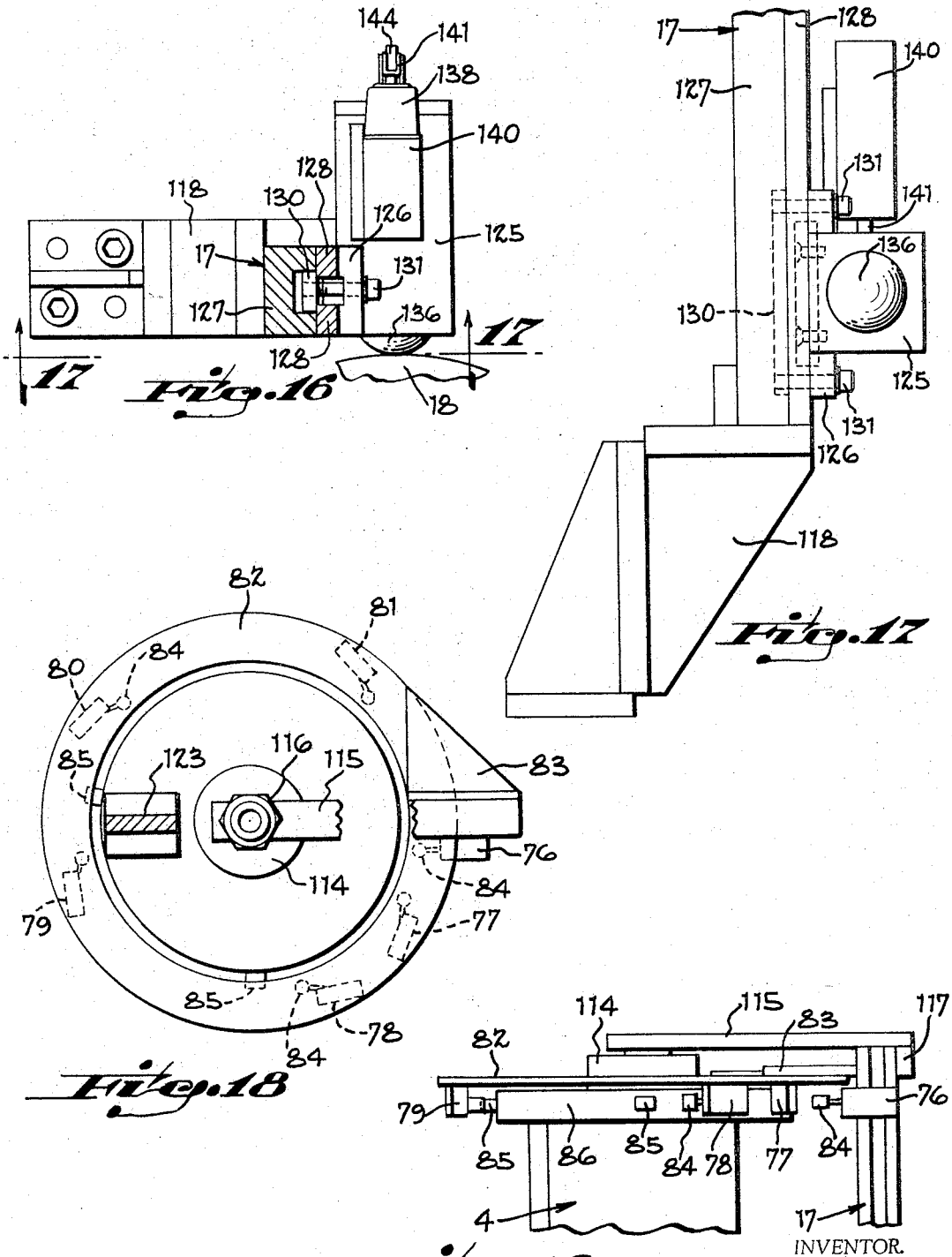

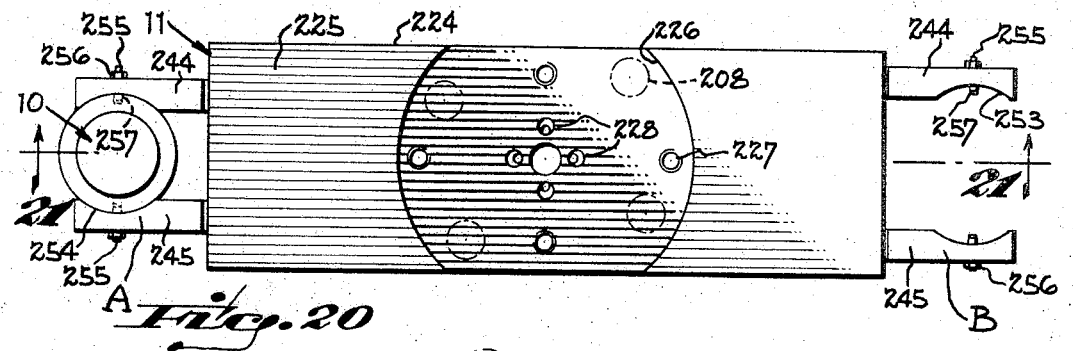

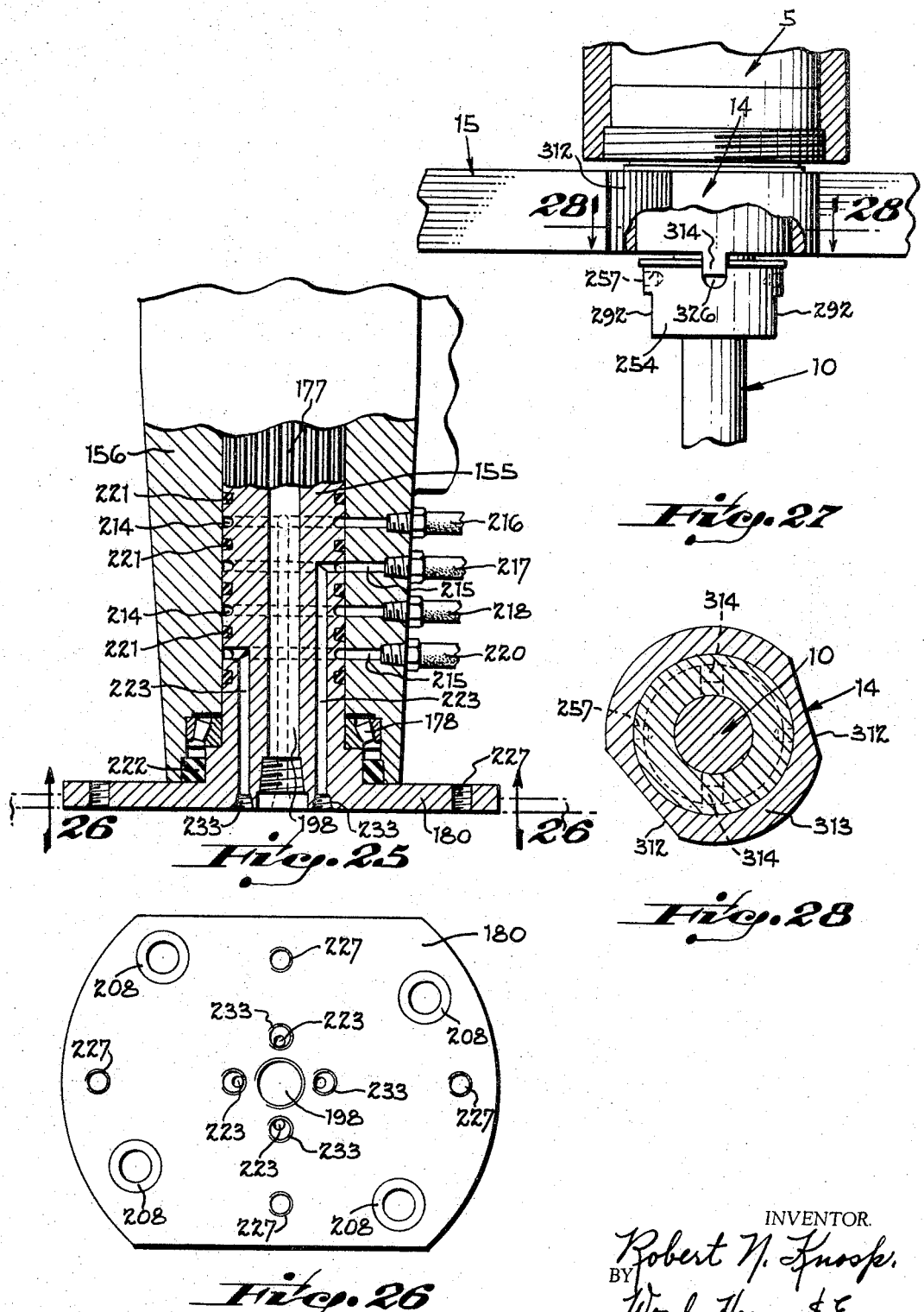

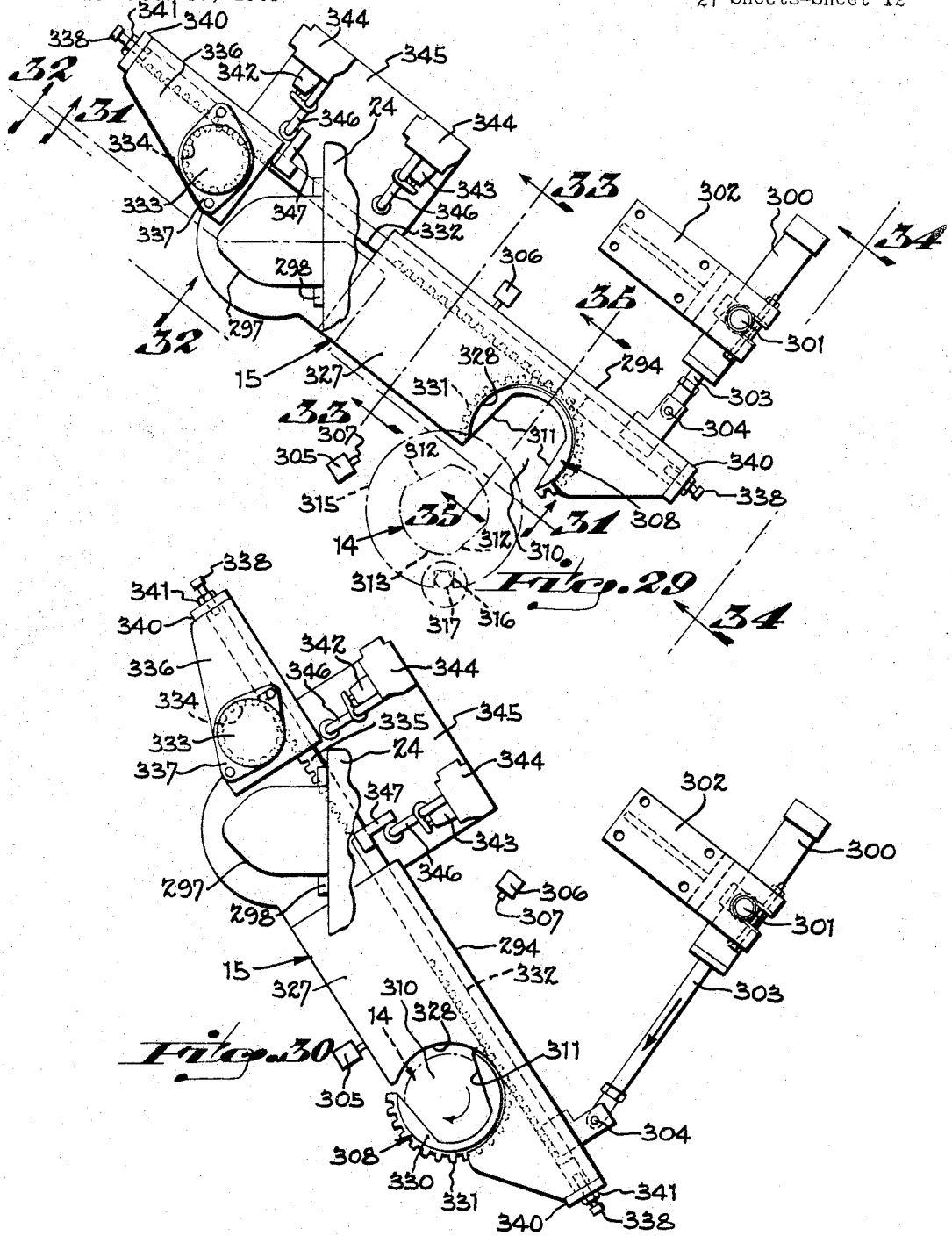

Sept. 5, 1967 R. N. KNOSP 3,339,273
AUTOMATIC TOOL CHANGING APPARATUS FOR MACHINE TOOLS
Filed Feb. 11, 1963 27 Sheets-Sheet 13
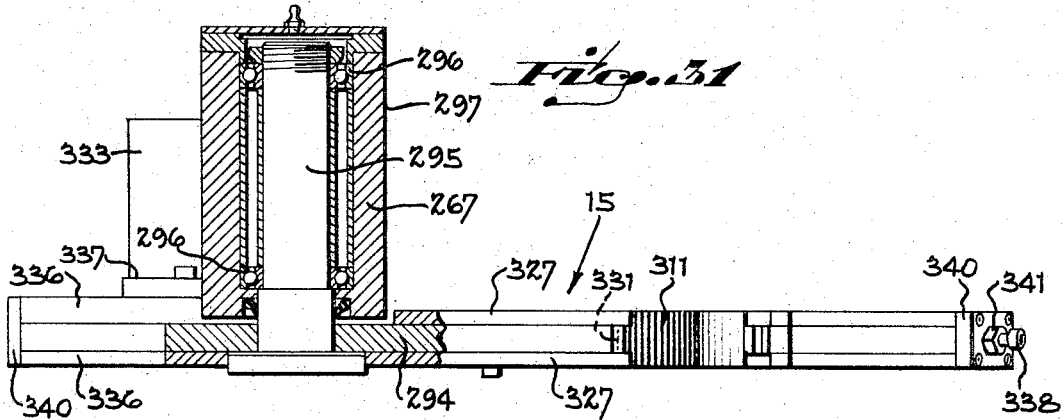
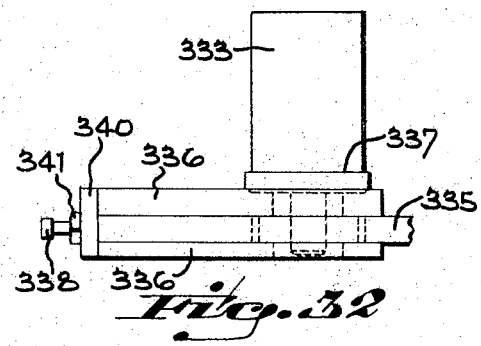
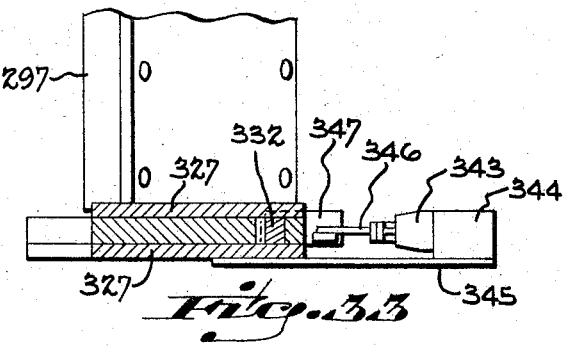
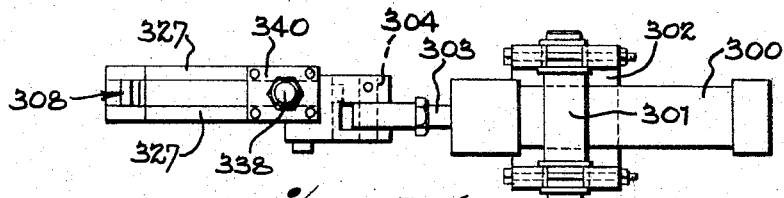
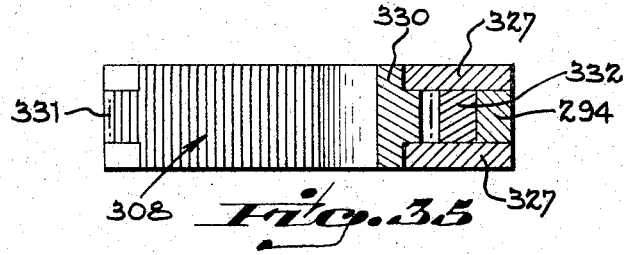
INVENTOR.
Robert N. Knosp.
BY Wood, Herron & Evans.
ATTORNEYS.

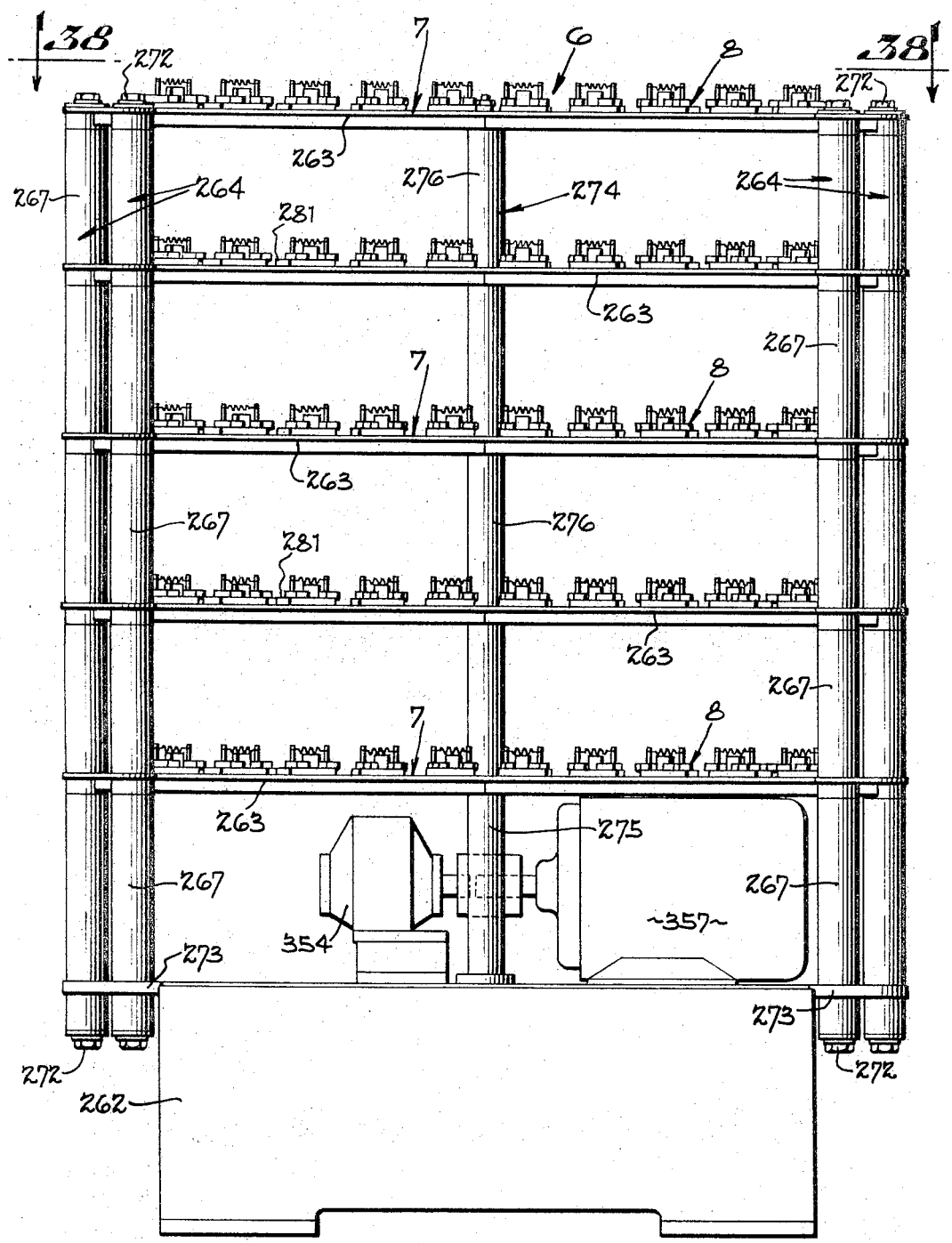

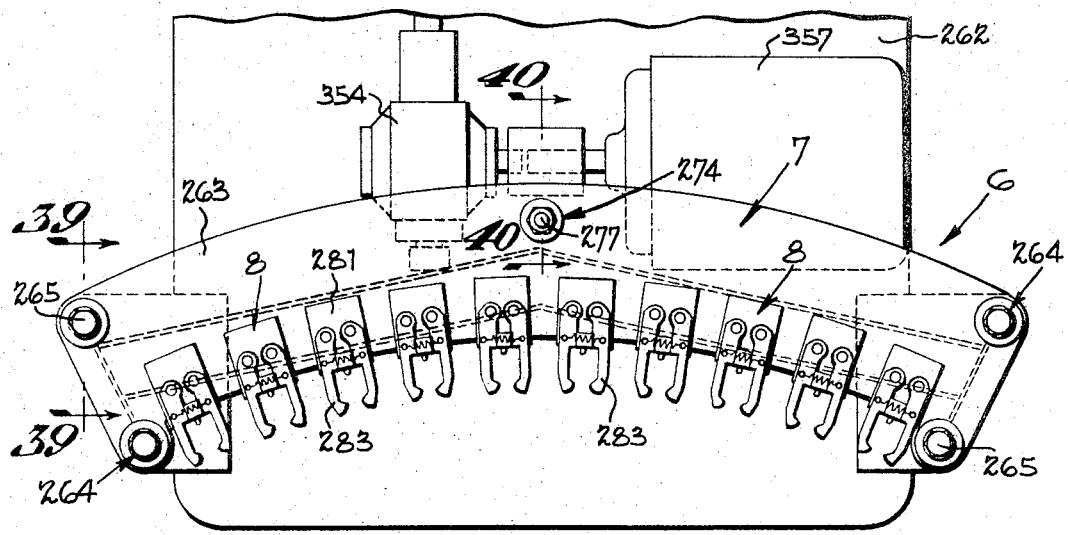
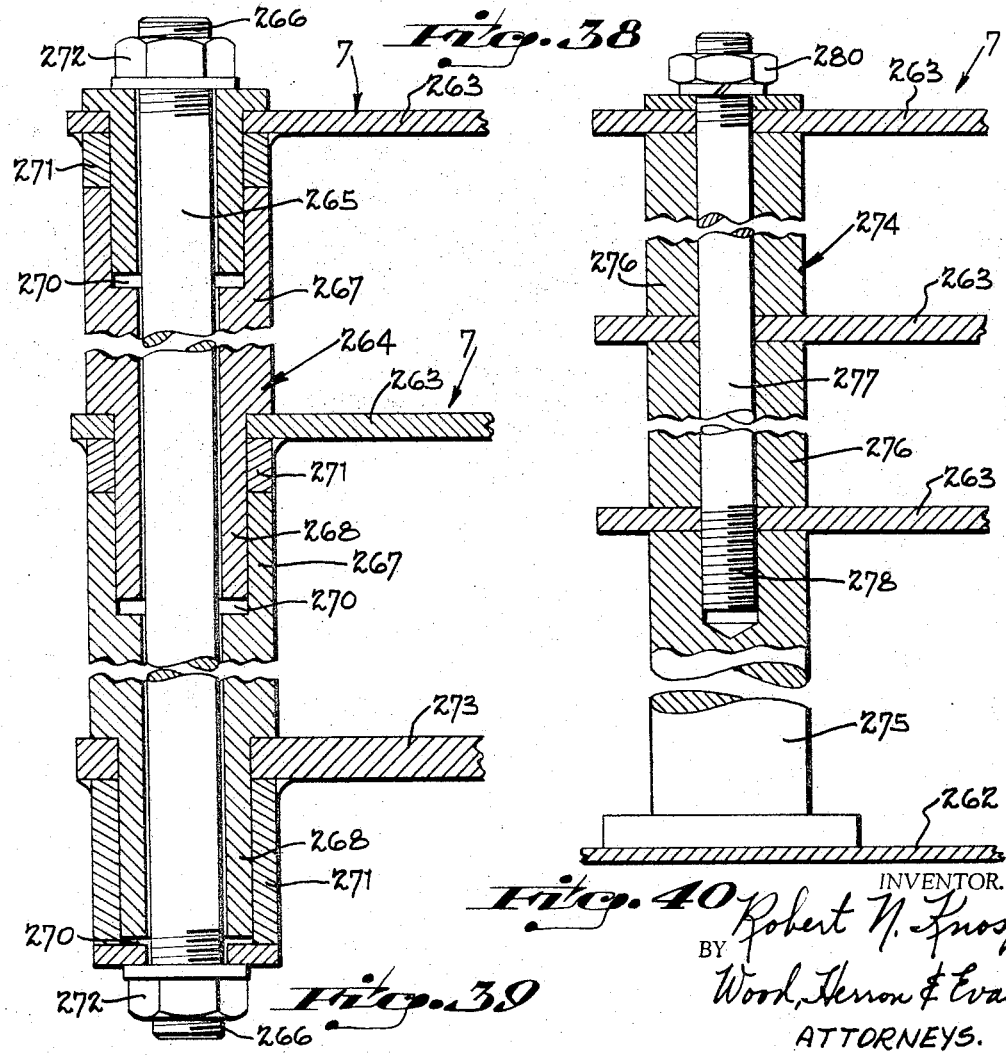

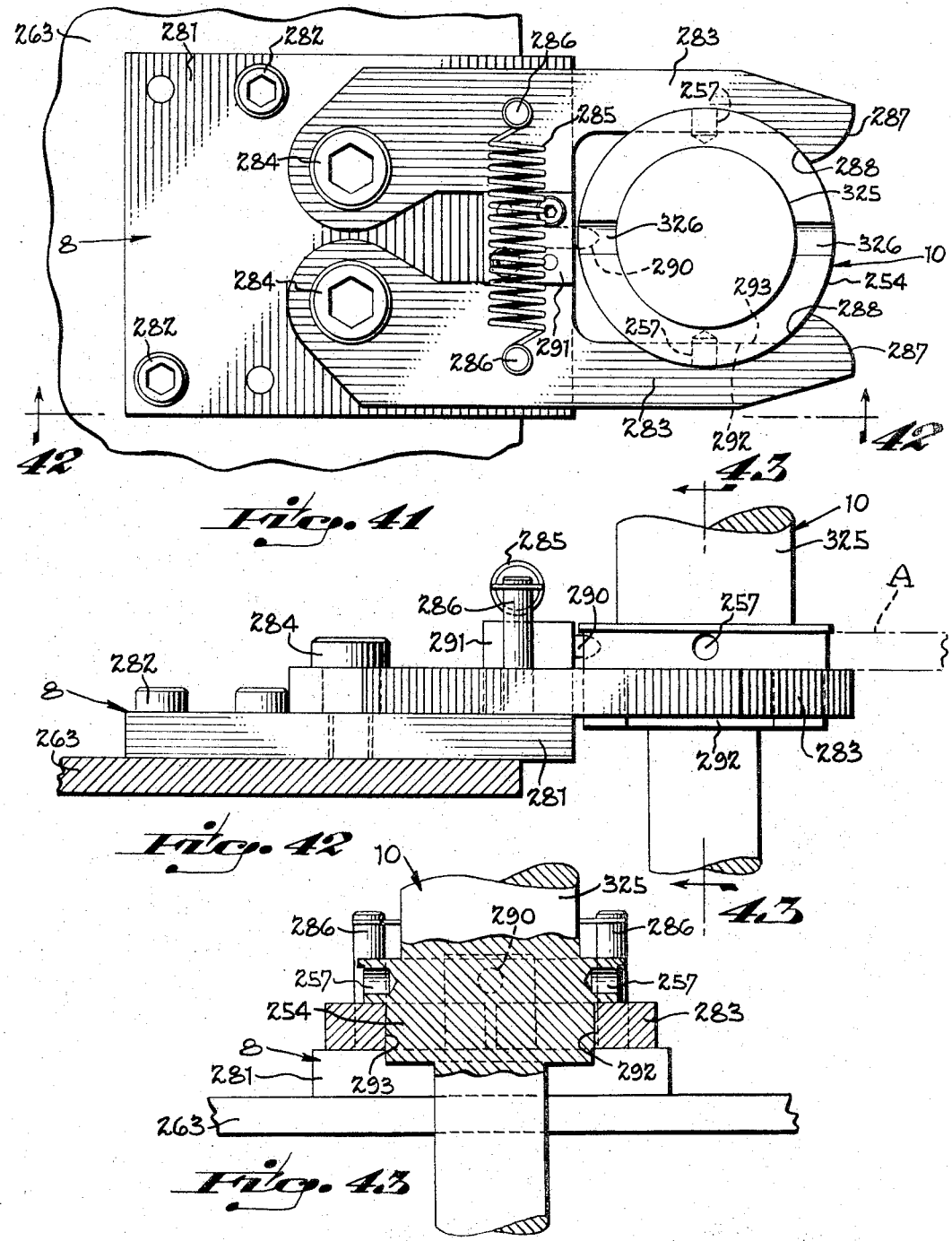

Sept. 5, 1967  R. N. KNOSP  3,339,273
AUTOMATIC TOOL CHANGING APPARATUS FOR MACHINE TOOLS
Filed Feb. 11, 1963  27 Sheets-Sheet 17
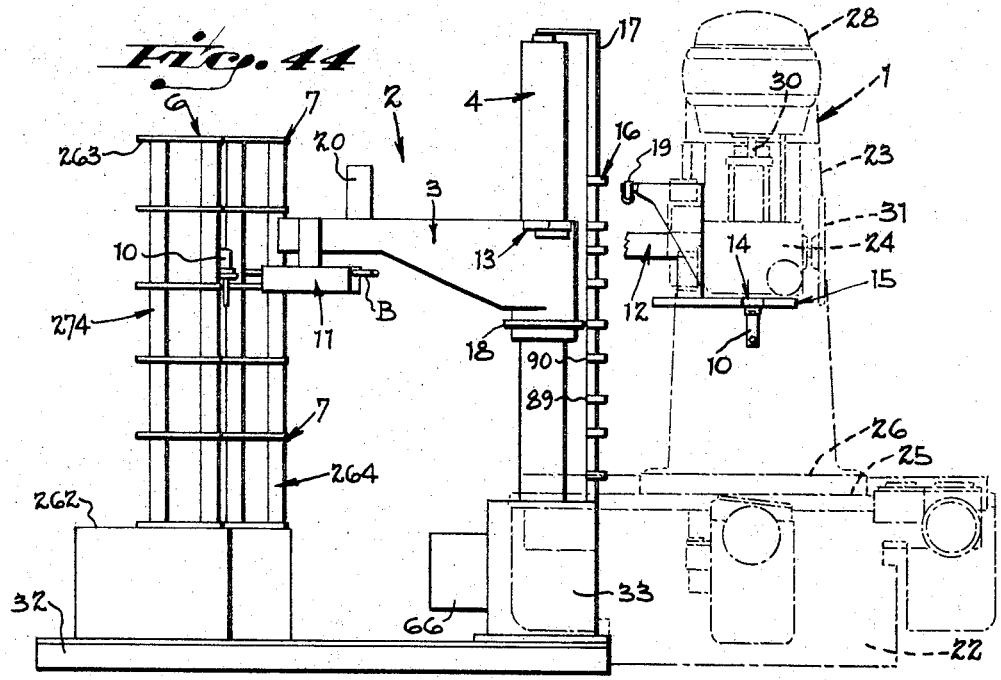
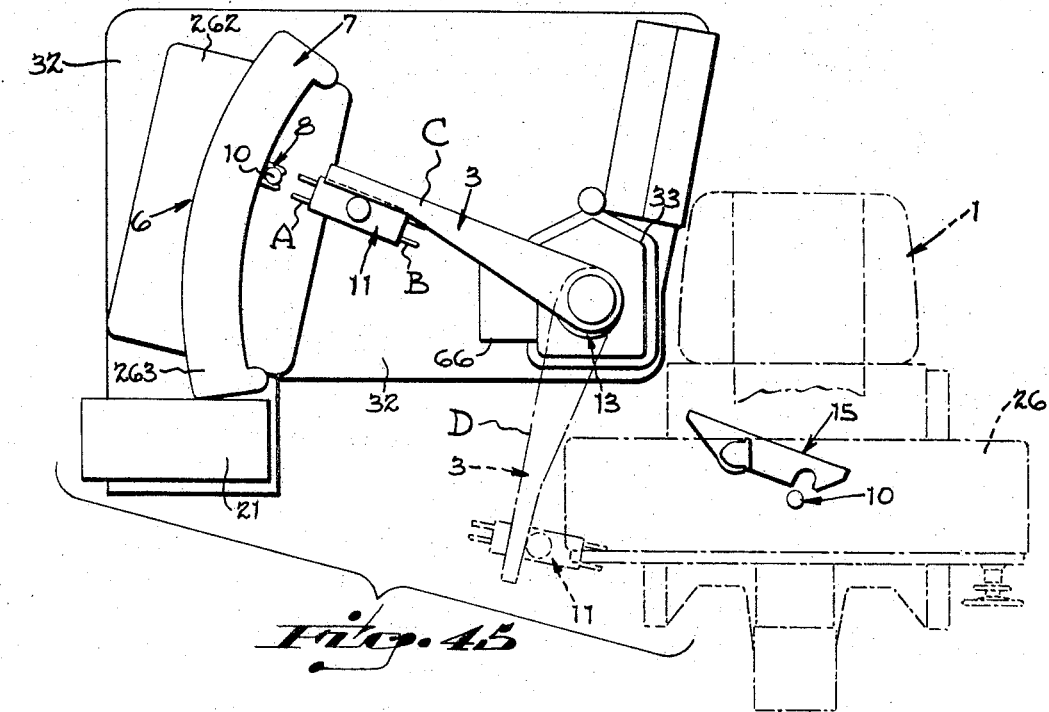
INVENTOR.
Robert N. Knosp.
BY
Wood, Herron & Evans.
ATTORNEYS.

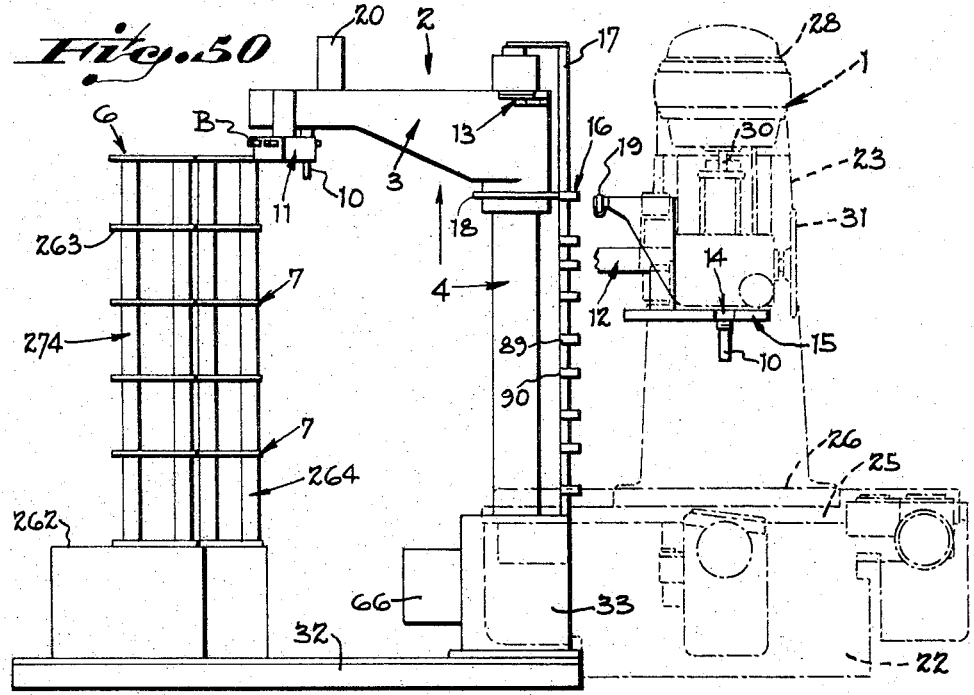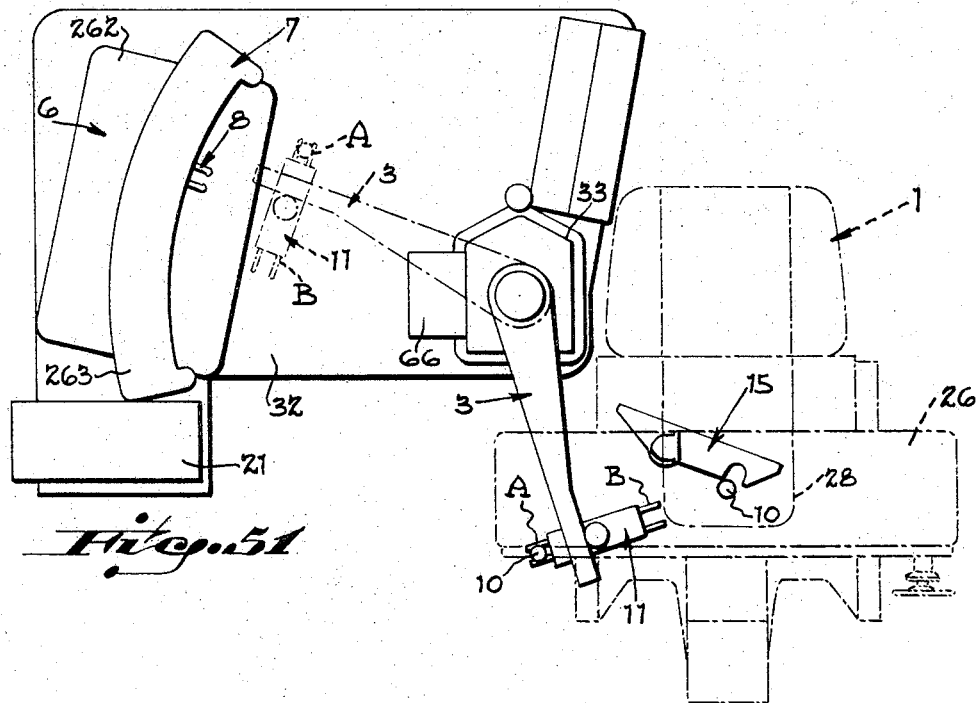

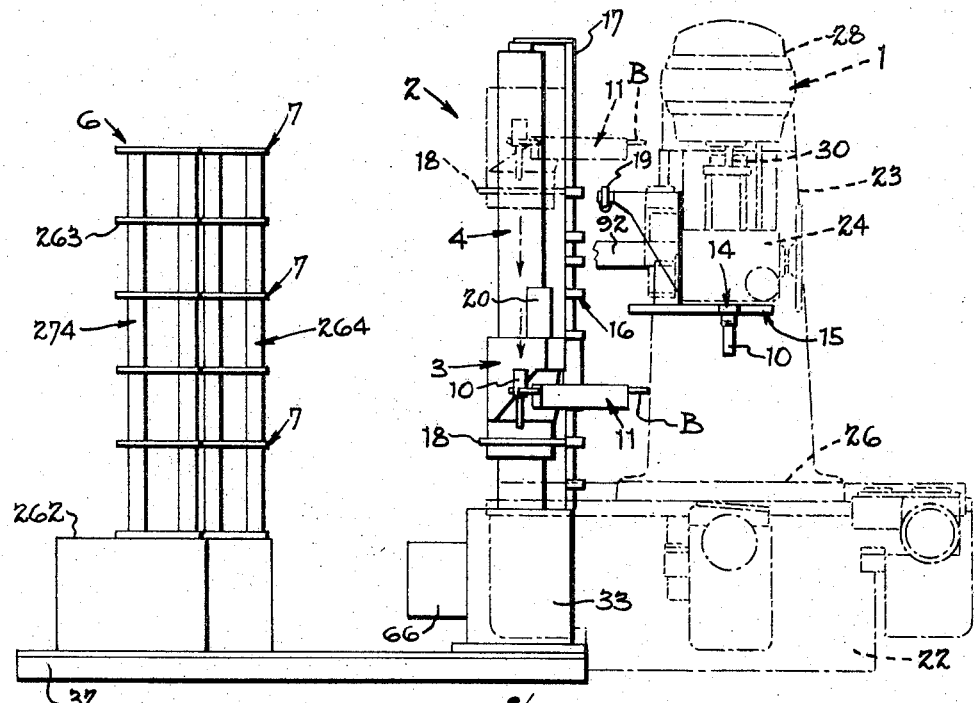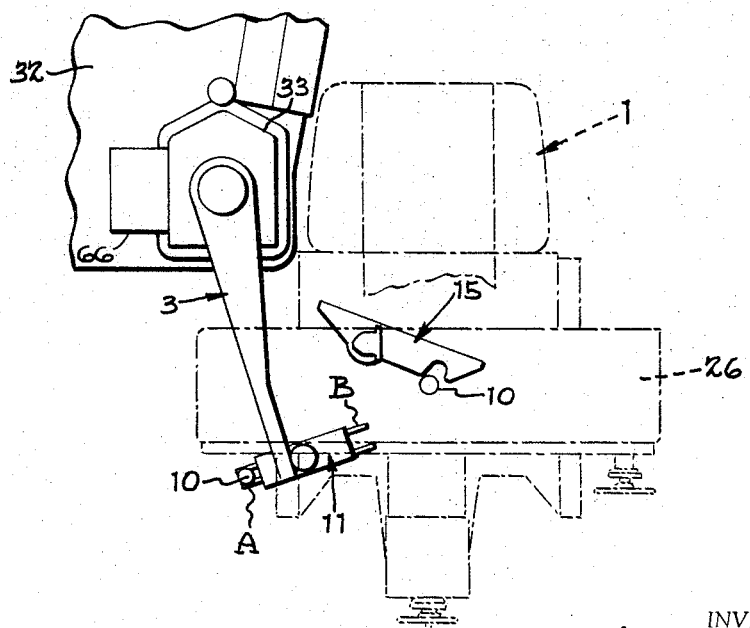

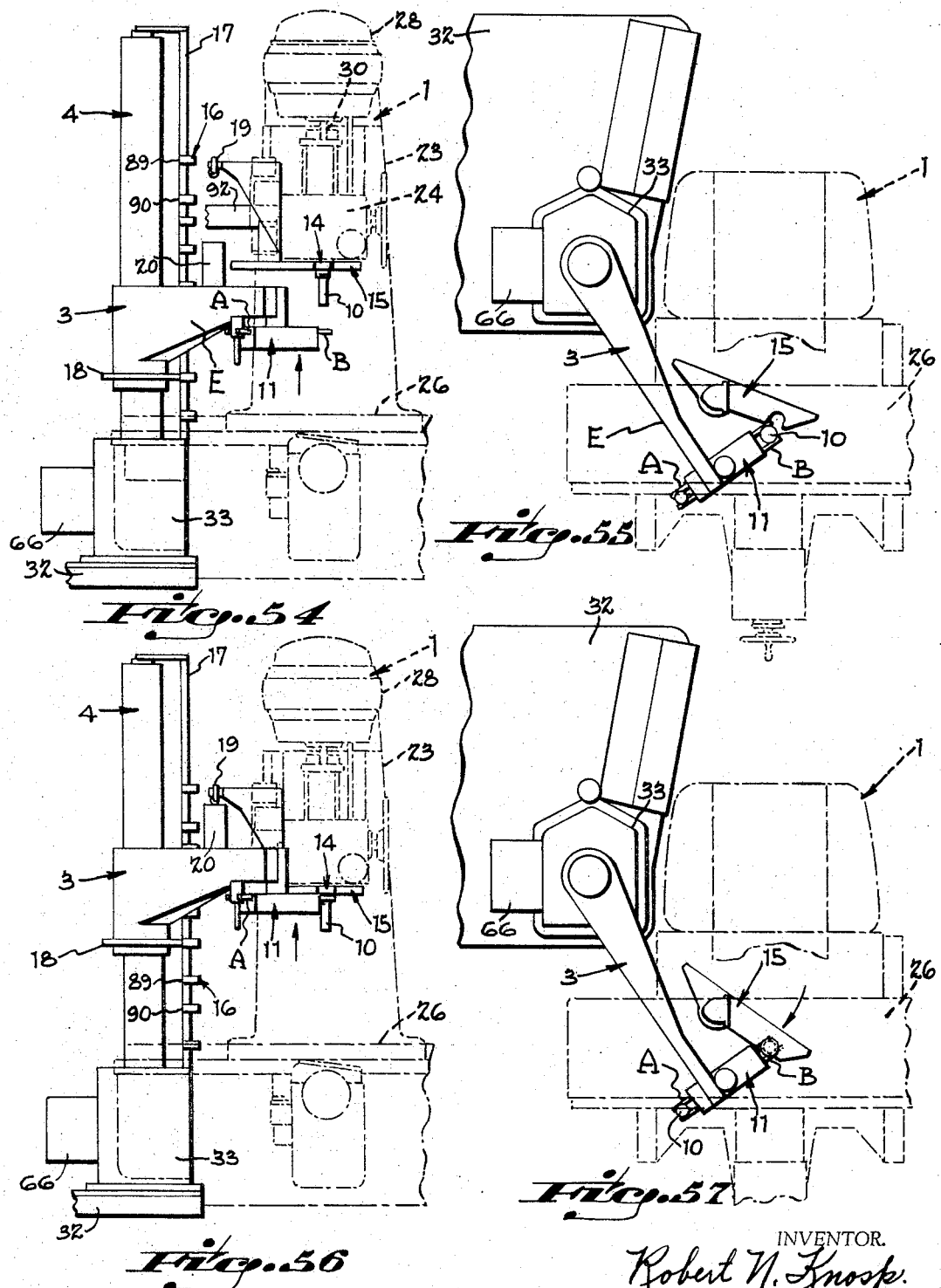

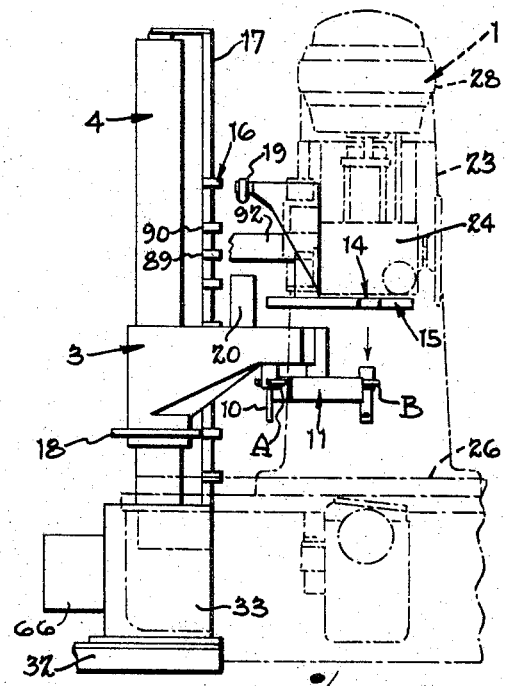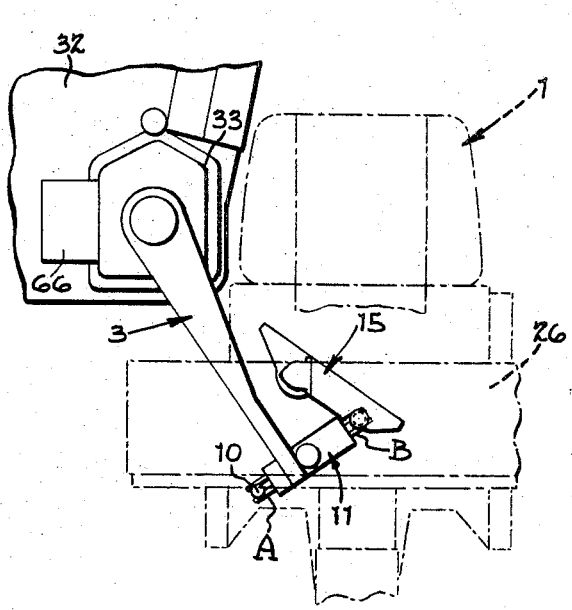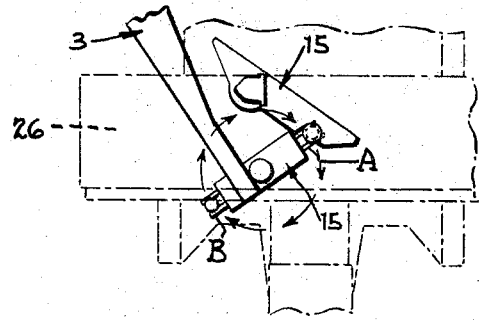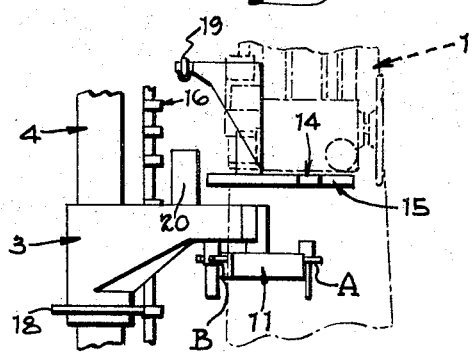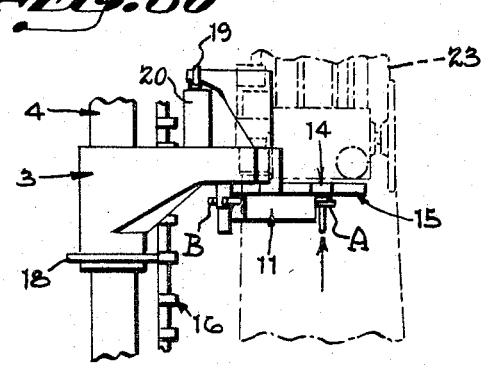

Sept. 5, 1967 R. N. KNOSP 3,339,273
AUTOMATIC TOOL CHANGING APPARATUS FOR MACHINE TOOLS
Filed Feb. 11, 1963 27 Sheets-Sheet 23

INVENTOR.
Robert N. Knosp.
BY Wood, Herron & Evans,
ATTORNEYS.

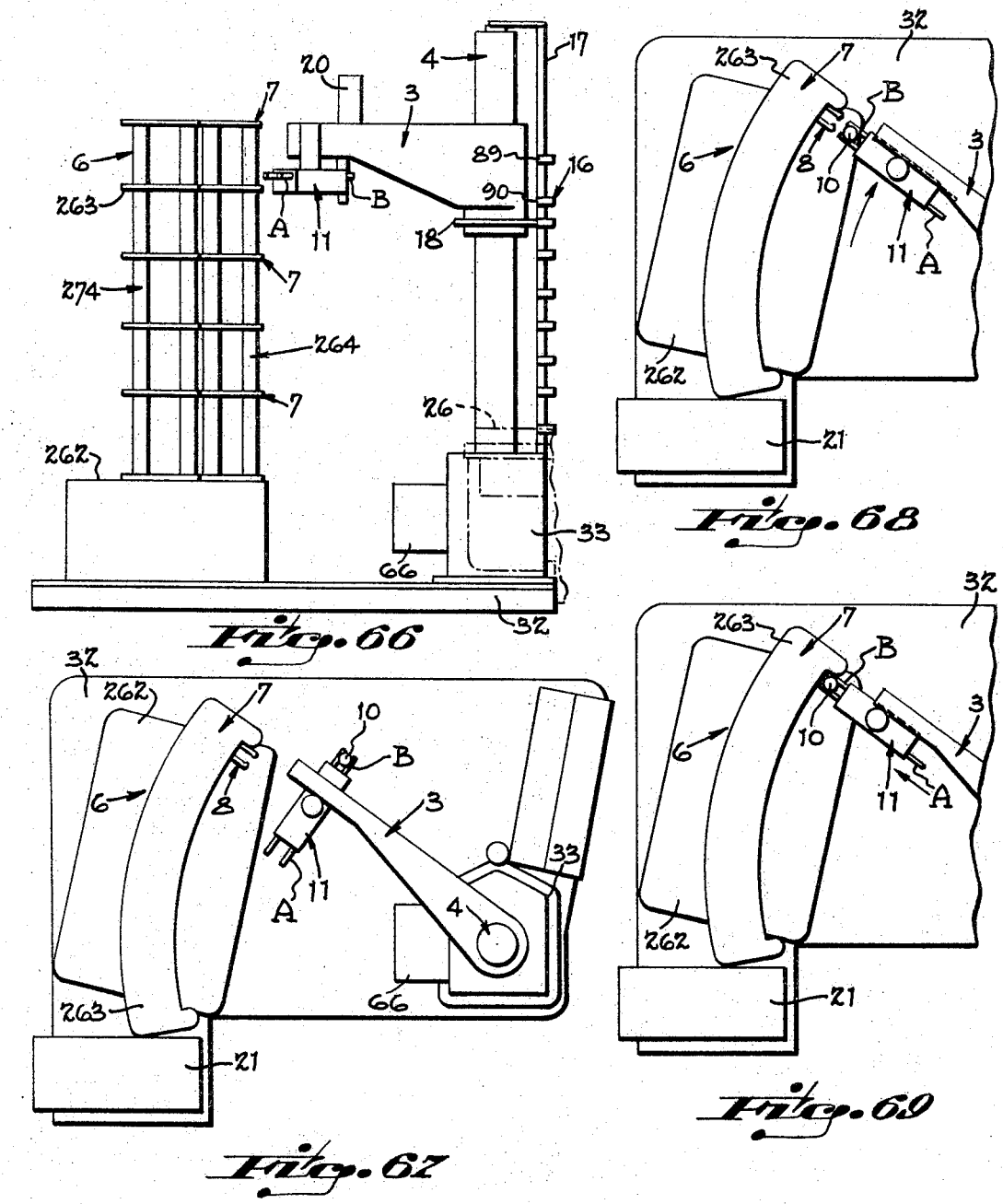

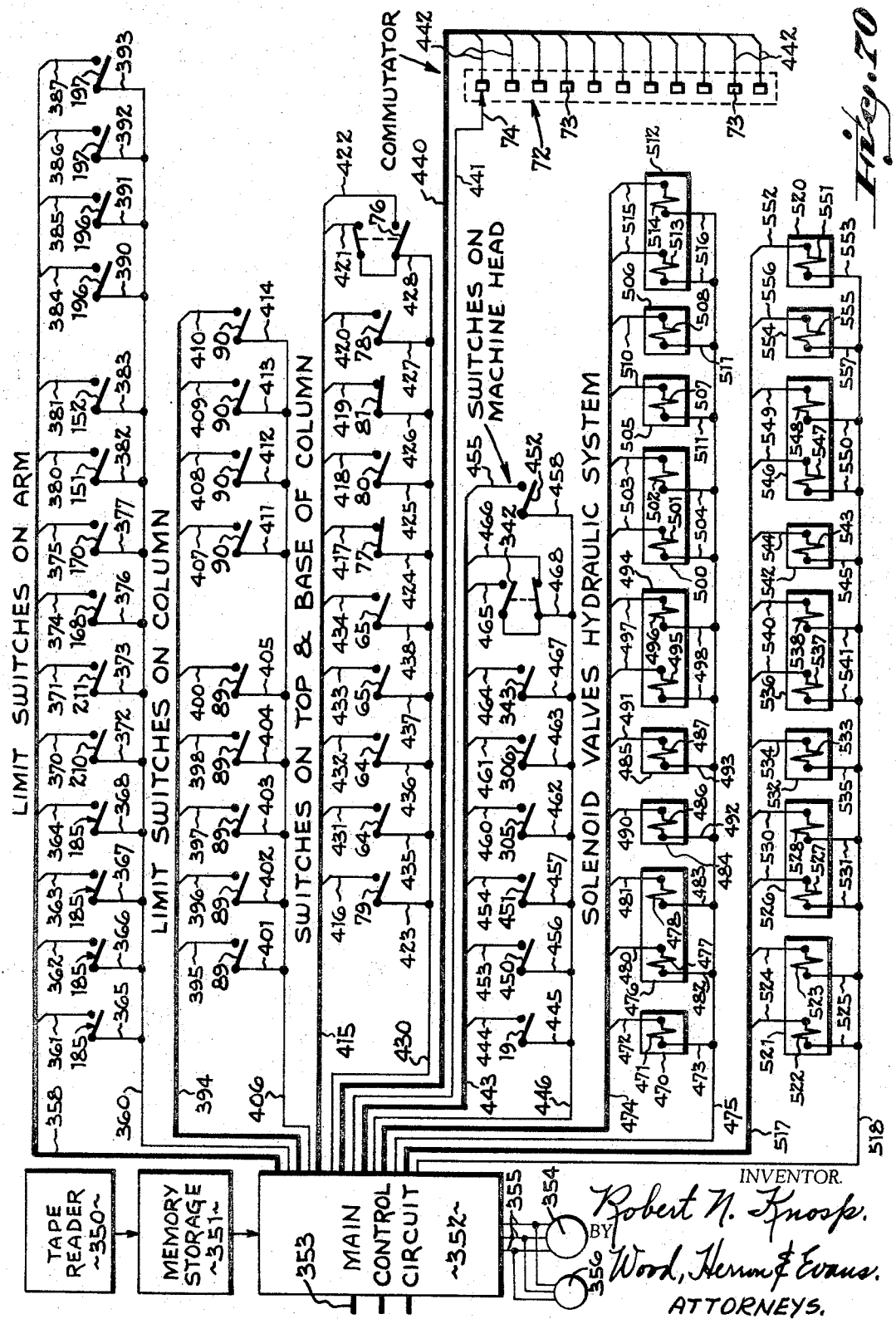

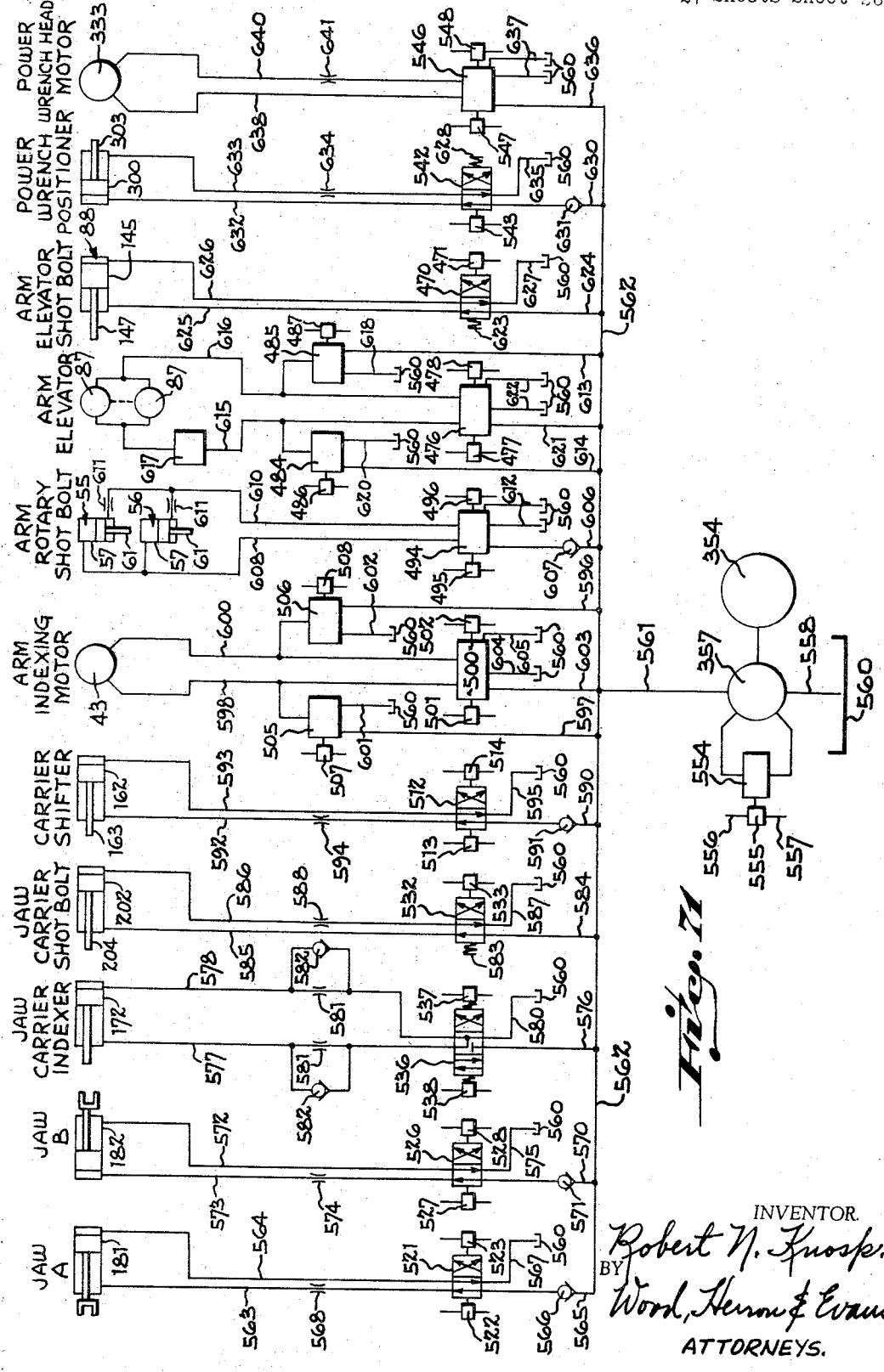

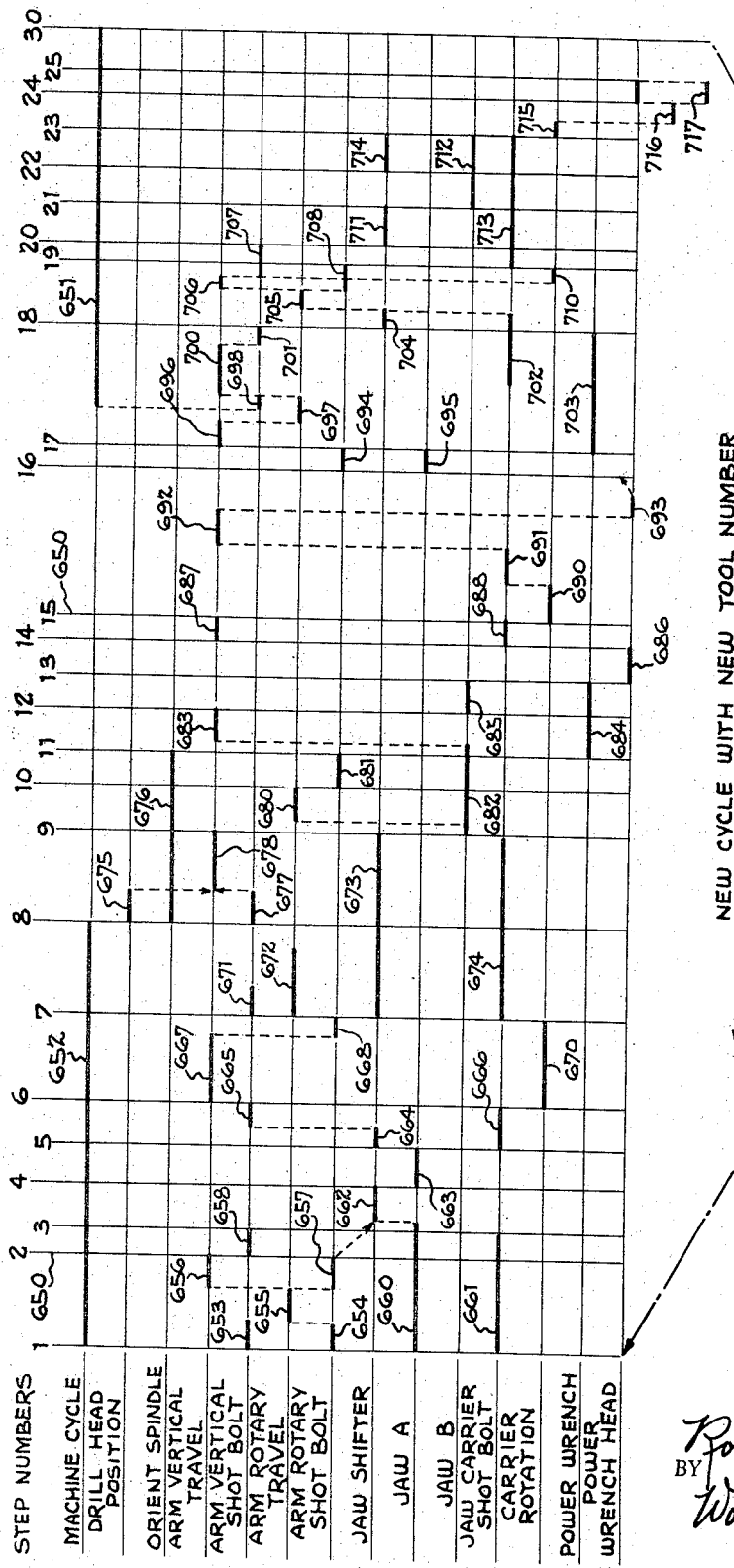

United States Patent Office 3,339,273
Patented Sept. 5, 1967

3,339,273
AUTOMATIC TOOL CHANGING APPARATUS FOR MACHINE TOOLS
Robert N. Knosp, Ludlow, Ky., assignor to The Fosdick Machine Tool Company, Cincinnati, Ohio, a corporation of Ohio
Filed Feb. 11, 1963, Ser. No. 257,398
21 Claims. (Cl. 29—568)

This invention relates to machine tools of the type having a rotating tool spindle arranged to mount various types of cutting tools for performing a sequence of cutting operations upon a workpiece. The invention is directed particularly to an apparatus for interchanging selected tools relative to the spindle in an automatic manner.

The tool changing apparatus of this invention is disclosed as an attachment in relation to a jig boring machine which is utilized in drilling, counter-boring, reaming, tapping, and other machining operations which involve the precise location of the holes with respect to the workpiece. It will be understood that the present tool changing apparatus is intended to be utilized as an attachment for machine tools other than jig boring machines, operating under the principles disclosed herein. By way of example, the apparatus can be installed as an attachment to horizontal boring machines of various types in which the spindle is mounted for rotation about a horizontal axis, as distinguished from the vertical axis of the jig boring machine of this disclosure.

The jig boring machine which has been selected to illustrate the principles of the invention comprises, in general, a stationary bed having a vertical column which slidably mounts a drill head for vertical adjustment. The bed includes a saddle or cross slide mounted below the drill head and slidable along one horizontal coordinate or path of motion with respect to the column. A worktable is slidably mounted upon the saddle and is movable along a second horizontal coordinate disposed at right angles to the coordinate of saddle motion.

The machining operation is performed by a vertical tool spindle rotatably mounted in the drill head and arranged to be shifted axially with respect to a workpiece which is clamped upon the table, such that a hole center may be precisely located with respect to the axis of the spindle by the combined movements of the saddle and table along their respective coordinates. The spindle is mounted for rotation relative to a quill mounted in the drill head and shiftable axially with respect to the head. During the machining operation, the spindle is rotated at a preselected cutting speed and is fed downwardly by the quill at a predetermined feed rate. The cutting tool is demountably clamped in a chuck of conventional design, which is carried by the lower end of the spindle, and which forms a part thereof. The chuck includes a clamping element, such as a collar, which is rotated to a clamping position to secure the tool and to an unclamping position to release the tool for tool interchange.

An apparatus for locating the hole centers automatically with respect to the axis of the spindle is disclosed in Patent No. 2,932,088, issued to Robert N. Knosp, the present applicant. Automatic regulation of the several functions of the jig boring machine under numerical control is disclosed in the copending application of Robert N. Knosp et al., Ser. No. 786,589, filed on Jan. 13, 1959 and now Patent No. 3,109,329. This programming apparatus, operating under the control of a punched tape or other record material regulates the table and saddle positioning motion in an automatic manner so as to locate the hole center with respect to the axis of the tool. The numerical control system disclosed in the copending application (Ser. No. 786,589) also provides automatic selection of the spindle feed, spindle feed rate and several other machine functions, as explained below. The numerical control system also controls the operation of the present tool changing apparatus.

In addition to the functions outlined above, the numerical control system of the copending application is also arranged to regulate the operation of a spindle feed apparatus which provides a two-stage spindle feed cycle, the first stage providing rapid advancement of the spindle from a retracted position, the second stage providing spindle advancement at a slower preselected feed rate to a predetermined depth with respect to the work. The spindle control apparatus is disclosed in another copending application of Robert N. Knosp et al., Ser. No. 51,023, filed on Aug. 22, 1960 and now Patent No. 3,100,406.

It will be understood that the axial travel of the spindle and quill relative to the drill head is limited by the length of the quill; in order to compensate for this limitation, the drill head is adjusted vertically along the column of the machine. Thus, if the workpiece includes work surfaces spaced vertically from one another at elevations exceeding the range of spindle travel, then it is necessary to shift the drill head vertically to bring the spindle within range of the higher or lower planes to be machined. An automatic control apparatus for shifting the drill head in this manner is disclosed in still another copending application of Robert N. Knosp, Ser. No. 135,879, filed on Sept. 5, 1961 and now Patent No. 3,171,301. Both the automatic spindle control apparatus, outlined above, and the drill head control apparatus are interconnected with the numerical control system (Ser. No. 786,589) such that the spindle feed cycle and also the drill head shifting cycle are carried out automatically, along with the other machine functions, under tape control.

The several machine functions outlined above are carried out in a rapid efficient manner in order to bring about the most efficient operation of the jig boring machine. In order to further reduce machine idling time, the numerical control system is arranged to feed signals into the control system for a second operation while the spindle is still carrying out a first operation, such as drilling, tapping, or the like. By operating in this manner, the control system initiates the second operation in accordance with signals stored in a memory storage unit as soon as the first operation is completed.

It will be understood that each machining operation (with the workpiece located in operating position relative to the spindle) may require one or more cutting tools to be mounted in the spindle chuck. For example, after the hole is drilled, it may be necessary to mount a reamer or counter-boring tool in the chuck for that particular hole, thus requiring several tool interchanges. On the other hand, in the event that the machine is simply performing drilling or boring operations, the next hole may be of a different diameter, thereby requiring a new tool for machining the next successive hole after the work is repositioned by the combined movements of the saddle and table.

Under conventional practice, tool interchanges are carried out manually by the operator. Under manual operation, the operator disengages the chuck with a wrench, or other tool, removes the tool, replaces it with the new one, then reengages the chuck. This procedure necessarily consumes a great deal of time and limits the production which could otherwise be obtained under numerical control.

One of the primary objectives of the present invention has been to provide an apparatus, operated under numerical control in time with the other machine functions, which is adapted to demount the used tool from the chuck at the end of a given operation and to replace the used tool with a preselected new tool in an automatic manner, thereby to eliminate the time delay which is involved in manual tool interchange.

Described generally, the tool changing apparatus of this invention comprises a vertical column which is mounted as an attachment adjacent the column of the jig boring machine, a tool changing arm mounted for radial and vertical motion relative to the column, and a tool storage rack mounted in a position spaced outwardly from the column of the jig boring machine. The tool storage rack is provided with a series of tool retainer jaws arranged in an arc corresponding to the path of swinging motion of the tool changing arm.

The swinging end of the arm includes power-operated clamping jaws which are adapted to engage a preselected tool, and to withdraw it from the retaining jaws of the tool storage rack. After withdrawing the preselected tool, the tool changing arm swings through its arc to a position relative to the chuck, a torque wrench disengages the chuck, the arm removes the old tool, and then inserts a new one in the chuck. With the new tool thus inserted in the chuck, the torque wrench mechanism rotates the collar of the chuck to its tool-engaging position. Thereafter, the tool changing arm shifts outwardly to an inactive position between the drill head and tool storage rack, adapting the machine to carry out its several machine functions under tape control, as outlined above. The tool changing cycle is regulated by the numerical control system which is arranged to transmit a signal for the preselected tool and to initiate the cycle in time with the several other machine functions.

A further objective of the invention has been to provide a tool storage rack having groups of spring-loaded tool retaining jaws disposed in a plurality of levels relative to the column of the tool changing apparatus, combined with an apparatus for shifting the tool changing arm vertically along the column into registry with a selected level and radially into alignment with a selected retainer jaw at that level, thereby to multiply the tool storage capacity of the tool changing apparatus.

According to this aspect of the invention, the tool retaining jaws of the storage rack are located on several levels spaced one above the other and arranged to support the tools on centers corresponding with the radius of motion of the tool changing arm at the respective levels. In the present example, the tool storage rack is provided with five tool storage levels, each level having ten sets of jaws spaced apart from one another in the arc of motion of the arm, thus providing for the storage of fifty different cutting tools. The numerical control system is arranged to transmit signals which correspond to each individual tool of the storage rack.

In response to a given signal, the tool changing arm is shifted vertically along its column to a plane corresponding to the tool storage level at which that particular tool is stored. Thereafter, the arm swings radially to its arc into alignment with the preselected tool at that level in accordance with the pick-up signal. Upon being aligned with the tool, the arm withdraws the tool from the retaining jaws of the tool storage rack, then transfers the tool to the chuck of the jig boring machine, as outlined above.

A further objective of the invention has been to provide a tool changing arm which is adapted to transfer a new tool from the tool storage rack to the spindle during radial direction in one motion and to transfer the used tool from the spindle chuck back to the storage rack during radial motion in the opposite direction, thereby to carry out the tool interchange cycle in a rapid efficient manner.

It will be understood at this point, that each tool is carried in a designated set of tool retaining jaws of the storage unit, such that the proper tool is selected by shifting the arm into alignment with a preselected set of jaws. In order to interchange the tools most efficiently, the swinging end of the tool changing arm is provided with a rotary jaw carrier having first and second sets of power-operated clamping jaws which are adapted to be indexed with respect to the tool retaining jaws and spindle.

At the start of the tool changing cycle, the arm swings into alignment with the selected tool in the storage unit, as outlined above, then the jaw carrier is shifted outwardly to bring the first set of its power-operated jaws into clamping position relative to the tool. This set of power operated jaws is then shifted to tool clamping position, then the carrier is retracted along the arm to withdraw the tool from its spring-loaded retainer jaws.

Thereafter, the arm swings through its arc toward the spindle, the carrier is rotated to present its second set of jaws to the used tool in the chuck, then the power-operated torque wrench is operated to disengage the chuck for removal of the used tool. The carrier is then rotated to present the new tool to the chuck, the power torque wrench is energized to engage the tool, then the first set of jaws are disengaged from the new tool, adapting the arm to swing back toward the tool storage rack into alignment with the designated set of jaws for the used tool. The carrier then rotates to index the second set of jaws and the used tool to its retainer jaws, then the carrier is shifted outwardly to force the used tool into its retainer jaws; thereafter, the second set of jaws are shifted to a disengaged position and retracted with the carrier. After replacing the used tool, the arm swings radially to a waiting position ready for the next tool changing cycle.

According to the present embodiment of the invention, the several components of the tool changing apparatus are operated hydraulically. The hydraulic cylinders and motors are, in turn, regulated by an electrical control system which is interconnected with the memory storage unit of the numerical control system. Each component of the tool changing apparatus is provided with limit switches which are arranged to transmit signals to the control system upon completion of the operation of that particular component. The arrangement is such that each signal conditions the control circuit to initiate the next operation in the tool changing cycle. By virtue of this arrangement, the several operations are performed in sequence in a reliable manner to provide positive operation.

The various features and advantages of the invention will be more clearly apparent to those skilled in the art from the following description taken in conjunction with the drawings.

In the drawings:

FIGURE 1 is a perspective view of a jig boring machine equipped with the automatic tool changing attachment of the present invention.

FIGURE 2 is a diagrammatic front view illustrating the jig boring machine and its relationship with the tool changing arm and tool storage rack.

FIGURE 3 is a diagrammatic top plan view as projected from FIGURE 2, further illustrating the relationship of the jig boring machine, tool changing arm and tool crib.

FIGURE 4 is an enlarged fragmentary sectional view, showing the tool changing arm and its elevating mechanism with respect to the column, as viewed along the line 4—4 of FIGURE 3, the parts being shown with the arm in an elevated position during its cycle of operation.

FIGURE 5 is a fragmentary view, taken along the line 5—5 of FIGURE 4, illustrating generally the jaw carrier which is mounted on the swinging end of the tool changing arm.

FIGURE 6 is a top plan view of the radially shiftable tool changing arm and column, with parts shown in section, as indicated by the line 6—6 of FIGURE 4.

FIGURE 7 is a sectional view taken along line 7—7 of FIGURE 6, detailing the hydraulically operated shot bolt which latches the column of the tool changing arm with the arm in a selected radial position during the tool changing cycle.

FIGURE 8 is a sectional view taken along the line 8—8 of FIGURE 7, further illustrating the shot bolt mechanism.

FIGURE 9 is a top plan view, taken along the line 9—9 of FIGURE 4, showing the limit switches and associated cams which control the rotation of the jaw carrier with reference to the arm.

FIGURE 10 is a sectional view, taken along line 10—10 of FIGURE 9, further detailing the construction of the cam and switches which coact with one another to locate the jaw carrier radially with respect to the arm.

FIGURE 11 is a top plan view, partially in section, as indicated by the line 11—11 of FIGURE 2, detailing the hydraulically operated shot bolts for latching the column and tool changing arm in a selected radial position during the tool changing cycle.

FIGURE 12 is a fragmentary sectional view, taken along line 12—12 of FIGURE 11, further detailing the hydraulically operated shot bolt mechanism for latching the column with the tool changing arm in a selected radial position.

Figure 13:
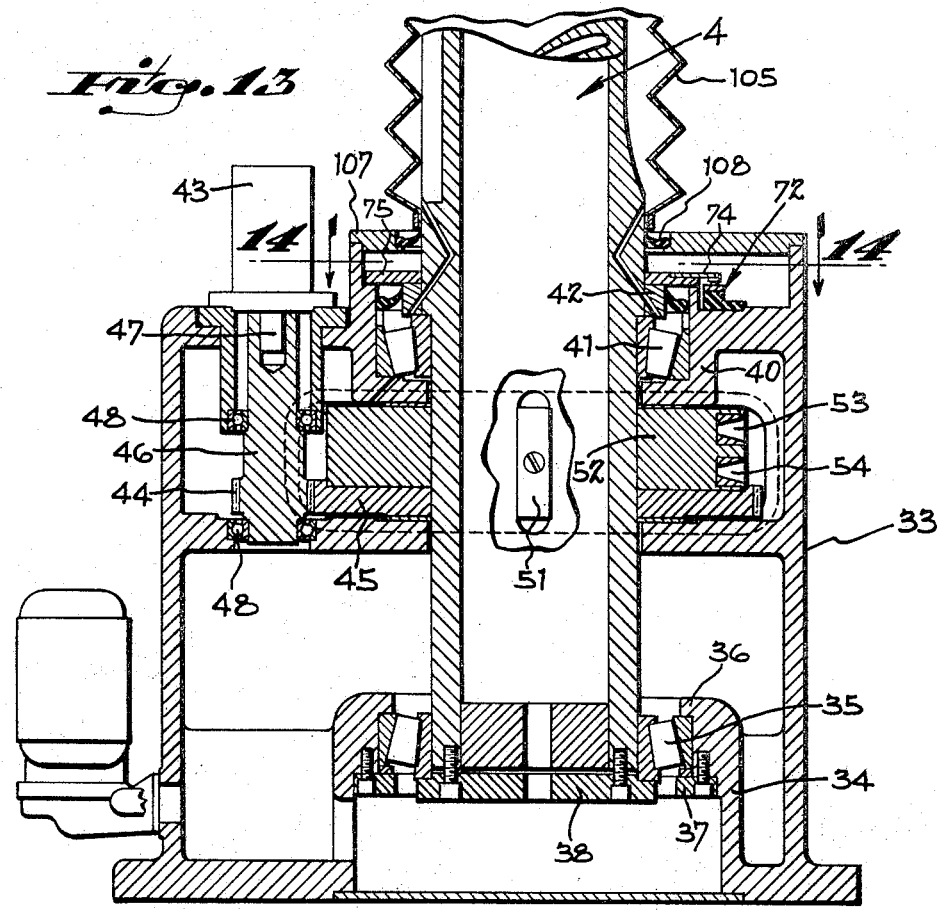

FIGURE 13 is a fragmentary sectional view, taken along line 13—13 of FIGURE 11, showing the thrust bearings which rotatably journal the lower end of the selector arm column, and also showing the hydraulically operated gear and pinion drive which rotates the column and thereby indexes the tool changing arm to a selected radial position. This view also illustrates the commutator ring and brush which is mounted at the base of the column.

Figure 14:
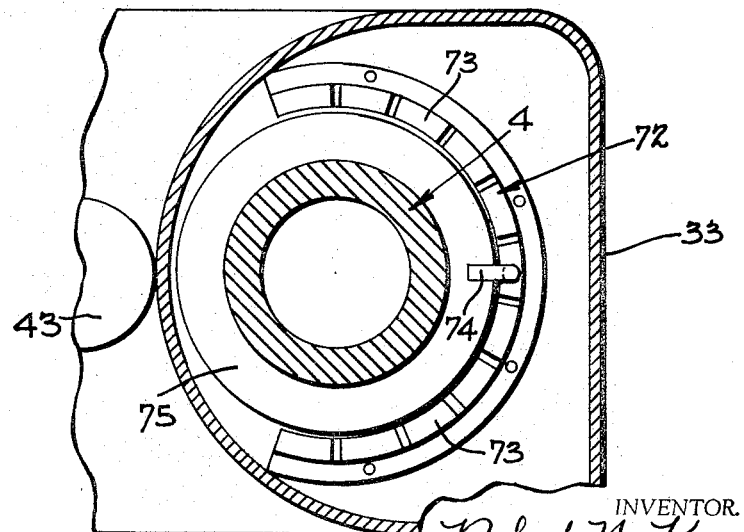

FIGURE 14 is a sectional view taken along the line 14—14 of FIGURE 13, illustrating the commutator ring which is mounted in the base, combined with the brush which rotates with the column. The commutator ring is arranged to locate the arm radially with respect to the tool storage rack during the tool selection cycle.

FIGURE 15 is an enlarged fragmentary sectional view, generally similar to FIGURE 4, detailing the counterweight mechanism for the tool changing arm and the arm elevation sensing switches which coact in controlling the vertical motion of the arm with respect to the tool storage rack.

FIGURE 16 is a top plan view, taken along the line 16—16 of FIGURE 15, further detailing one of the sensing devices which regulates the elevation of the arm.

FIGURE 17 is a fragmentary view of the arm elevation sensing device, as viewed along the line 17—17 of FIGURE 16.

FIGURE 18 is a top plan view, taken along line 18—18 of FIGURE 15, showing the limit switches and cams which are mounted at the top of the column to regulate the several radial positions of the tool changing arm.

FIGURE 19 is a fragmentary side view further illustrating the rotary limit switches and their mounting bracket.

FIGURE 20 is a top plan view of the rotary jaw carrier taken along the lines 20—20 of FIGURE 2.

FIGURE 21 is a sectional view of the rotary jaw carrier as taken along the line 21—21 of FIGURE 20.

FIGURE 22 is a sectional view taken along line 22—22 of FIGURE 21, detailing the hydraulically operated actuating mechanism of the jaw carrier.

FIGURE 23 is a fragmentary bottom view of the rotary jaw carrier, as viewed along the line 23—23 of FIGURE 21, illustrating the limit switch of one of the tool clamping jaws.

FIGURE 24 is an end view of one of the tool clamping jaws as viewed along line 24—24 of FIGURE 21.

FIGURE 25 is an enlarged fragmentary sectional view taken from FIGURE 4, detailing the hydraulic passageways of the jaw carrier spindle which actuate the hydraulically operated tool changing jaws.

FIGURE 26 is a bottom plan, as viewed along the line 26—26 of FIGURE 25, illustrating the mounting flanges of the carrier spindle, particularly the hydraulic passageways which operate the tool clamping jaws.

FIGURE 27 is an enlarged fragmentary view, partially in section, showing the lower portion of the spindle, the tool mounting chuck, and a portion of the power wrench which engages or releases the chuck with respect to the cutting tool.

FIGURE 28 is a sectional view taken along the line 28—28 of FIGURE 27, further illustrating the chuck and its relationship to the shank of the cutting tool. In this view, the chuck is shown in its tool release position, corresponding to FIGURE 30.

FIGURE 29 is a top plan view of the power wrench or chuck operating mechanism of the tool spindle, as viewed along the line 29—29 of FIGURE 2. In this view, the apparatus is shown in its inoperative position with the power wrench retracted from the chuck of the tool spindle, with the chuck in its tool-engaging position.

FIGURE 30 is a view similar to FIGURE 29, showing the wrench mechanism shifted to its operating position, with the chuck of the tool spindle rotated to its tool release position.

FIGURE 31 is a side view, partially in cross section, as indicated by the line 31—31 of FIGURE 29, further illustrating the power chuck wrench mechanism, particularly the bearing structure which supports the assembly for pivotal motion relative to the jig boring machine.

FIGURE 32 is a fragmentary side elevation of the chuck operating wrench, as viewed along the line 32—32 of FIGURE 29, illustrating the hydraulic motor which rotates the chuck operating wrench head.

FIGURE 33 is a sectional view taken along line 33—33 of FIGURE 29, further detailing the chuck operating mechanism.

FIGURE 34 is an end elevation of the chuck operating mechanism, as viewed along the line 34—34 of FIGURE 29.

FIGURE 35 is a sectional view taken along the line 35—35 of FIGURE 29, detailing the rotary chuck operating wrench head and its driving rack.

FIGURE 36 is a fragmentary sectional view taken along line 36—36 of FIGURE 1, illustrating the shot bolt apparatus which orients the spindle in its stationary position during the tool changing cycle. This apparatus is illustrated in broken lines in FIGURE 29, which shows the spindle latched in its oriented or indexed position ready to be engaged by the power wrench at the start of the tool changing cycle.

FIGURE 37 is a front elevation of the tool crib or storage rack as viewed along the line 37—37 of FIGURE 3.

FIGURE 38 is a top plan view of the tool storage rack, taken along line 38—38 of FIGURE 37.

FIGURE 39 is an enlarged fragmentary sectional view taken along line 39—39 of FIGURE 38, detailing one of the end mounting post assemblies of the tool storage rack.

FIGURE 40 is an enlarged fragmentary sectional view, taken along line 40—40 of FIGURE 38, detailing the intermediate mounting post assembly of the tool storage rack.

FIGURE 41 is an enlarged fragmentary top plan view, taken from FIGURE 38, detailing one of the pairs of tool-retaining jaws of the tool storage rack.

FIGURE 42 is a side elevation, partially in section, taken along line 42—42 of FIGURE 41, further detailing the pair of tool-retaining jaws.

FIGURE 43 is a fragmentary sectional view taken along the line 43—43 of FIGURE 42, showing the relationship of tool-retaining jaws with respect to a tool carried in the storage rack.

FIGURE 44 is a diagrammatic side elevation of a jig boring machine and tool changing mechanism, with the parts in the position assumed at the start of a tool changing cycle.

FIGURE 45 is a view projected from FIGURE 44 further illustrating the relationship of the parts at the start of the tool changing cycle.

Figure 46:
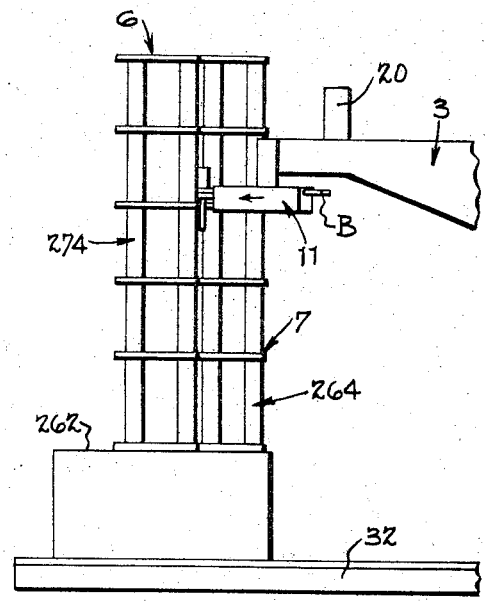

FIGURE 46 is a fragmentary diagrammatic view generally similar to FIGURE 44 but showing the rotary tool carrier shifted outwardly with respect to the arm to a pick-up position to engage a selected tool of the storage rack.

Figure 47:
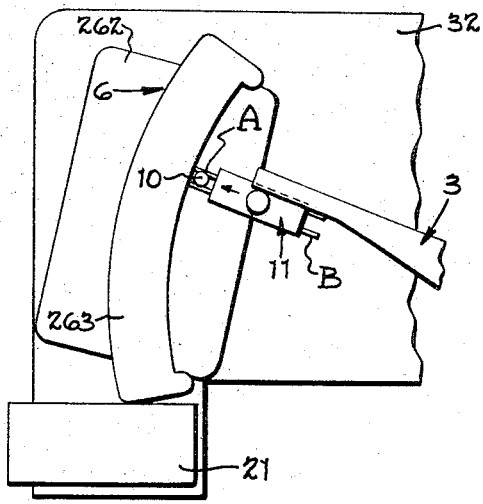

FIGURE 47 is a fragmentary top plan view, further illustrating the position of the parts in the tool pick-up position shown in FIGURE 46.

Figure 48:
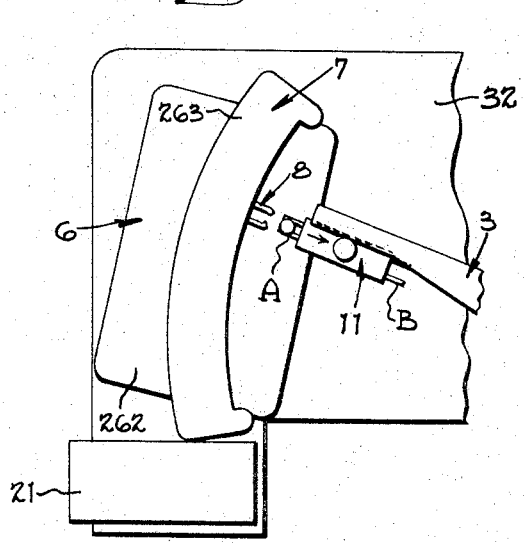

FIGURE 48 is a view similar to FIGURE 47 but showing the jaw carrier retracted relative to the arm, with the selected tool engaged in the clamping jaws thereof.

Figure 49:
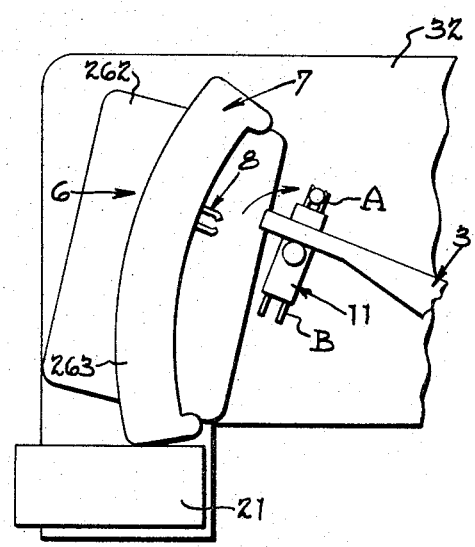

FIGURE 49 is a view similar to FIGURE 48, showing the jaw carrier in its retracted position corresponding to FIGURE 48 but pivoted relative to the arm to its tool changing position.

FIGURE 50 is a diagrammatic view generally similar to FIGURE 44, showing the tool changing arm shifted to its upper limit or reference position during the tool changing cycle.

FIGURE 51 is a top plan view generally similar to FIGURE 45, showing the tool changing arm shifted radially toward the tool spindle of the jig boring machine, with the arm in the elevated position of FIGURE 50.

FIGURE 52 is a side elevation similar to FIGURE 50 but showing the tool changing arm lowered with respect to its column to a plane below the end of the tool spindle during the tool changing cycle.

FIGURE 53 is a fragmentary top plan view further illustrating the position of the tool changing arm and rotary jaw carrier in the position corresponding to FIGURE 52, with parts in position to remove the used tool from the tool spindle.

FIGURE 54 is a view similar to FIGURE 52, with the tool changing arm shifting upwardly and with the jaws thereof open and disposed in alignment with the vertical axis of the spindle and tool, preparatory to removing the used tool from the spindle.

FIGURE 55 is a top plan view of the parts in the position shown in FIGURE 54.

FIGURE 56 is a front view similar to FIGURE 54, showing the arm and rotary jaw carrier shifted upwardly to the tool engaging position.

FIGURE 57 is a top plan view showing the tool changing arm in the tool engaging position, with the power wrench shifted into engagement with the chuck for release of the tool.

FIGURE 58 is a front elevation similar to FIGURE 56, showing the tool changing arm and jaw assembly lowered, with the used tool withdrawn from the chuck and engaged in the jaw of the carrier to be transferred back to the tool rack.

FIGURE 59 is a top plan view showing the parts in the position of FIGURE 58, with the power wrench remaining in operating position with respect to the chuck.

FIGURE 60 is a view similar to FIGURE 59, showing the jaw carrier rotated through a half turn to bring the new tool into axial alignment with the check of the tool spindle.

FIGURE 61 is a fragmentary front view, showing the parts in the position corresponding to FIGURE 60.

FIGURE 62 is a fragmentary front view similar to FIGURE 61 with the tool changing arm elevated to shift the new tool upwardly into the open chuck of the tool spindle.

Figure 63:
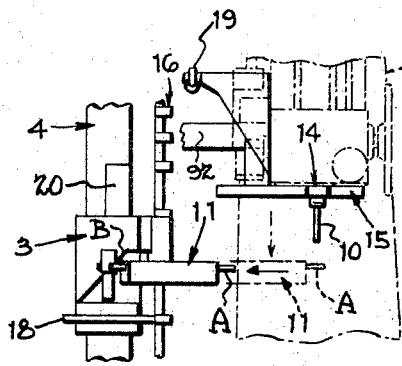

FIGURE 63 is a view similar to FIGURE 62, showing the position of the parts after the new tool has been clamped in the chuck by the power wrench, with the arm and jaw carrier lowered and pivoted radially toward the retracted position.

Figure 64:
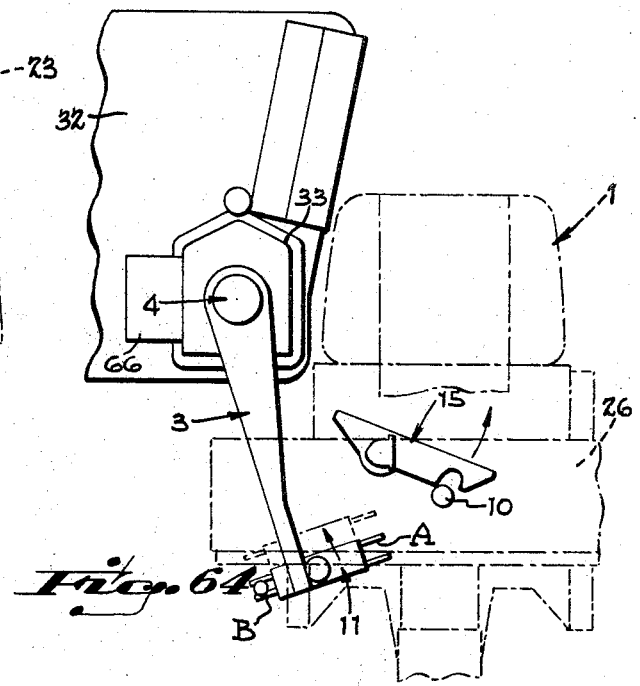

FIGURE 64 is a top plan view showing the tool changing arm swung to its retracted position corresponding to FIGURE 63, and with the power wrench retracted to its inoperative position with respect to the chuck to permit rotation of the spindle during the next machining operation.

Figure 65:
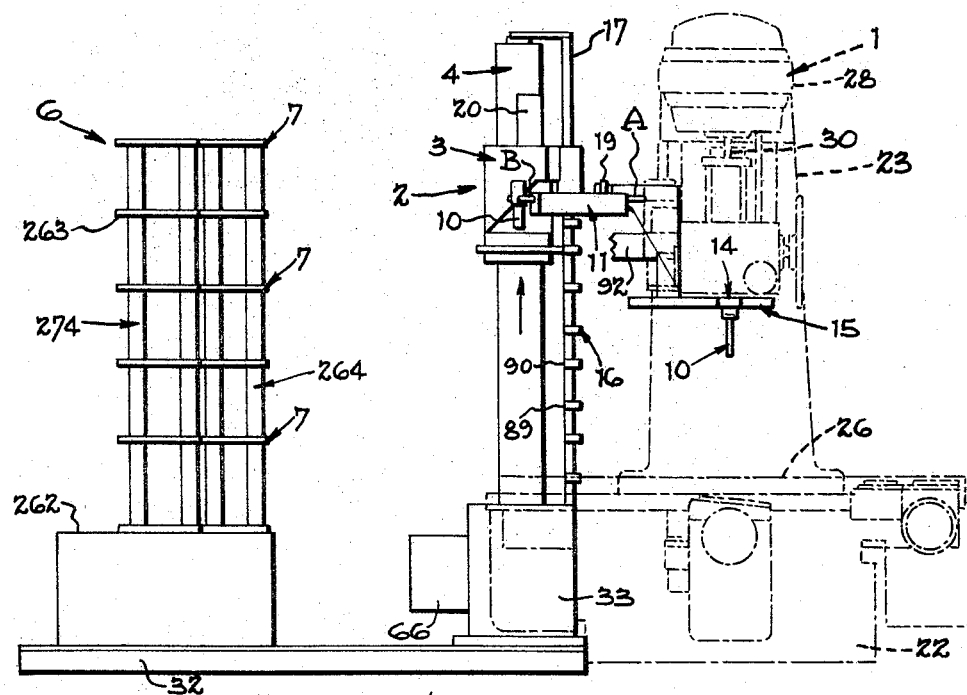

FIGURE 65 is a front elevation showing the tool changing arm shifted upwardly along its column to a plane for replacing the used tool at its proper level in the tool storage rack.

FIGURE 66 is a front elevation, showing the tool changing arm elevated to the level required for replacing the used tool in its proper set of tool-retaining jaws.

FIGURE 67 is a top plan view projected from FIGURE 66, showing the jaw carrier retracted and indexed radially to a position to replace the used tool in the predetermined retainer jaws of the tool storage rack.

FIGURE 68 is a view similar to FIGURE 67, showing the jaw carrier (in its retracted position) rotated relative to the arm to a position in alignment with the preselected set of jaws of the tool storage rack.

FIGURE 69 is a top plan view similar to FIGURE 68, showing the jaw carrier shifted forwardly to its extended position along the arm to insert the used tool into the selected jaws of the storage rack.

FIGURE 70 is a diagrammatic view illustrating the electrical control circuit of the tool changing apparatus.

FIGURE 71 is a diagrammatic view illustrating the hydraulic circuit which actuates the components of the tool changing apparatus in a response to the signals which are transmitted by the electrical control system.

FIGURE 72 is a diagram charting the sequential steps of the tool changing apparatus during a machining operation.

*General arrangement of tool changing apparatus*

As noted above, a jig boring machine has been selected as an example of a machine tool which is adapted to be operated in conjunction with the present tool changing apparatus. Referring to FIGURES 1–3, the jig boring machine is indicated generally at 1, and the tool changing apparatus, indicated generally at 2, forms an attachment which is mounted adjacent the jig boring machine for cooperation therewith. Briefly, the tool changing apparatus 2 comprises a tool changing arm, indicated generally at 3, which is mounted upon a column 4 for radial and vertical motion relative to the spindle 5 of the jig boring machine. The arrangement is such that the arm swings radially in an arc between the tool spindle 5 and the tool crib or tool storage rack, indicated generally at 6, to transfer selected tools between these two points.

In the example which is disclosed in the drawings (FIGURE 2), the tool crib is provided with five horizontal tool storage levels, indicated generally at 7, and the tool changing arm 3 is adapted to be shifted vertically along its column to preselected planes corresponding with the storage levels 7 of the tool crib. As viewed in FIGURE 3, each tool storage level 7 is provided with ten sets of tool-retaining jaws, indicated generally at 8, located at equi-distant radial points with respect to the central axis of the colmn 4, about which the tool changing arm 3 is shifted radially in the horizontal plane. In the present example, therefore, the tool crib 6 provides for the storage of a total of fifty tools for performing drilling, reaming, counter-boring and tapping operations, the tools being grouped in sets of ten at each of the five storage levels 7. Each tool is retained in a predetermined set of jaws 8, the tool changing arm 3 being arranged to be elevated to the storage level 7 of a selected tool, then indexed radially to a position in alignment with the selected tool.

Briefly, as explained later with reference to the diagrammatic views (FIGURES 44–69), the tool changing arm 3, during a tool changing cycle, shifts into alignment with the selected tool 10 of the storage rack 6 (FIGURES 44 and 45), removes the selected tool from its set of retaining jaws 8, then shifts back to the spindle 5 of the jig boring machine (FIGURES 55–59) and removes the previously used tool from the spindle. Thereafter (FIGURES 60–62), the arm inserts the new tool in the spindle, then shifts radially back to the tool storage rack and replaces the used tool in its predetermined set of jaws 8 (FIGURES 66–69).

In order to expedite the tool changing operation, the swinging end of the arm 3 is provided with a jaw carrier, indicated generally at 11 (FIGURES 2 and 3) having sets of hydraulically operated tool clamping jaws A and B projecting outwardly from its opposite ends. The jaw carrier 11 is mounted for rotary motion with respect to the swinging end of the arm so as to present the sets of jaws A and B selectively to the designated tool 10 of the storage rack or to the spindle, depending upon the radial position of the arm, as indicated in FIGURE 3.

Thus, during the tool changing cycle, one set of the jaws, for example set A is utilized to withdraw the new tool from its spring-loaded retainer jaws 8 (FIGURE 47); thereafter, the jaw carrier is rotated through its half turn (FIGURE 49), then is shifted radially with the arm 3 to the spindle (FIGURE 57) so as to bring the jaws B into engagement with the previously used tool for removal from the spindle. After removal of the used tool, the jaw carrier 11 is again indexed through its half turn (FIGURE 60) to present the new tool (which is confined in the jaws A) to the spindle to be chucked therein. After chucking the new tool in the spindle, the arm 3 swings back to a waiting position (FIGURE 45) as shown in broken lines, ready for the next tool changing cycle.

In order to permit the tools to be inserted and removed from the tool spindle 5, the spindle 5 includes a jaw-type chuck 14 (FIGURES 27 and 28) including a rotatable collar element which is rotated to clamp or unclamp the jaws, as explained later. The chuck is engaged and disengaged automatically by a power wrench, which is indicated generally at 15 (FIGURES 2 and 3). The power wrench is pivotally mounted adjacent the spindle in a position to swing in an arc relative to the chuck 14.

The power wrench 15 normally resides in an inactive disengaged position with respect to the chuck 14 (FIGURE 51) to permit spindle rotation during the machining operation. During the tool changing operation (FIGURE 57) the power wrench pivots to its active position in which its rotary wrench head element establishes wrench engagement with the rotary collar element for clamping or unclamping the chuck. The power wrench remains in chuck-engaging position to unclamp the chuck for removal of the used tool (FIGURES 57 and 58) and also to clamp the chuck upon insertion of the new tool (FIGURE 62).

In order to bring the arm 3 to its preselected plane with reference to the tool storage levels 7, there is provided a series of arm elevation sensing devices, indicated generally at 16 (FIGURE 2). The sensing devices are mounted in appropriate planes one above the other upon a vertical fixture 17 which extends parallel with the column 4. During vertical motion of the arm 3, the sensing devices 16 are successively tripped by a circular cam 18 mounted upon the portion of the arm 3 which encircles the column 4. The sensing devices 16 include switches interconnected with the control system, as explained later. The arrangement is such that the arm is stopped at preselected levels along the tool rack in an automatic manner during the tool changing cycle.

In addition to the sensing devices 16, the apparatus further includes a limit switch 19 (FIGURE 2) which is mounted upon the head of the jig boring machine, as explained later. The limit switch is adapted to be actuated during the tool changing cycle by a trip element 20 which projects upwardly from the arm 3. Thus, when the jaw assembly 11 is shifted upwardly to remove or insert a tool (FIGURE 56), the trip element 20 engages the switch 18 to stop the elevating motion of the arm, with the jaw carrier 11 at the proper plane with reference to the chuck 14 of the jig boring machine. This arrangement stops the arm at a constant predetermined level with reference to the drill head in an automatic manner.

In order to locate the jaw A or B vertically with reference to the chuck 14 during the tool changing cycle, there is provided a set of three sensing switches indicated generally at 12, which are mounted with reference to the drill head and movable therewith (FIGURE 3). These switches are tripped by a cam sector, indicated generally at 13, which projects outwardly from the arm 3 above the circular cam 18. As explained later, the sensing switches 12 are activated when the arm 3 is swung to a position beneath the drill head so as to locate the set of jaws A or B vertically with reference to the chuck 14.

It will be understood at this point, that the drill head of the jig boring machine is shifted vertically along its column to accommodate for the various planes of the workpiece which is clamped upon the table. Since the sensing switches 12 and the limit switch 19 are carried by the head, they cause the tool changing arm 3 to find its vertical position with respect to the drill head rather than with reference to a fixed level. Briefly therefore, the sensing switches 12 and the limit switch 19 cause the arm to respond automatically to the adjusted elevation of the drill head. On the other hand, the sensing switches 16, which are mounted in fixed planes, cause the arm 3 to be shifted relative to the fixed planes or levels 7 of the tool storage rack 6.

As is noted earlier, the several operations or machine functions of the jig boring machine and the operating cycle of the tool changing apparatus are coordinated by a programming system, the main components of which are mounted within the cabinets, indicated generally at 21—21 (FIGURE 1). The programming apparatus does not form an essential part of the present invention and therefore has not been disclosed in detail. This system preferably is similar to that disclosed in the aforesaid copending application of Robert N. Knosp et al., Ser. No. 786,589.

In general, the programming apparatus is of the numerical control type in which instructions or data for governing the automatic operations are initially placed upon a record medium such as a punched tape, magnetic tape, or the like, having a series or bits of information representing numbers, letters or other code signals The programming apparatus, in general, includes a scanner which reads or senses the information stored on the tape. The tape scanner decodes the bits of information carried by the tape and transforms them into electrical output signals. These signals ultimately are transmitted to an electrical power circuit which controls the various operations of the machine tool and tool changing apparatus in proper sequence with one another.

The programming system disclosed in the aforesaid application is intended to substantially eliminate idling, that is, periods during which the machine tool is shut down between operations. In this system, the instructions for one operation are read by the data scanner or reader and are stored in a memory system, while the machine tool is performing an operation in accordance with previous instructions transmitted from the tape reader. Thus, when the machine tool finishes that particular operation, the new instructions can be fed into the control system so that the next machine tool operating cycle can be initiated, thereby keeping the equipment substantially in continuous operation. As applied to the tool changing apparatus of the present invention, the programming system coordinates the tool changing operations with the operating cycles of the machine tool, as described later.

*General arrangement of jig boring machine*

As noted earlier, the tool changing apparatus of this invention is disclosed in relation to a jig boring machine which includes power-operated measuring rods for positioning the workpiece with respect to the spindle and tool of the drill head. However, it will be understood that the apparatus is intended to be utilized as an attachment for various other types of machines which utilize a plurality of cutting tools which are used interchangeably during a machining operation. The jig boring machine which has been selected to illustrate the principles of the invention is of the type shown in the patent to Robert N. Knosp, No. 2,932,088.

Generally speaking, the jig boring machine utilizes measuring rods which are selected by the tape controlled apparatus to position the workpiece in an automatic manner with respect to the drill spindle. During the operating cycle for a given hole center, the saddle and table are shifted along respective coordinates in a horizontal plane to final positions which are governed by the selected measuring rods to locate the hole center of the workpiece with respect to the central axis of the spindle and tool.

Described generally with reference to FIGURES 1–3, the jig boring machine comprises a bed 22 having a column 23 rising upwardly from its rearward side. A drill head 24 is slidably mounted upon the column 23 above the bed for vertical adjustment and includes the spindle, previously indicated at 5, which projects downwardly from the head toward the bed of the machine. The top of the bed 22 is provided with transverse ways (not shown) which slidably support a saddle or cross slide 25 for transverse motion across the bed relative to the column 23. The upper surface of the saddle 25 includes longitudinal ways (not shown) upon which is slidably mounted a work table 26. The workpiece 27 (FIGURE 1) is clamped upon the table and is shifted with respect to the spindle 5 by the combined transverse and longitudinal motions of the saddle 25 and table 26.

The spindle 5 is rotated by a spindle motor (not shown) mounted upon the upper portion of the column and in driving connection with a speed change transmission unit 28 (FIGURE 1) mounted at the top of the column. The spindle is driven by a splined shaft 30 which projects downwardly from the transmission unit 28 and in slidable driving connection with the spindle 5 which is journalled in the drill head 24. The drill head may be adjusted vertically with reference to the column by operation of a hand wheel 31, which is manually operated in initially setting up the machine for a given workpiece. The drill head is also shifted vertically under tape control, as noted below, to compensate for changes in the plane of the workpiece 27.

The axial spindle and quill travel is limited by the length of the quill and, in certain cases, operation of the machine will require shifting of the drill head relative to the workpiece in an automatic manner. For example, a given workpiece may include planes which are displaced vertically relative to one another over distances greater than the range of spindle and quill travel. In the present example, the drill head 24 may be provided with an apparatus, including suitable gauges, for shifting the drill head to predetermined elevations along the column in an automatic manner to compensate for the various planes of the workpiece. An automatic head positioning apparatus of this type as disclosed in the copending application of Robert N. Knosp, Ser. No. 135,879, to which attention is invited.

During a given machining operation, the tool spindle 5 is rotated at a preselected spindle speed by the variable speed transmission unit 28. The rotating spindle 5 is fed downwardly with respect to the drill head 24 at a feed rate which is provided by a variable spindle feed transmission, which is disposed within the drill head 24. The spindle speed and spindle feed rates are selected by the programming apparatus for each given operating cycle. After each operation, the spindle (with its cutting tool) is retracted from the workpiece to a starting position, adapting the saddle and table to be shifted along their respective coordinates to locate the workpiece relative to the spindle axis for the next operation.

Described generally (FIGURES 1–3), the saddle 25 and table 26 are each provided with motor-driven positioning apparatus (not shown) by means of which the saddle and table are shifted along their respective ways with extreme precision. The positioning apparatus is duplicated for the saddle and table, and each positioning apparatus coacts with respective, automatically selected measuring rods (not shown) which determine the final position of the saddle and table.

In order to compensate for the length of the various tools which are inserted in the spindle chuck 14 during the various operating cycles, the drill head may be provided with a tool length compensating mechanism (not shown) as disclosed in the copending application of Robert N. Knosp et al., Ser. No. 51,023. The compensating apparatus is arranged to control axial spindle motion in accordance with the length of the tool to provide more efficient operation. In other words, this apparatus, in response to the length of a given tool, causes the spindle to be shifted downwardly at a traverse rate until the end of the tool approaches the work surface. At this point, the apparatus conditions the spindle feed transmission to advance the spindle at the relatively slow feed rate until the full depth of the hole is reached. Thereafter, the tool length compensating apparatus conditions the feed transmission to retract the spindle and its tool back to the starting point at the rapid traverse rate, ready for the next operation.

From the foregoing, it will be understood that in operating the jig boring machine through an operating cycle, a number of machine functions must be controlled by the programming apparatus in coordination with the functions of the tool changing apparatus. By way of example, in order to bore a hole of predetermined size in a predetermined position in the workpiece, the saddle or cross slide 25 must be positioned transversely relative to the spindle (within a tolerance of plus or minus .0001″ in a jig boring operation), the table must be positioned along its coordinate with the same degree of precision; also, the rate of spindle feed, the depth of spindle feed, and the rate of spindle rotation must be controlled. In addition, if the jig boring machine is equipped with the automatic head positioning apparatus and automatic spindle control apparatus, then these two machine functions must also be controlled in coordination with the other functions.

Briefly therefore, in the present example, the programming apparatus may be arranged to control the several machine functions, outlined above, in a predetermined order in coordination with the tool changing mechanism. On the other hand, if the equipment so requires, the programming apparatus may be arranged to automatically control several but not all of the machine functions or tool changing operations.

*Tool changing column*

As best shown in FIGURE 2, the tool changing column 4 and the tool crib or storage rack 6 are both mounted upon a base plate 32, which maintains the two components in accurately spaced relationship to one another. The base plate 32, in turn, is located accurately with respect to the bed 22 of the jig boring machine in order to bring the tool change jaw carrier 11 into accurate registry with the spindle 5 of the machine during the tool changing cycle. It will be understood at this point, that when utilized as an attachment for a machine tool having a horizontal spindle, then the column 4 and tool crib 6 are disposed in horizontal planes parallel with the axis of the horizontal spindle.

Described in detail with reference to FIGURES 11–14, the tool changing column 4 is in the form of a tube having its lower end portion journalled for rotary motion in a housing 33, which comprises a casting bolted to the base plate 32 (FIGURE 2). The lower portion of the housing 33 (FIGURE 13) includes a socket 34 having a tapered roller thrust bearing 35 rotatably engaging the lower end portion of the column 4. The outer race of the roller bearing 35 is confined between a shoulder 36 and a retainer ring 37, which is attached by screws to the lower portion of socket 34. The inner race of bearing 35 is engaged by a bearing plate 38 attached by screws to the lower end of the column 4.

The upper portion of the housing 33 includes a second socket 40 in which is seated the upper roller bearing 41 located in a plane spaced above the roller bearing 35 to impart stability to the column 4. The upper bearing 41 is also of the roller thrust type, the taper being opposed to the lower bearing in order to regulate the running clearance. For this purpose, the outer race of the upper bearing 41 is seated against the bottom of the socket 40 while the inner race is spaced above the shoulder and is forced downwardly by means of an adjustment ring indicated at 42, which encircles the column.

In order to index the arm 3 radially between the tool storage rack 6 and spindle 5 during the tool changing cycle, the housing 33 (FIGURES 11 and 13) includes a hydraulic arm indexing motor 43 having a pinion 44 meshing with an indexing gear 45 which is keyed to the column. As best shown in FIGURE 13, the pinion 44 is formed on a stub shaft 46 which is keyed to the shaft 47 of motor 43. The upper and lower portions of the stub shaft 43 are journalled in respective ball bearings indicated at 48—48. The motor 43 is reversible and is arranged to index the column (and the tool changing arm 3) between the spindle 5 and tool storage rack 6 during the tool changing cycles, as indicated in FIGURE 3. The indexing gear 45 is keyed to the column as at 51.

Immediately above the gear 45, there is provided an indexing plate 52 which is connected to the column by the key 51. The indexing plate 52 is provided with radially disposed sockets for positioning and locking the column and arm in selected radial positions. Thus, as viewed in FIGURE 3, the arm 3 is indexed to ten radial positions with respect to the tool storage rack for tool selection and is also indexed with respect to the spindle 5.

In order to locate the arm accurately, there is provided one indexing socket for each radial arm position, the sockets of the indexing plate 52 being engaged by hydraulically operated shot bolts to lock the column and arm accurately in each selected position, as explained below. As indicated by the broken lines in FIGURE 3, the sockets are located at approximately 5° apart radially about the tool storage rack in the present example, requiring the column and arm to be indexed to corresponding angles.

As viewed in FIGURE 13, the sockets, indicated at 53 and 54, are located in two levels around the indexing plate 52. This arrangement is necessary in order to index the arm to the relatively close radial positions with respect to the tool storage rack. By placing the sockets 53 and 54 in two planes, the sockets in each plane are located at centers 10° apart from one another to avoid interference.

As viewed in FIGURES 11 and 12, there is provided two hydraulically operated shot bolt assemblies, indicated generally at 55 and 56. These shot bolt assemblies are located in horizontal planes one above the other corresponding with the planes of the sockets 53 and 54. Each assembly comprises a hydraulic cylinder 57 having a flange 58 at its outer end which is attached directly to the housing 33 of the column. Each cylinder includes a piston (not shown) having a piston rod 60 projecting outwardly through the flange 58. A shot bolt 61 is attached to the end of each piston rod in a position to be extended or retracted with respect to the sets of sockets 53 or 54. Thus, as shown in FIGURE 12, the lower shot bolt 61 is adapted to engage the lower set of sockets 54 and the upper shot bolt is adapted to engage the upper set of sockets 53.

In order to facilitate engagement of the shot bolts and to locate the arm precisely, the outer portion of each shot bolt 61 is tapered as at 62 (FIGURE 12). Each socket 53 and 54 is provided with a bushing 59 having a tapered bore corresponding to the tapered end portion 62 of the shot bolt. As the shot bolt shifts forwardly from the retracted position of FIGURE 12, its tapered portion, coacting with the tapered bore of the socket, shifts the column and arm slightly (if necessary) to compensate for any error in the initial arm position as determined by the indexing motor 43.

The operation of the shot bolt assemblies 55 and 56 are regulated by the electrical control system, as explained later. In order to provide the desired sequence of operation, the shot bolt assemblies are arranged to transmit an electrical feedback signal to the control system when the respective shot bolts 61—61 have been extended or retracted. In order to transmit these feedback signals to the control system, the piston rod 60 of each shot bolt assembly projects outwardly from the rearward end of the cylinders 57—57 (FIGURES 11 and 12), each piston rod includes a trip arm 63 adapted to operate respective pairs of sensing switches indicated at 64 and 65, comprising retract switches 65—65 and advance limit switches 64—64. The cylinders 57—57 and the respective pairs of limit switches 64 and 65 are enclosed in a casing 66 which is bolted to one side of the column housing 33. The casing 66 includes a removable cover plate 67 for access to the switches and cylinders. The pairs of limit switches 64 and 65 are each mounted upon a bracket 68 which is attached to the wall of the casing 66 at opposite sides. Each limit switch includes an actuating arm 70 having a roller 71 at its swinging end which is engaged by the associated trip arm 63 at the limit of motion of the shot bolt 61. In the position of the parts shown in FIGURES 11 and 12, the retract limit switches 65—65 are engaged by the trip arms 63—63 of the two cylinders 57—57, thus transmitting a signal to the control system that the shot bolts are retracted. This conditions the control system to energize the hydraulic indexing motor 43 to index the column and arm radially to a selected position.

After the column has been rotated to the selected radial position by operation of the indexing motor 43 a feedback signal is sent to the control system, indicating that the selected arm position has been reached. This signal is transmitted by means of a commutator ring, indicated generally at 72 (FIGURE 14) which is mounted in the column housing 33 concentric with the column. The commutator ring 72 is formed of dielectric material and includes a series of contact sectors 73 corresponding to the radial positions of the arm 3. The final radial position of the arm with reference to the spindle is determined by a series of limit switches mounted at the top of the column, as explained later.

The sectors are traversed by a brush 74 which is mounted upon a ring 75 attached to the column and movable therewith. Thus, when the arm is shifted radially to its selected position, the commutator transmits a feedback signal to the control system indicating that the arm has been indexed. At this point, the control system causes the shot bolt assemblies 55 and 56 to shift the shot bolts 61 forwardly into engagement with the socket 53 or 54, which corresponds to the radial arm position. The tapered end portion of the shot bolt brings the arm precisely into alignment with the selected set of tool retaining jaws 8 to compensate for any error in the arm position provided by the commutator 72 and its brush 74.

Upon being shifted to the extended position, the trip arms 63 of the shot bolt engages the trip arm 70 of the advance limit switch 64. Upon being energized, the advance limit switch 64 transmits a signal to the control system indicating that the arm is precisely located and latched in its selected position. This signal causes the control circuit to initiate the next cycle of operation in the predetermined sequence.

The rotary limit switches 76–81, which indicate and monitor the radial position of the arm, are mounted in a stationary position upon a bracket 82 (FIGURES 15, 18 and 19) which is secured to the horizontal arm 83 above the column. Each switch is provided with an arm and roller 84 projecting outwardly toward the actuating cams 85, which are arranged to trip the individual switches. The cams are mounted upon a ring 86 secured to the top of the column so as to rotate with the column as the arm is shifted radially with respect to the spindle. The cams are arranged to trip the switches, thereby to transmit a signal back to the control system to indicate the radial position of the arm relative to the spindle 5 and tool crib 6. In addition, these switches cause operation of the arm rotary shot bolts 55 or 56 to latch the arm in its several rotary positions, as explained later with reference to the electrical circuit.

Tool changing arm

As noted earlier, the tool changing arm 3 is mounted for vertical motion along the column 4 and is shifted vertically along the column during the tool changing cycle (FIGURES 4 and 6). In the present example, the arm is shifted vertically with respect to the five levels of the tool storage rack 6 and is also shifted vertically with reference to the chuck of the tool spindle. As the arm 3 is shifted along the column, it trips the stationary sensing devices 16 (FIGURE 2) mounted along the vertical fixture 17, which parallels the column 4. These switches transmit signals to the control system which is arranged to slow down and stop the arm when it reaches a preselected elevation along the column.

It will be understood at this point, that the sensing devices 16 monitor the elevation of the arm with respect to the levels 7 of the tool storage rack to slow the arm and to stop it at the proper level. In the present disclosure, the tool storage rack 6 comprises five levels. Five of the vertical sensing switches 16, which are indicated 89, are arranged to stop the arm elevating motors 87 at the preselected level. The intermediate sensing devices 16, indicated at 90, slow the motion of the arm as it approaches the selected level 7 of the tool rack. It will be understood that the sensing devices 89 and 90 (indicated generally at 16) are of duplicate construction, as described later.

The vertical shot bolt 88 (FIGURE 4), as explained later, latches the arm and positions it at the preselected level. In addition, there is provided a series of slow-down switches 90 (FIGURE 2), which are interposed between the level sensing devices 89. The slow-down switches 90 are also stripped by the cam collar 18 as the arm is shifted vertically.

During the arm elevating or lowering operation, the arm elevator motors 87 are driven at a rate which provides rapid traverse vertical arm motion. However, as the arm approaches its final position with reference to the preselected tool storage level 7, the cam collar 18 trips one of the slow-down switches 90 adjacent the appropriate final limit switch 89. Upon being tripped, the slow-down switch 90 transmits a signal to the control apparatus which causes the hydraulic system to reduce the flow of hydraulic fluid from the rapid traverse rate to a relatively slow feed rate. The hydraulic system then continues to shift the arm toward the selected tool level 7 at the feed rate until the designated stationary final limit sensing switch 89 is tripped. At this point, the elevating motors 87 are decommissioned and the vertical shot bolt 88 is shifted into engagement with the rack 91 of column 4 (FIGURE 6) to lock the arm in its selected plane with reference to the levels 7 of the tool storage rack.

In order to position the arm vertically with respect to the shiftable drill head, as noted above, the set of vertically shiftable level sensing switches, indicated generally at 12 in FIGURES 2 and 3, are mounted upon the horizontal bracket 92, which extends from the drill head 24. The vertical position of the arm is thus controlled with reference to the drill head even though the level of the drill head may be varied to accommodate the planes of the workpiece. The switches 12 are inoperative when the arm is shifted radially to its tool selecting position C (FIGURE 45) with reference to the tool storage rack 6. The switches 12 are operative only when the arm is swung to its waiting position, as indicated at D in FIGURES 3 and 45, or in a position E below the drill head (FIGURES 54 and 55).

As noted earlier, the arm includes the cam sector 13 (FIGURES 2 and 15) which trips the shiftable level sensing switches 12 when the arm is leveled with reference to the head 24. As shown in FIGURE 3, the cam segment 13 resides in alignment with the shiftable sensing switches 12 only when the arm is shifted radially to its waiting position D (FIGURE 3) or to its position E in alignment with the axis of the spindle (FIGURES 54 and 55).

In summary, the stationary arm elevation switches or sensing devices 16 (stationary slow-down switches 90 and final limit switches 89) locate the arm vertically with reference to the levels 7 of the tool storage rack 6 (FIGURE 2). The radial position of the arm 3 with reference to the tools 10 in the storage rack 6 is determined by the commutator ring 72 at the base of the column (FIGURES 13 and 14). The radial position of the arm with respect to the spindle is regulated by the limit switches 76–81 (FIGURES 18 and 19). The vertical position of the arm 3 and jaw carrier 11 with reference to the head is regulated by the shiftable level sensing switches 12 (FIGURE 2), which are carried by the drill head 24, so as to compensate for the vertical position of the arm with reference to the head which, as noted earlier, is arranged to be shifted vertically in accordance with the planes of the workpiece. The final position of the arm 3 and jaw carrier 11 with reference to the head 24 during tool interchange is monitored by the final limit switch 19, which is carried by the head 24 and tripped by the element 20 of the arm 3. The operation of the several switches and coacting components is described later in greater detail with reference to the circuit diagram (FIGURE 72), the sequence diagram (FIGURE 82) and the hydraulic circuit (FIGURE 71).

As best shown in FIGURES 4 and 6, the arm 3 comprises a hollow box-like casting, indicated generally at 93, which includes a sleeve portion 94 which slidably embraces the column 4 for vertical motion. In order to key the arm to the column for indexing motion therewith, one side of the column is provided with a flat 95, and the sleeve portion of the arm is provided with a bearing plate 96 bolted to the sleeve and slidably engaging the flat 95. In order to accommodate the bearing plate, the sleeve 94 includes an opening 97 in which the bearing plate 96 is seated.

As noted earlier, the arm 3 is raised and lowered along the column by the hydraulic arm elevating motors 87—87 each having a flange 98 which is bolted to the arm on opposite sides. The shafts of the tandem motors are keyed to the opposite ends of a pinion shaft 100, which includes a pinion 101 meshing with the rack 91, as noted earlier. As best shown in FIGURE 6, the pinion shaft 100 is journalled in ball bearings 102—102 seated in the arm casting 93 and located on opposite sides of the pinion 101. The rack 91 is seated in a longitudinal slot 103 formed in the column, the rack being secured to the column by means of screws (not shown). The hydraulic motors 87 are reversible and operate to raise or lower the arm along the column in response to the control system, as explained later.

In order to protect the bearing surfaces of the column 4 and sleeve 94, there is provided an accordion type collapsible bellows, comprising an upper section 104 (FIGURE 4) and a lower section 105, which surrounds the column. The upper end of bellows section 104 is attached to the ring 86 carried by a closure plate 106 at the top of the column. The lower end of section 104 is attached to the top of the sleeve 94. The upper end of the bellows section 105 is attached to the lower end of the arm sleeve 94 (FIGURE 4) and its lower end is attached to the closure plate 107 of the column housing 33 (FIGURE 13). The plate 107 includes a seal ring 108 embracing the column to protect the components within the housing from dust and dirt.

In order to counterbalance the weight load of the arm 3, there is provided a counterweight 110 (FIGURE 15) connected by a sprocket chain 111 to the arm. The counterweight 110 is disposed within the tubular column 4 and the chain 111 passes through a collar 112 mounted in the top plate 106 of the column in a position concentric with the axis of the column. The collar 112 provides an anchor for the vertical fixture 17 to hold the fixture accurately in spaced parallel relationship to the column 4 for actuation of the sensing switches 16 by the arm cam 18.

For this purpose, the collar 112 is journalled in a ball bearing 113 which is journalled in a fitting 114 attached to the top plate 106 of the column (FIGURE 15). A horizontal spacer plate 115 extends between the collar 112 and the vertical fixture 17, the plate 115 having an aperture at its outer end slipped upon the collar 112 and clamped thereto by a nut 116. The opposite end of the spacer plate 115 is attached as at 117 to the upper end of the fixture 17, the bracket 83 being similarly attached to the fixture 17. The lower end of the vertical fixture 17 is anchored by a bracket 118 (FIGURE 17) which is attached to the housing 33 of the column. By virtue of this arrangement, the arm and column are free to rotate relative to the vertical switch mounting fixture 17, with its stationary level sensing devices 16 maintained accurately in alignment with the column to be actuated by the circular cam 18 of the arm, as indicated previously in FIGURE 2.

As best shown in FIGURE 15, the sprocket chain 111 is attached as at 120 to the counterweight 110 and passes upwardly through the collar 112 then vertically across a pair of idler sprockets 121—121. The sprockets 121 are journalled in a pair of horizontal bearing plates 122 which are supported by a vertical bracket 123 rising upwardly from the closure plate 106 of the column. The outer end of the chain 111, which depends downwardly from the sprocket 121, is attached as at 124 to the top of the arm 3.

As noted earlier, the stationary sensing devices 16 (switches 89 and 90—FIGURE 15) are tripped by the circular cam 18 which is attached to the sleeve portion 94 of the arm casting 93. The shiftable sensing switches 12, which control the vertical position of the arm 3 with respect to the drill head 24, are similar to the sensing devices 16. As noted earlier, the shiftable sensing devices 12 are mounted upon the bracket 92 extending from the drill head 24 and are tripped by the cam sector 13, which is attached to the upper portion of the arm. The following description of the sensing devices 16 also applies to the sensing devices 12.

Each sensing device 16 comprises a mounting block 125 (FIGURES 15-17) having flanges 126—126 projecting outwardly from opposite sides. The vertical fixture 17 comprises a channel-shaped rail 127 having a pair of flanges 128—128 which are spaced apart from one another. Each sensing device 16 is clamped at its adjusted level by a clamping plate 130 engaged by screws 131 passing through the flanges 126 of the mounting block 125, between the spaced flanges 128 and into threaded engagement with the clamping plate 130.

Each mounting block 125 includes a cylindrical bore having a plunger 132 slidably mounted within the bore (FIGURE 15). A compression spring 133 seated against a cap 134 engages the head 135 of the plunger 132. The head of the plunger engages a ball 136 which is confined as at 137 within the cylindrical bore of the mounting block 125. Upon vertical movement of the arm 3, its circular cam 18 engages and forces the ball 136 outwardly to actuate the electrical switch 138 of the sensing device, as explained below.

Each sensing device 16 includes a mounting bracket 140 (FIGURE 15) projecting upwardly from the mounting block 125 and supporting the switch 138. The plunger of switch 138 is actuated by an arm 141 pivotally connected as at 142 to a pivot to a bracket arm 143 projecting from the mounting bracket 140. The lower swinging end of arm 141 includes a roller 144 which engages the outer end of the plunger 132. During vertical motion of the arm relative to the levels of the tool storage rack 6, the circular cam 18 provides a camming action with respect to the balls 136, thus tripping the stationary sensing devices (limit switches 89 and slow-down switches 90) in sequence. Each sensing device 16 is arranged to transmit a feedback signal to the control system to slow down and decommission the arm elevating motors 87—87 when the arm reaches a predetermined elevation, as determined be a given sensing device 16. As explained later with reference to the electrical circuit, the slow-down switches 90 reduce the speed of vertical arm movement as the arm approaches a preselected level, while the final limit switches 89 stop the arm at the preselected tool level 7, as monitored by the control system.

As noted earlier in (FIGURE 4) the arm 3 is provided with a hydraulically operated shot bolt mechanism, indicated generally at 88, which is adapted to lock the arm in a positive manner at its selected elevation when the arm elevating motors 87 are decommissioned by the selected sensing device 89. In locking the arm, the shot bolt mechanism also aligns the arm precisely at its selected level. As explained earlier, the arm must be positioned accurately with respect to the several levels 7 of the tool storage rack 6 and also with respect to the chuck 14 of the spindle 5 during the tool interchange cycle.

Described in detail (FIGURE 4), the shot bolt mechanism 88 comprises a hydraulic cylinder 145 which is bolted to the sleeve portion 94 of the arm 3 beneath the arm casting 93. The sleeve portion 94 includes a bore having a bushing 146 in which is slidably confined the shot bolt 147. The cylinder 145 includes a piston (not shown) having a piston rod 148 which is attached to the shot bolt 147. The shot bolt 147 includes a tapered nose portion 150 which is adapted to be shifted into engagement with the teeth of the rack 91 when the shot bolt is shifted to its extended locking position, as shown in FIGURE 4. During the vertical motion of the arm along the column, the cylinder 145 shifts the shot bolt 147 to a disengaged or retracted position with respect to the teeth of rack 91. The operation of the shot bolt cylinder 145 is regulated by the control system, as explained later.

The shot bolt mechanism 145 is provided with two limit switches 151 and 152, the switches being attached to a mounting plate 153 projecting from the sleeve portion 94 below the shot bolt mechanism. An actuating finger 154 projects downwardly from the shot bolt 147 in a position to actuate the plungers of the switches 151 and 152. The limit switches 151 and 152 are interconnected with the control system and are arranged to transmit a signal when the shot bolt is fully extended into engagement with the rack 91 (switch 151) and to transmit a second signal when the shot bolt is fully retracted (switch 152).

Briefly therefore, the control system is conditioned to energize the elevating motors 87—87 only when the shot bolt is fully retracted in response to a feedback signal from switch 152. After the arm is shifted to its selected elevation, the shot bolt 147 is shifted to its extended locking position in response to a signal from the control system. When the shot bolt is fully extended (FIGURE 4) to its locking position, the signal from limit switch 151 conditions the apparatus for the next operation in the cycle.

*Shiftable jaw carrier*

As explained earlier with reference to the diagrammatic views (FIGURES 44-69) the jaw carrier 11 is mounted for bodily linear motion with respect to the arm and also for rotary motion in the horizontal plane during the tool changing cycle. These motions are imparted to the carrier by means of hydraulic cylinders through operation of the control system.

Described with reference to FIGURES 4–6, the tool carrier 11 is supported by a carrier spindle 155 which is journalled for rotary motion in a bearing sleeve 156 attached to a slide plate 157, as explained later. The slide plate 157 is mounted for sliding motion in a horizontal plane in a slide bearing, indicated generally at 158, disposed at the end portion of the arm 3. As viewed in FIGURE 5, the slide bearing 158 includes a pair of opposed V-shaped slide rails 160–160, and the slide plate 157 includes pairs of bearing blocks 161–161 in sliding engagement with the V-shaped slide rails 160. The bearing sleeve 156 is mounted on the slide plate 157, adapting the jaw carrier 11 to be shifted to an advanced or retracted position along the arm.

The slide plate 157 and jaw carrier 11 are shifted as a unit by a hydraulic cylinder 162 (FIGURES 4 and 6) which is mounted within the arm 3. The cylinder includes a piston (not shown) having a piston rod 163 projecting outwardly and attached as at 164 to the slide plate 157 of the jaw carrier 11. Piston rod 163 includes a threaded portion having pairs of stop nuts 165—165 threaded thereon and locked in adjusted position. The rearward nuts 165 engage a transverse wall 166 of the arm in the retracted position (FIGURE 4) of the jaw carrier. The forward pair of nuts 165 engage the transverse wall 167 of the arm in the advanced position of the slide plate and jaw carrier, thereby to position the jaws accurately with respect to the tool storage rack and spindle chuck.

As indicated in FIGURES 4 and 6, respective limit switches 168 and 170 are mounted within the arm casting 93 adjacent the piston rod 163. A trip element 171 is clamped on the piston rod between one pair of nuts 165 in a position to engage the plungers of the limit switches 168 and 170 at the respective limits of travel of the jaw carrier 11. The limit switches are interconnected with the control system and transmit signals to the system to indicate the two positions of the carrier.

The carrier 11 is shown in full lines in its retracted position in FIGURES 4 and 6, corresponding to the tool pick-up position shown diagrammatically in FIGURES 44 and 45. In this position the jaws A of carrier 11 are disposed in alignment with a new tool 10 of the storage rack 6. At the start of the tool pick-up motion, cylinder 162 shifts the carrier to the advanced position, shown in broken lines in FIGURE 6, and the jaws A are actuated to engage the tool (FIGURES 46 and 47). After engaging the tool, cylinder 162 retracts the carrier 11 back to the position shown in FIGURES 6 and 48. Upon being retracted, the carrier 11 is rotated through an angle of 90°, with the tool engaged in its jaws A (FIGURE 49). This rotary motion is imparted to the jaw carrier 11 by a hydraulic indexing cylinder 172 (FIGURES 4–6).

As shown in these views, the slide plate 157 includes a pair of brackets 173 and 174 projecting outwardly therefrom. The bearing sleeve 156 includes a rack housing 175 extending at right angles to the bearing sleeve 156. The horizontal rack housing 175 is generally cylindrical and is mounted between the brackets 173 and 174 of the slide plate, thus supporting the sleeve 156 and jaw carrier 11. The hydraulic indexing cylinder 172 projects outwardly from the bracket 173 and is attached to the end of the horizontal rack housing 175.

As viewed in FIGURES 4–6 and 25 the piston rod (not shown) of the indexing cylinder includes a rack 176 which is slidably confined within the rack housing 175. The teeth of rack 176 mesh with a pinion 177 which forms a part of the spindle 155. Reciprocation of the rack 176 thus imparts rotary motion to the spindle 155 and jaw carrier 11. The spindle 155 is rotatably journalled within the bearing sleeve 156 by a pair of opposed thrust bearings 178— 178. The lower portion of the carrier spindle 155 includes a mounting flange 180 which is secured by bolts to the housing of jaw carrier 11. As explained later, the carrier 11 includes a pair of hydraulic cylinders 181 and 182 (FIGURE 22) for actuating the tool clamping jaws A and B.

The fluid pressure for operating the hydraulic arm elevating motors 87, the carrier shifter cylinder 162, the hydraulic carrier indexing cylinder 172, and the jaw clamping cylinders 181 and 182 is supplied by flexible conduits. As shown generally in FIGURE 1, these conduits from a bundle depending from the upper end of the column and enclosed in a cover 183. As explained later in detail, the carrier spindle 155 acts as a swivel joint and includes internal passageways which provide hydraulic communication with the jaw cylinders 181 and 182, while permitting rotary carrier motion.

As shown in FIGURES 9 and 10, the upper end of the bearing sleeve 156 includes a switch housing 184 in which is mounted a group of four limit switches, indicated at 185. These switches are tripped by individual cams mounted for rotation with the carrier spindle 155, as explained below. The switches 185 are arranged to transmit signals to the control system when the jaw carrier 11 has been rotated to a selected indexed position so as to condition the control system for the next sequential operation.

For actuating the electrical components, the carrier spindle 155 includes a coaxial shaft 186 (FIGURES 4 and 10) having a base flange 187 attached to the upper end of carrier spindle 155 and projecting into the switch housing 184. In the present example, four switch actuating cams 188 are mounted one above the other on shaft 186, each cam having a lobe 190 adapted to trip the plunger 191 of its associated limit switch 185. The lobes 190 are located at 90° with respect to the axis of shaft 186, corresponding with the four rotary positions to which the carrier 11 is rotated.

In addition to the limit switches 185, the upper portion of the shaft 186 is provided with electrical slip rings 192, in the present instance five in number (FIGURES 9 and 10). Each slip ring 192 is engaged by a respective springloaded brush 193 having its outer end mounted upon an insulating block 194 attached to the wall of switch housing 184. The slip rings are carried upon an insulating sleeve 195 which is mounted upon the upper portion of the shaft 186. The purpose of this arrangement is to complete an electrical circuit to the sets of limit switches 196 and 197 of the jaw clamping cylinders 181 and 182 (FIGURES 21 and 22), which are described later.

It will be noted in FIGURES 4, 9, 10 and 25, that the carrier spindle 155 and the shaft 186 are provided with an axial bore 198. The electrical cables leading from the sets of limit switches 196 and 197 pass upwardly through the bore 198 and into an electrical connection with the slip rings 192. The brushes 193, which engage the individual slip rings, are interconnected with the control system. The slip ring and brush arrangement thus completes the electrical circuit from the limit switches 196 and 197 to the control system, while adapting the spindle 155 and jaw carrier 11 to be rotated to the indexing positions.

In order to lock the jaw carrier 11 accurately in its four indexed positions, there is provided a hydraulically operated shot bolt assembly, indicated generally at 200 (FIGURES 7 and 8). The shot bolt assembly 200 is mounted within a housing 201 which projects laterally from the bearing sleeve 156.

A hydraulic shot bolt cylinder 202 is mounted within the housing 201 and includes a piston (not shown) having a piston rod 203 projecting outwardly from its lower end (FIGURES 7 and 8). A shot bolt 204 is mounted upon the threaded end 205 of piston rod 203. The shot bolt is slidably confined in a bushing 206 mounted in a boss which forms a part of the housing 201. The lower end of shot bolt 204 is tapered as at 207 and is adapted to project into a series of shot bolt sockets 208, which are seated in the mounting flange 180 of the carrier spindle 155. As viewed in FIGURE 26, the flange 180 is provided with four shot bolt sockets 208 located at 90° apart corresponding to the four rotary positions to which the jaw carrier 11 is shifted.

The shot bolt assembly 200 includes a pair of limit switches 210 and 211 each having an actuating arm 212 projecting outwardly therefrom. The upper portion of the shot bolt 204 includes a finger 213 which projects laterally for engagement with the arms 212 of the limit switches. Since the switch housing 201 remains stationary during the indexing motion of jaw carrier 11, the electrical conduits from the limit switches 210 and 211 pass outwardly from housing 201 without utilizing slip rings, as described earlier (FIGURES 9 and 10). When the jaw carrier 11 is locked in its indexed position (FIGURES 7 and 8), the lower limit switch 211 is tripped to transmit a signal to the control system to indicate that the carrier 11 is locked. When the shot bolt is shifted to its disengaged position, the finger 213 trips the limit switch 210, as shown in broken lines, thereby to signal the control system that the jaw carrier is unlocked and free to be rotated.

*Carrier jaws*

As noted earlier, the carrier spindle 155 (FIGURE 4) acts as a swivel joint for supplying and exhausting hydraulic fluid pressure with respect to the jaw clamping cylinders 181 and 182 by way of its passageway system. Described in detail with reference to FIGURES 25 and 26, the carrier spindle 155 is provided with four annular passageways 214 formed in the periphery thereof, each passageway communicating with a respective port 215 formed in the bearing sleeve 156. The external hydraulic conduits 216–220 (FIGURE 25) are connected with the respective ports 215 so as to supply and exhaust fluid pressure with respect to the annular passageways 214. In order to prevent leakage, the periphery of the spindle 155 includes annular grooves disposed between the annular passageways 214, each groove confining a seal ring 221 which establishes a hydraulic seal between the spindle and sleeve. In addition to the seal rings 221, a seal ring 222 is interposed between the sleeve and spindle immediately above the flange 180 of the spindle.

The spindle 155 includes a set of four longitudinal passageways 223 spaced around the axial bore 198, each longitudinal passageway 223 extending downwardly through the flange 180. As explained below, the jaw carrier 11 includes respective conduits connecting the longitudinal passageways 223 with the opposite ends of the jaw cylinders 181 and 182 for supplying hydraulic pressure to the cylinders (FIGURE 22).

As noted earlier, the pairs of jaws A and B of the carrier 11 are actuated by the hydraulic cylinders 181 and 182 (FIGURES 20–24). The carrier 11 comprises a box-like casting 224 of generally rectangular configuration as viewed from above (FIGURE 20). The top surface of casting 224 includes a cover plate 225 which is recessed as at 226 to receive the mounting flange 180 of the carrier spindle 155, thereby to support the carrier. The recessed portion includes tapped holes 227 to receive the mounting screws which attach the flange 180 to the carrier. In addition, the recess includes a set of four holes 228 (FIGURE 20) which register with the longitudinal passageways 223 of spindle 155 (FIGURE 26) for supplying pressure to the cylinders 181 and 182.

As indicated diagrammatically in FIGURE 22, the cylinders 181 and 182 each include pairs of conduits 230 and 231 communicating with opposite ends of the cylinders 181 and 182. Each conduit 230 and 231 includes a fitting 232 threaded into the respective hydraulic supply holes 233 (FIGURES 25 and 26). The fittings 232 pass through the holes 228 (FIGURE 20) of cover plate 225 directly into the tapped holes 233 of flange 180.

The jaws A and B of carrier 11 are of duplicate construction and the following description applies to both.

Described in detail (FIGURES 21 and 22) the cylinder 181 is connected to the pair of jaws A, and the cylinder 182 is connected to the pair of jaws B. Each cylinder includes a piston (not shown) having a piston rod 234 in driving connection with a rack 235. In each case, the rack 235 is slidably confined in a bore 236 formed in the solid portion 237 at opposite ends of casting 224. The stroke of the rack 235 in the forward direction is limited by an adjustable stop screw 238. The rack 235 meshes with a pinion 240 forming a part of a stub shaft 241 (FIGURE 21) journalled in ball bearings 242 which are seated in the solid portion 237 of the casting and its cover plate 225. As viewed in FIGURE 21, the upper portion of each pinion 240 projects into a respective recess 243 formed in the upper portion of the casting 224 and actuates its associated pairs of jaws A or B.

Each pair of jaws (FIGURE 22) comprises opposed clamping bars 244 and 245 projecting longitudinally from the respective ends of the carrier casting 224 and having inner end portions slidably mounted within the recess 243 of the casting. The clamping bar 244 includes a rack 246 projecting at right angles from the end of the bar 244 and meshing with the pinion 240. The opposed clamping bar 245 includes a similar rack 247 meshing with pinion 240 on the diametrically opposite side. Rotation of the pinion 240 in forward or reverse directions thus shifts the opposed clamping bars 244 and 245 relative to one another to clamping or unclamping positions.

As shown in FIGURES 21 and 22, the clamping bars 244 and 245 are guided for shifting motion in parallelism with one another by respective keys 248 and 250 which are seated in the surface of the recess 243. The rack 246 of clamping bar 244 is provided with a groove slidably interfitting the key 248; the rack 247 of bar 245 similarly interfits the key 250. The clamping bars 244 and 245 which confined within the recess by a bearing plate 251 which slidably engages the top surface of the clamping bars 244 and 245. A similar plate 252 slidably engages the lower surface of the clamping bars. This structure is in duplicate at opposite ends of the carrier 11. The clamping bars 244 and 245 are shown in their clamping position at the left hand end of carrier 11 (FIGURE 20) and in the unclamped position at the opposite end.

In order to provide accurate registry with the tool 10 which is to be transferred, the clamping bars 244 and 245 are recessed as at 253 (FIGURE 20). The recesses are developed about a curve which corresponds to the diameter of the body portion of the tool 10 (FIGURES 20 and 27). To provide interchangeability, the body portion 254 of each of the various tools 10 is of uniform diameter for jaw engagement.

Each clamping bar 244 and 245 includes a threaded stud 255 passing through the clamping bar and locked in place by a nut 256 (FIGURE 20). The inner end of each stud projects from the surface of the curved recess 253 and interfits the opposed indexing sockets 257 which are formed in the body 254, of the tool (FIGURES 41–43). This arrangement prevents tool rotation and maintains the tool in proper relationship to the jaws during the transfer operation.

As noted earlier (FIGURES 20–23), the jaws A and B include respective sets of limit switches 196 and 197. These switches are actuated by cams 258 secured to the respective stub shafts 241 which project downwardly from the pinions 240. Each cam includes a lobe 260 which actuates the arm 261 of its associated limit switch (FIGURE 23). As viewed in FIGURE 21, one of the switches 196 is tripped when the jaws are in clamped position; a second switch 196 is tripped when the jaws are extended to their unclamped position. Tripping of these switches conditions the control circuit for the next operation in the cycle.

*Tool storage crib*

As noted earlier (FIGURES 1–3), the tool storage crib or rack 6 is mounted adjacent the column 4 of the tool changing arm 3 and includes spring-loaded tool retaining jaws 8. These jaws are mounted on the rack 6 in a radius developed about the center of the column 4, adapting the arm 3 to be indexed radially, as indicated by the broken lines in FIGURE 3, into alignment with the individual tools 10. As noted in the description of the tool changing column 4, the tool retaining jaws 8, in the present example, are displaced approximately five degrees apart radially, and the tool changing arm 3 is indexed by its shot bolts 55 and 56 at proper angles to provide accurate registry with the selected tool. The tool changing arm 3 is also indexed vertically with respect to the five levels 7 of the tool crib by means of the shot bolts 147, as described earlier.

Described in detail with reference to FIGURES 37–40, the tool crib or storage rack 6 includes a base 262 which rests upon the base plate 32 (FIGURE 1). The tool retaining jaws 8 are mounted upon respective arcuate shelves or plates 263 which delineate the levels 7 of the tool storage rack. The arcuate shelves 263 are disposed in registry one above the other by a series of composite posts 264 rising from the base 262. The posts 264 are arranged in pairs at opposite ends of the plates 263. Each post 264 comprises a tie rod 265 (FIGURE 39) threaded as at 266 at opposite ends. The arcuate plates 263 are supported in spaced relationship to one another by means of spacer sleeves 267 slipped upon the respective tie rods 265.

In order to locate the arcuate plates 263 accurately in registry with one another, the lower portion of each spacer sleeve 267 is counter-turned as at 268 and the upper portion of the adjoining sleeve includes a counter-bore 270 to receive the counter-turned portion 268. Each arcuate plate 263 includes a locating collar 271 interfitting the counter-turned portion 268 and resting upon the top of the spacer sleeve 267. The arcuate mounting plates 263 and the spacer sleeves are clamped in assembly by nuts 272 which are screwed upon the threaded end portions 266 of the tie rods 265. The lower ends of the composite posts 264 rest upon lugs 273 projecting outwardly from opposite ends of the base 262.

In addition to the pairs of end posts 264 (FIGURE 38), the tool storage rack further includes an intermediate composite post 274. This post (FIGURE 40) comprises a a lower section 275 having a flange resting directly upon the top surface of the base 262 and includes spacer sleeves 276 interposed between the arcuate shelves or plates 263. A stud 277 passes through the spacer sleeves 276 and has its lower end screw threaded as at 278 in to the lower post section 275. A nut 280 is threaded upon the upper end of stud 277 to clamp the parts in assembly.

As viewed in FIGURE 38, the tool retaining jaws 8 are mounted along the edge portion of the respective arcuate shelves or plates 263 in spaced radial relationship to one another. Each tool retaining jaw assembly includes a mounting plate 281 (FIGURES 41–43) secured by screws 282 to the arcuate plate 263. The several jaw assemblies 8 are of duplicate construction and the following detailed description applies to the entire group.

Each jaw assembly 8 comprises an opposed pair of clamping jaws 283—283 having their rearward ends pivotally connected to the mounting plate 281 by shoulder screws 284 threaded into the mounting plate. Each pair of jaws 283 are spring biased toward one another by a tension spring 285 having its opposite ends anchored upon posts 286—286 rising from the jaws 283.

As noted earlier, the jaws provide a detent effect with respect to the tool 10 as the tool is inserted or withdrawn during tool interchange. For this purpose, the outer end of each jaw 283 is provided with a curved cam surface 287 (FIGURE 41) whereby the two opposed cam surfaces provide a converging tool-receiving throat. The cam surfaces 287 lead to respectve diverging curved surfaces 288, which is uniform for the curvature of the tool body 254, is uniform for the entire set of tools to interfit both the jaws A and B of the carrier 11 and the jaws 8 of the tool storage rack 6.

As noted earlier, the pairs of jaws A and B of carrier 11 are provided with studs 255—255 (FIGURE 20), which interfit the sockets 257 of the tool to key the tool positively in its rotary indexed position with respect to the jaws A and B of the carrier. As shown in FIGURE 41, each tool retaining jaw assembly 8 includes a tapered dowel pin 290 projecting from a block 291, which is attached to the mounting plate 281. The dowel pin interfits a socket formed in the tool body 254. The dowel pin 290 passes into the socket when the tool is inserted into the tool retaining jaws 8, so as to key the tool against rotation with respect to the jaws. By virtue of this arrangement, the opposed sockets 257—257 are indexed accurately within the jaws to receive the studs 255—255 of the carrier jaws A or B during tool interchange.

In order to facilitate insertion and withdrawal of the tool with respect to the spring-loaded jaws 283, the body portion 254 of the tool 10 includes a pair of flats 292—292 formed in diametrically opposite sides and located in a plane below the indexing sockets 257 (FIGURES 27 and 41–43). The jaws 283, adjoining the curved portions 288, are provided with parallel flat clamping surfaces 293—293 which seat against the flats 292. As shown in FIGURE 43, the body portion 254 of the tool rests upon the top surface of the jaws 283 when the tool is confined in the jaws, thereby to support the weight load of the tool.

The spring-loaded jaws 283 are normally maintained in spaced relationship, substantially as shown in FIGURE 41, by means of the block 291 which is interposed between the jaws to act as a stop. When the tool 10 is inserted (FIGURES 68 and 69), the periphery of the tool body acts upon the cam surfaces 287—287 to spring the jaws 283 apart counter to the tension spring 285. After the tool is fully inserted, the jaws are sprung toward one another by the spring 285, bringing the curved surfaces 288 of the jaws into engagement with the periphery of the tool body 254 to retain the tool in position.

Upon tool withdrawal (FIGURES 47 and 48), the curved surfaces 288 (FIGURE 41), are actuated upon by the tool body 254 to spread the jaws 283 apart from one another, thus permitting withdrawal of the tool. The camming surfaces 287 and 288 of the jaws 283 thus provide a detent action permitting insertion and withdrawal of the tools with respect to the tool storage rack 6.

*Power-operated chuck wrench*

As noted earlier (FIGURES 1–3), the drill head 24 is provided with a power-operated wrench mechanism 15, which is adapted to clamp or unclamp the chuck 14 during the tool changing cycle. The wrench mechanism 15 is pivotally mounted with respect to the drill head 24 and is shifted to an inoperative, retracted position with respect to the chuck 14 (FIGURE 29) during the machining operation. The wrench mechanism is shifted into engagement with the chuck during the tool changing cycle (FIGURE 30), first to open the chuck for release of the used tool and then to close the chuck after the new tool is inserted therein. After closing the chuck, the wrench mechanism shifts back to its inactive, retracted position. The pivotal motion is imparted to the wrench mechanism by a hydraulic cylinder and the power for opening and closing the chuck is derived from a second hydraulic motor, as explained below.

Referring to FIGURES 29–35, the power wrench mechanism 15 comprises a mounting plate 294 which is pivotally supported by a stub shaft 295 (FIGURE 31). Shaft 295 is journalled in ball bearings 296—296 seated in a bracket 297. The bracket 297 includes flanges 298 attached to one side of the drill head 24 (FIGURE 29). As viewed in FIGURE 2, the wrench mechanism is pivoted in a horizontal plane immediately beneath the lower surface of the drill head 24.

The power wrench 15 is shifted relative to the chuck 14 by a hydraulic cylinder 300 to its active or inactive position (FIGURES 29 and 30). Cylinder 300 is pivotally connected as at 301 to a bracket 302 which is attached to the drill head 24. The cylinder includes a piston rod 303 pivotally connected as at 304 to the swinging end of the mounting plate 294. The limits of swinging motion of the wrench mechanism are determined by the stroke of the piston rod 273 relative to its cylinder 270. Limit switches 305 and 306 are mounted relative to the drill head and include plungers 307 adapted to be tripped by the mounting plate at its limits of swinging motion. The limit switches are arranged to transmit signals to the control system to regulate the sequence of operations during the tool changing cycle.

The power wrench mechanism includes a rotatable wrench head 308 having an open side 310 (FIGURES 29 and 30). The open side 310 includes flats 311 which are slightly inclined relative to one another and adapted to engage the flats 312—312 of the rotatable clamping element 313 of the chuck (FIGURE 28). After being shifted into engagement with the clamping nut 313, the wrench head 308 is rotated in the direction indicated by the arrow in FIGURE 30 to disengage the chuck for removal of the used tool. After the tool is removed and the new one inserted, the clamping element 313 is rotated to clamp the new tool; the wrench head 308 is then shifted to its retracted position of FIGURE 29.

As explained below, the tool 10 includes slots which are engaged by driving lugs 314 when the shank of the tool is inserted into the chuck (FIGURE 27). In order to provide this registration, the tool changing mechanism holds the tool 10 in a predetermined rotary position as it is transferred between the tool storage rack 6 and chuck 14, as explained above. In order to align the lugs and slots, it is necessary to stop the spindle 5 and chuck 14 in an oriented position in relation to the tool. It is also necessary to orient the spindle with the flats 312 of the chuck clamping element 313 to permit engagement of the power wrench with the element 313.

In order to orient the spindle, the upper portion of the spindle drive shaft 30 (FIGURES 29 and 36) is provided with a collar 315 having a peripheral notch 316 which is engaged by a shot bolt 317 at the beginning of a tool changing cycle. The shot bolt 317 is slidably mounted within a lug 318 and is normally biased upwardly by the spring 320. The upper end of shot bolt 317 is connected to a solenoid 321 which, upon being energized, forces the shot bolt downwardly counter to the coil spring 320.

The spindle transmission includes a jogging mechanism (not shown) which is interconnected with the control system. At the end of a machining cycle which requires a tool change the control system decommissions the main spindle drive and commissions the jogging mechanism which rotates the spindle at a slow rate. The control system also energizes solenoid 321, which urges the end of the shot bolt 317 into contact with the upper surface of the collar 315. Rotary spindle motion continues until the plunger shot bolt 317 drops into the notch 316. A pair of feed back switches 322 and 323 are mounted adjacent the shot bolt 317 and the shot bolt includes a trip collar 324 arranged to trip the switches. When the shot bolt is elevated, the switch 323 is tripped to signal the control system that the spindle is free to rotate. The jogging mechanism includes a slip clutch (not shown) which permits the spindle to be stopped upon engagement of the notch by the shot bolt. The spindle is thus stopped, with the chuck driving lugs 314 properly oriented. At this point, the switch 322 transmits a signal back to the control system to initiate the next step in the sequence of tool changing operations.

The chuck 14 is of a conventional type (FIGURES 27 and 28); therefore, the structural details have been omitted from the drawings. However, it will be understood that the clutch includes clamping jaws engageable with the shank 325 of the tool. These jaws are actuated in response to the rotary motion which is imparted to the clamping element 313 by the wrench head 308 of power wrench 15. As noted earlier, the tool 10 is held in an indexed position in its set of tool retaining jaws 8 by the dowel pin 290 (FIGURE 41) which is associated with the jaws. As the tool is transferred to the chuck, it is located in its rotary position by the studs 255 (FIGURE 201), which project from the jaws A and B. Accordingly, when the tool is shifted upwardly into engagement with the chuck, the slots 326 of the tool are brought into engagement with the driving lugs 314 which project downwardly from the chuck 14. It will be understood that the indexed position of the tool is maintained as it is transferred from the chuck back to its set of tool retaining jaws 8.

The wrench head 308 (FIGURES 29–35) is mounted for rotary motion between a pair of retaining plates 327—327, which are attached to the opposite sides of the mounting plate 294 of the wrench mechanism (FIGURES 31–35). For this purpose, the retaining plates 327 each include a circular recess 328 and the wrench head 308 includes a bearing hub 330 at opposite sides interfitting the recess (FIGURES 30 and 35). The wrench head 308 further includes a pinion 331 engaged by a rack 332 for rotating the head to its chuck clamping and unclamping positions. The mounting plate 294 is suitably recessed to provide clearance for the pinion 331 and rack 332; the retaining plates 327 provide bearing surfaces for maintaining the rack 332 in meshing engagement with the pinion 331.

The rack 332 is shifted longitudinally by a rotary hydraulic motor 333 (FIGURES 29 and 30) having a pion 334 meshing with a rack section 335, which forms a part of rack 332. The rack section 335 is slidably confined between bearing plates 336—336 attached to the opposite sides of the mounting plate 294, similar to the retainer plates 327. The hydraulic motor 333 includes a flange 337 which is attached to the upper retaining plate 336.

In order to limit the rotary motion of wrench head 308, the wrench mechanism 15 includes adjustable stop screws 338—338 engagable with the opposite ends of the rack sections 290 and 293 (FIGURES 29 and 30). The screws 338 are threaded through respective end plates 340 which are attached to the retainer plates 327 and 336. The screws are locked in adjusted position by respective nuts 341.

The wrench mechanism 15 (FIGURES 29 and 30) is provided with a pair of limit switches 342 and 343 which are arranged to signal the control system when the wrench head 308 is in its clamping or unclamping position. These switches are mounted upon respective brackets 344 rising from a lateral extension 345 of mounting plate 294. Each switch includes a pivoted trip arm 346. The trip arms are actuated at the opposite limits of rack motion by a trip finger 347 projecting outwardly from the rack section 335.

*Control system and operation*

As pointed out previously, the operation of the present tool changing mechanism is regulated by the programming apparatus disclosed in the copending application Ser. No. 786,589. The programming system is shown generally in block form in FIGURE 70 and includes the tape decoder or reader 350, the memory storage unit 351, and the main control circuit 352. The control circuit components are enclosed in the cabinets indicated at 21 in FIGURE 1 and energizes the several limit switches and other components which are associated with the column and arm of the tool changing apparatus and its coacting parts. The hydraulic circuit (FIGURE 71) discloses the solenoid windings of the hydraulically operated components of the tool changing apparatus which are actuated by the electrical control circuit.

Generally speaking, the electrical control system, in response to a signal from the reader 350 and memory storage unit 351, energizes a solenoid winding for each operation. Each solenoid, in turn, forms part of a hydraulic valve which controls the operation of a hydraulic cylinder or motor for that particular operation, as disclosed diagrammatically in FIGURE 71. After the hydraulic cylinder or motor shifts its machine component in accordance with the electrical signal, one of the limit or monitor switches associated with that particular component is tripped to condition the control circuit for the next operation.

As noted earlier, the tap decoder or reader 350 reads the data for a given machine operation, including the saddle and table position (to locate the hole center), the spindle speed, the spindle feed rate, and spindle feed depth. The reader also decodes the data for the vertical position of the drill head 24 and tool length compensating mechanism (according to the aforesaid pending applications) if the machine is so equipped. The tape reader 350 also decodes the tape for tool selection, which is carried out by the present tool changing apparatus. The reader transmits this information in the form of electrical signals to the memory storage unit 351 (FIGURE 70) where the information is stored until needed. For the sake of simplicity, the diagrams disclose only the circuit for the tool changing apparatus.

By virtue of the memory unit 351, the instructions for a second operation are decoded and stored in the memory unit while the machine is performing a first operation. At the completion of the first operation, the instructions are fed from the memory storage unit 351 to the main control circuit 352. The new instructions from the memory storage unit may call for repositioning of the saddle and table if a new hole center is to be located, or they may call for a tool change if additional operations must be performed on the hole which was machined during the first operation. In either event, the tool changing arm 3 normally assumes the waiting position shown in broken lines at D in FIGURE 3. It will be understood at this point, that in order to eliminate machine idle time, the tool change cycle may be initiated for the second operation while the first machining operation is still in progress. For this purpose, the programming apparatus is arranged to transmit the tool change signal in properly timed relationship during the machining sequence.

The several sequential steps in the tool changing cycle are charted in relation to one another in FIGURE 72. The positions assumed by the tool changing arm and carrier jaws A and B of FIGURES 44 to 69, correspond to the operation charted in FIGURE 72. Although the electrical circuit (FIGURE 70) and the hydraulic circuit (FIGURE 71) are illustrated separately, it will be understood that the solenoid operated valves of the hydraulic circuit are energized by the electrical circuit. The electrical lines for energizing the solenoid valves are shown in both the electrical and hydraulic circuits and are designated by corresponding reference numerals.

The electrical control circuit of FIGURE 70 includes suitable manually operated switches for initiating the several machine tool functions and tool changing functions under manual control as the machine is initially being set up at the start of a series of machining operations under tape control. It will also be understood that the workpiece must be properly located on the table 26 with respect to a reference line along both coordinates of the saddle and table motion in order subsequentially to position the workpiece properly with respect to the spindle in response to signals from the programming apparatus. The various switches for manual operation and for initiating the cycles manually have been omitted from FIGURE 70 since the control circuit does not form an essential part of the present invention.

As shown in the electrical diagram (FIGURE 70), the control circuit includes power supply lines 353 communicating with the control circuit 352 for supplying power to the operating components. The hydraulic system of FIGURE 71 is energized by a motor 354 energized by way of power lines 355 interconnected with the main control system 352 (FIGURE 70). The control system is arranged to energize the motor 354 and to regulate its speed of operation during the cycle, as explained later. A motor 356 (FIGURE 70), also energized by the control circuit, operates a pump which supplies lubricant to the tool changing components.

As viewed in FIGURES 37 and 38, the motor 354 is mounted upon the base plate 262 of the tool storage rack 6 and is in driving connection with a conventional hydraulic pump 357, also mounted upon the base plate 262. The hydraulic pump 357 communicates with the hydraulic system (FIGURE 71) for operating the tool changing components in response to the signals from the electrical circuit. The hydraulic circuit includes a sump into which is discharged the hydraulic fluid for recirculation back to the pump 357, as explained later.

Referring to FIGURE 70, the main control circuit 352 includes respective sets of conduits leading to the several limit switches of the tool changing components and also to the coils of the solenoids which actuate the hydraulic control valves of FIGURE 71. For the sake of simplicity, the conduits leading to the individual components and returning to the control circuit 352 have been illustrated in the form of mains comprising groups of individual conductors insulated from one another. The individual insulated conductors are shown leading from the mains to the individual components.

It will be understood at this point that the main control circuit 352, shown in block form, includes suitable relays and relay contacts which are interconnected with the memory storage unit 351 and with the limit switches and solenoid valves of the hydraulic system to provide operation of the tool changing components in proper sequence.

As shown in the diagram (FIGURE 70), the main 358 interconnects the several limit switches of the arm with the main control circuit 352, the line 360 completes the circuit through the limit switches back to the main control circuit. Thus the conductors 361–364 complete a circuit from the main 358 to the four limit switches 185 (FIGURE 10) which transmit the feed back signals to the control circuit 352 indicating the four rotary positions of the jaw carrier 11. The conductors 365–368 complete the circuit from these limit switches by way of line 360 back to the control circuit 352.

The conductors 370 and 371 establish a circuit from the control circuit 352 by way of main 358 to the limit switches 210 and 211, which are actuated by the shot pin 204 (FIGURES 7 and 8) which latches the jaw carrier 11 in any one of its four indexed positions. The conductors 372 and 373 complete the circuit from the limit switches 210 and 211 by way of the line 360 back to the control circuit.

The conductors 374 and 375 complete a circuit from main 358 to the limit switches 168 and 170 (FIGURES 4 and 6), which signal the advanced and retracted positions of the jaw carrier 11. The circuits from these two switches are completed by way of the branch lines 376 and 377 to the line 360.

The circuit to the limit switches 151 and 152, which signal the vertical position of the arm shot pin 147 (FIGURE 4), are established from the main 358 by way of the conductors 380 and 381 and are completed by the conductors 382 and 383 to the line 360. The circuits from main 358 through the limit switches 196–196 and 197–197 (FIGURE 21), which signal the open or closed position of the jaws A and B, are completed from main 358 by way of the conductors 384–387. The circuits from the limit switches 196 and 197 are completed by way of the conductors 390–393 to the line 360.

As noted earlier with reference to FIGURE 2, there is provided a first set of leveling switches 89, which transmit signals to the control circuit indicating the vertical position of the arm 3 with reference to the five levels 7 of the tool storage rack. These switches are interconnected with the control circuit 352 by way of the main 394 (FIGURE 70). Main 394 includes conductors 395–400 leading to the top limit switch 19 and to the leveling switches 89, corresponding to the levels one to five, of the tool storage rack. The conductors 401–405 of the line 406 complete the circuit through these limit switches back to the control circuit.

The slow-down switches 90 (FIGURE 2) are interposed between the leveling switches 89 to slow down the arm 3 as it approaches the preselected level 7 of the tool rack. These intermediate switches 90 are interconnected with the main 394 by way of the conductors 407–410. The circuit is completed through the intermediate slowdown switches 90 by way of the conductors 411–414 to the line 406.

The main 415 from the control circuit is interconnected with the limit switches 76 to 81 (FIGURE 18), which control the radial position of the tool changing arm 3 with respect to the tool spindle. Thus, the conductors 416–422 interconnect the main 415 with the several limit switches 76–81 which are tripped in response to the several radial positions of the arm between the spindle and tool storage rack. The circuits from these switches are completed by way of the conductors 423–428 to the line 430.

In addition, the limit switches 64 and 65 of the shot bolts 55–56 (FIGURE 11), which lock the arm in its several radial positions, include conductors forming a part of the main 415. As described earlier with reference to FIGURE 11, the shot bolts 55 and 56 are mounted in the casing 66 of the arm and are arranged to trip the switches at the limits of travel of the shot bolts. Thus the conductors 431–434 of main 415 are connected to one side of the limit switches 64 and 65. The circuits are completed by way of the conductors 435–438, which form a part of the line 430.

As noted earlier (FIGURES 13 and 14) the radial position of the arm 3 with reference to the retainer jaws 8 (FIGURE 3) of the tool storage rack is determined by the commutator ring 72, which is mounted in a stationary position in the base 33 of the tool changing column 4. As shown in the diagram (FIGURE 70), the sectors 73 of the commutator ring 72 are interconnected with the control circuit by the main 440. The sectors are traversed by the brush 74, which is connected with the control circuit by way of line 441. The sectors are interconnected with the main 440 by the individual conductors 442. As noted earlier, the column is rotated as the arm 3 swings radially with reference to the tool retaining jaws 8 of the tool storage rack 6. The brush 74 swings radially with the column relative to the stationary sectors 73 so as to complete a feed-back circuit to the control system to indicate that the arm has reached its preselected position with reference to the tool retaining jaws.

The final limit switch 19 (FIGURE 2), as explained earlier, locates the jaw carrier 11 vertically with reference to the head 24 during the tool changing cycle. Switch 19 is mounted upon the head and is actuated by the trip element 20 which is carried by the arm 3. As shown in the diagram (FIGURE 70), switch 19 is interconnected with the main 443 by way of conductor 444. This circuit is completed by way of conductor 445 to the line 446.

As noted earlier, the vertical position of the arm with reference to the drill head and spindle is regulated by the shiftable sensing switches 12 (FIGURE 2) consisting of switches 450–452, which are mounted on the bracket 92 projecting from the drill head 24. By virtue of this arrangement, the position of the arm 3 is located with respect to the drill head itself so as to compensate for changes in the elevation of the drill head.

As shown in the circuit diagram (FIGURE 70), a circuit is established from the control circuit 352 to the three sensing switches 450–452 by way of the main 443 which includes conductors 453–455 leading to the sensing switches 450–452. The circuit is completed by way of the line 446 which includes the conductors 456–458.

The limit switches 305 and 306 (FIGURES 29 and 30), which indicate the position of the power wrench 15, are interconnected with the control system by way of the conductors 460 and 461 of the main 443. The circuit through the switches is completed by way of the conductors 462 and 463 of the line 446.

The limit switches 342 and 343 (FIGURE 29), which signal the open and closed position of the power wrench 15, are interconnected with the main 443 by the conductors 464, 465 and 466. These circuits are completed by way of the conductors 467 and 468 to the line 446.

As explained later with reference to the hydraulic circuit (FIGURE 71) the several components of the tool changing apparatus are operated hydraulically in response to the electrical signals transmitted from the main control circuit 352. The various limit switches, described above, act as electrical interlocks to time the operation of the shiftable components in proper sequence with one another. The several hydraulically operated components are controlled by solenoid operated valves, the windings of these valves being disclosed in the electrical diagram. The conductors of the electrical circuit, which operate the solenoids, are also indicated in the hydraulic circuit for reference purposes.

As shown in the electrical diagram (FIGURE 70) the operation of the shot bolt 147 (FIGURE 4), which latches the arm in its selected elevation is regulated by a solenoid valve 470. This valve is of the spring-loaded type and normally assumes its bolt retracting position and is shifted to its extended locking position upon energization of the solenoid windings 471. The winding is energized by the conductors 472 and 473 of the mains 474 and line 475, which are interconnected with the opposite ends of the windings 472 and 473.

The operation of the arm elevating motors 87—87 (FIGURE 6) is controlled by the solenoid valve 476 having windings 477 and 478. These windings are energized by the conductors 480 and 481 of the main 474. The circuits through these windings are completed to line 475 by way of conductor 482 and 483. As explained later with reference to the hydraulic circuit (FIGURE 71), the windings 477 and 478 provide arm motion at a slow positioning rate.

The solenoid valves 484 and 485 energize the arm elevating motors 87—87 at a rapid transverse rate and include the windings 486 and 487. These windings (486 and 487) shift the solenoid valves 484 and 485 for forward or reverse motor operation to raise or lower the arm 3 along the column 4 at the rapid rate. The windings 486 and 487 are energized by the pairs of conductors 490 and 491 of main 474. The circuit is completed to line 475 by conductors 492 and 493. The shot bolts 55 and 56 (FIGURE 11), which position and latch the arm 3 in its selected rotary position, are regulated by the solenoid valve 494, which is interconnected hydraulically with the cylinders 57. This valve also is of the reversing type, including the windings 495 and 496, adapted to advance and retract the rotary shot bolts 55 and 56. Energization of the windings 495 and 496 is by way of the respective pairs of conductors 497 and 498, which form a part of the main 474 and lead to line 475.

The hydraulic arm indexing motor 43 (FIGURE 11) is controlled by a solenoid operated reversing valve 500 which includes the windings 501 and 502 for forward or reverse rotation of the hydraulic motor. The windings 501 and 502 are selectively energized by way of the pairs of conductors 503 and 504 of the main 474 and line 475. These windings are energized selectively to provide clockwise or counter-clockwise rotary arm motion at a relatively slow positioning rate.

In order to provide radial arm motion at a rapid traverse rate, there is provided a pair of solenoid valves 505 and 506 also interconnected hydraulically with the reversible motor 43. The solenoid valves 505 and 506 are also of the reversible type and include the solenoid windings 507 and 508. These windings are energized by respective pairs of conductors 510 and 511, forming a part of the main 474 and leading to line 475. It will be understood that the control system is arranged to energize the rapid traverse valves 505 and 506 first to shift the arm toward the selected position at a rapid rate and thereafter to signal the slow positioning solenoid valve 500, thereby to continue advancing the arm in the same direction but at the slower positioning rate.

In addition, there is connected across the main 474 and line 475 a reversible solenoid valve 512 for controlling the cylinder 162 (FIGURE 6) which shifts the jaw carrier 11 linearly to its advanced or retracted positions. This valve includes a winding 513 for shifting the valve to carrier advancing position and a second winding 514 adapted to shift the valve to a position for retracting the carrier. The windings 513 and 514 are energized by the pairs of conductors 515 and 516.

The windings of the solenoid valves for operating the jaws A and B, the jaw carrier shot bolt 200, and for rotating the jaw carrier 11 (FIGURES 6, 8 and 22) are energized by the main 517 and line 518, which are interconnected with the control circuit for sequential operation of these components. The main 517 and line 518 also energize the windings which shift the power wrench 15 to its advanced and retracted positions (FIGURES 29 and 30). In addition, the main 517 and line 518 energize a solenoid valve 520 which is arranged to supply lubricant to the column 4 during the lowering motion of the tool changing arm 3.

The solenoid valve 521, which actuates cylinder 181 (FIGURE 22) of the jaws A is energized in a direction to close the jaw by means of the winding 522 and is energized to open the jaws A by the windings 523. These windings are energized in proper sequence by the main control system 352 (conductors 524 and 525). The solenoid valve 526, which controls the cylinder 182 of the jaws B, includes windings 527 and 528 (conductors 530 and 531), which admit hydraulic pressure to the cylinder to operate the jaws B in proper sequence in response to the signals from the control system.

The cylinder 202, which operates the carrier shot bolt 204 (FIGURE 7), is controlled by the solenoid valve 532, which includes a winding 533. The opposite terminals of winding 533 are connected to individual conductors 534 and 535, of the main 517 and line 518. As noted earlier, the shot bolt 204 is disengaged when the jaw carrier 11 is to be indexed, as indicated with reference to FIGURE 60.

The four rotary positions of the jaw carrier 11 (FIGURES 48–49 and 59–60) are regulated by the solenoid valve 536 having winding 537 and 538 (cylinder 172—FIGURE 6). These windings are energized by respective pairs of conductors 540 and 541 of the main 517 and line 518 in response to the signals from the control system 352. In the present arrangement, the winding 537 provides indexing carrier motion in the counter-clockwise direction, while winding 538 provides rotary motion in the clockwise direction.

The power wrench 15 of the chuck (FIGURES 29 and 30) is shifted from its retracted position to its chuck-engaging position by the solenoid valve 542, which includes a winding 543 connected by individual conductors 544 and 545 with the main 517 and line 518. This valve is hydraulically interconnected with the cylinder 300 of the power wrench, as described below with reference to the hydraulic circuit. The operation of the rotatable wrench head 308 (motor 333) of the power wrench 15 (FIGURE 29) is regulated by the solenoid valve 546, which includes windings 547 and 548. This solenoid valve 546 is hydraulically interconnected with the hydraulic motor 333, as explained below. The windings 547 and 548 are energized selectively by individual pairs of conductors 549 and 550 of the main 517 and line 518. The arrangement is such that the chuck is shifted to the open position when the winding 547 is energized; it is shifted to the tool clamping position when the winding 548 is energized.

As noted earlier, the solenoid valve 520 operates a lubricating valve for the column. The valve 520 includes a winding 551, including conductors 552 and 553 from the main 517 and line 518 for energizing the winding and applying lubricant to the column during downward arm motion (lubricating motor 356). In addition, there is provided a solenoid valve 554 having a winding 555 which includes a pair of conductors 556 and 557 forming a part of the main 517 and leading to line 518. The solenoid valve 554 is interconnected in the hydraulic system and is arranged to regulate the pressure in the hydraulic lines during the operating cycle, as explained later.

*Hydraulic system*

As noted earlier, the several components of the tool changing apparatus are actuated by hydraulic cylinders and motors, previously identified. The hydraulic cylinders and motors, combined with the solenoid valves which regulate their operation, are disclosed diagrammatically in FIGURE 71. As explained above, operation of the solenoid valves is controlled by the electrical circuit which is illustrated in FIGURE 70. It will be understood at this point, that the several solenoid or electrically controlled valves, described above with reference to FIGURE 70, are identified by corresponding reference numbers in the hydraulic diagram (FIGURE 71).

Described with reference to FIGURE 71, hydraulic pressure is supplied to the circuit by the hydraulic pump 357 which is driven by the motor 354 noted above with reference to the electrical diagram. Fluid is supplied to the pump 357 by way of the conduit 558 extending from pump 357 to the sump 560. From the pump 357 the hydraulic fluid is advanced under pressure by way of a conduit 561 to a conduit 562, which acts as a manifold for supplying fluid pressure to the several hydraulically operated components of the tool changing apparatus.

The hydraulic pump 357 is of a conventional type in which the output volume and pressure may be varied from high to low to accommodate operating conditions. In the present disclosure, the pump provides maximum output under normal operating conditions and provides reduced pressure and volume upon energization of the winding 555 of the solenoid valve 554, as described above with reference to the electrical diagram. Since the volume control system is conventional, the details have been omitted from the hydraulic circiut diagram. It will be understood that the motor 354 is energized in response to the main electrical control system and that the winding 555 of the control valve 554 is also energized from the same source in response to the electrical signals. In the form illustrated, the pressure control valve 554 acts as a by-pass to reduce pressure and volume when its winding 555 is energized by the main control system.

As shown diagrammatically, the cylinder 181, which actuates the set of jaws A of the jaw carrier 11 is energized by the hydraulic conduits 563 and 564, which communicate with the solenoid operated valve 521. This valve is of the reversible type including a shiftable plunger (shown diagrammatically) connected with the solenoid windings 522 and 523. When in the position shown in FIGURE 71, the winding 523 is energized, such that hydraulic pressure is conducted from the main pressure conduit 562, the branch conduit 565, through the check valve 566 and solenoid valve 521. From valve 521, pressure is conducted through line 563 to the forward end of jaw cylinder 181, thus holding the piston in its retracted position with the jaws A open. Fluid is discharged from the opposite end of cylinder 181 by way of the conduit 564, solenoid valve 521 and line 567 to the sump 560.

In order to simplify the diagram, the sump 560 is indicated at the lower end of each of the discharge lines throughout the diagram. It will be understood that when the winding 522 of the solenoid valve 521 is energized, the valve plunger is shifted to its second position, causing pressure from branch line 565 to be conducted to the conduit 564, thereby to advance the piston and shift the jaws A to the closed position (FIGURE 22). Fluid is discharged from the opposite end of cylinder 181 by way of conduit 563 to conduit 567 which leads back to the sump 560. The hydraulic conduit 563 includes a flow control valve 568 which is of a conventional type arranged to restrict the flow of hydraulic fluid, thereby to slow down the motion of the jaws as they are shifted.

The hydraulic circuit for operating the jaws B is identical to the circuit of jaws A. Briefly, hydraulic pressure is fed from the main conduit 562, branch conduit 570 and by way of check valve 571 to the reversible solenoid valve, previously indicated at 526 in the electrical diagram. As noted with respect to the diagram, the valve is shifted to the jaw closing or jaw opening position by the solenoid windings 527 and 528. From the solenoid valve 526, hydraulic fluid is conducted to the opposite ends of the cylinder 182 of jaw B by way of the conduits 572 and 573. Conduit 573 includes a flow control valve 574 to regulate the rate of jaw motion. In the valve position shown in the diagram, the piston is shifted to its retracted position with the jaws B open (FIGURE 20). When the plunger of valve 526 is shifted to its second position, the flow of hydraulic fluid is reversed, thereby to shift the jaws B to the closed position. The conduit 575 conducts the exhaust fluid back to sump 560.

The rotary jaw carrier 11 is rotated to its indexed positions by the hydraulic cylinder 172. Operation of the cylinder 172 is regulated by the reversible solenoid valve 536 in response to energization of the solenoid windings 537 or 538, previously noted with reference to the electrical circuit diagram. Hydraulic pressure is supplied to the solenoid valve 536 by way of the conduit 576 and is supplied to the opposite ends of the cylinder 172 by way of the conduits 577 and 578. Hydraulic fluid, which is exhausted from cylinder 172 passes through the solenoid valve 536 and back to the sump 560 by way of the line 580.

Solenoid valve 536 includes a plunger which is shifted by the solenoid windings 537 and 536 to three positions. In the position shown, the plunger is located in its intermediate position by means of compression springs. In this position the flow of hydraulic pressure from the main conduit 562, is blocked off to hold the jaw carrier 11 in its indexed position. The conduits 577 and 578 include respective flow control valves 581 and check valves 582. When the plunger of valve 536 is shifted in one direction from the intermediate position shown, the piston of cylinder 172 is advanced; when the plunger is shifted in the opposite direction, the piston of cylinder 172 is retracted. The arrangement of flow control valves 581 and check valves 582 restrict the flow of hydraulic fluid, thereby to regulate the rate of motion of the jaw carrier 11 toward its indexed position.

As noted earlier, the shot bolt 204, which is operated by the cylinder 202 locks the jaw carrier 11 in its indexed position and is retracted to a disengaged position when the carrier is to be indexed. The solenoid valve 532, which controls the shot bolt position, is of the reversible type and its plunger is normally biased to a bolt retracting position by a compression spring 583. The plunger is shifted to the shot bolt advancing or locking position by the winding 533, previously noted with reference to the electrical circuit diagram. Hydraulic fluid pressure is supplied to the shot bolt valve 532 by way of conduit 584 leading from the main conduit 562. The pressure is conducted to the opposite ends of the cylinder 202 from valve 532 through the conduits 585 and 586, which act as pressure or exhaust conduits in response to the position of the solenoid valve plunger. Hydraulic pressure is exhausted from the solenoid valve 532 by way of the line 587, which communicates with the sump 560. Conduit 586 includes a flow control valve 588 to regulate the carrier indexing motion.

The cylinder 162 (FIGURE 6), which shifts the jaw carrier 11 longitudinally to its advanced or retracted positions is regulated by the solenoid valve 512 in response to energization of the windings 513 or 514. Hydraulic pressure is supplied to the solenoid valve 512 from the main conduit 562 by way of conduit 590, which includes a check valve 591 to lock the piston of the shifter cylinder 162 in its retracted or advanced position. Fluid pressure is supplied and exhausted with respect to the opposite ends of the shifter cylinder 162 by way of the conduits 592 and 593. Conduit 592 includes a flow control valve 594 to retard the shifting speed of carrier 11. In the position shown, the winding 513 is energized, thereby shifting the plunger of valve 512 to a position for retracting the piston and the jaw carrier 11, as indicated in FIGURES 4 and 6. When winding 514 is energized, the jaw carrier 11 is shifted outwardly, as shown in FIGURES 46 and 47. Conduit 595 conducts the exhaust fluid from valve 512 back to the sump 560.

The hydraulic arm indexing motor 43 which rotates the column 4 and shifts the tool changing arm 3 radially (FIGURE 11) is of the reversible type and is arranged to swing the arm either in a clockwise direction or in a counter-clockwise direction at a rapid rate or at a slow positioning rate. For this purpose, the hydraulic circuit includes two sets of solenoid-operated valves. Since these valves are conventional, they are shown in block form in the diagram and are actuated by respective solenoid windings which are arranged to shift the valve plungers (not shown) to provide the required radial arm motion.

Described in greater detail, the arm indexing motor 43 is shifted at the rapid traverse rate in the clockwise direction by operation of the valve 506. This valve is controlled by the solenoid winding 508, as noted earlier with respect to the electrical diagram. The motor 43 is energized to index the arm 3 in the counter-clockwise direction at the rapid traverse rate by the valve 505, which is regulated by the solenoid winding 507. Hydraulic pressure is supplied to the rapid traverse valves 505 and 506 by way of the conduits 596 and 597. From the valves 505 and 506, hydraulic fluid is conducted to the motor 43 by way of the conduits 598 and 600. During energization of the motor in the clockwise or counter-clockwise direction at the rapid traverse rate, the hydraulic fluid is exhausted from the motor 43 by way of the lines 601 or 602 which lead to the sump 560, as indicated.

The arm indexing motor 43 is energized at the slow positioning rate by means of the flow control valve 500 of a conventional type, which is also shown in block form. This valve is also of the reversible type and is shifted for motor operation in the clockwise direction by the solenoid winding 501 and in the counter-clockwise direction by the solenoid winding 502. Hydraulic pressure is supplied to the valve 500 by way of the branch conduit 603 and is discharged by way of the conduits 604 or 605 to the sump 560.

The shot bolt assemblies 55 and 56 (FIGURE 11), which latch the arm in its selected radial position, are shifted to the retracted or advanced position by the valve 494 which is also shown in block form. Hydraulic pressure is supplied to valve 494 by way of the pressure conduit 606, which includes the check valve 607. Hydraulic pressure is supplied and exhausted with respect to the cylinders 57—57 of the shot bolts by way of the conduits 608 and 610, which extend from the valve 494 to the cylinders 57. The conduits 608 and 610 each include a flow control valve 611 to slow down the motion of the shot bolts. Hydraulic fluid is exhausted from the cylinders through the valve 494 by way of the conduits 612—612, both of which lead back to the sump 560.

The tandem arm elevator motors 87—87 are driven at a rapid traverse rate in the up direction by the valve 485 and in a down direction by the valve 484, which are similar to the valves of the indexing motor 43, previously described. The motors are driven at the slow positioning rate in the up or down direction by the valve 476.

For operating the motors at the traverse rate there is provided a supply conduit 613 extending to the valve 485. A similar supply conduit 614 extends to the valve 484, which regulates the downward motion of the arm at the traverse rate. The hydraulic fluid is supplied and exhausted with respect to the motors 87—87 by way of the conduits 615 and 616. In order to retard the downward motion of the arm, an automatic flow control valve 617 is inserted in the line 615, which acts as an exhaust conduit during downward arm motion. During the operation of the motors 87, the hydraulic fluid is discharged to the sump 560 by way of the lines 618 or 620. The rapid traverse valves 484 and 485 are shifted to their operating positions by the solenoids 486 and 487, which are interconnected with shiftable valve plungers (not shown).

The flow control valve 476 which energizes the arm elevating motors 87—87 at the slow positioning rate includes a pressure conduit 621 communicating with the pressure supply conduit 562. The conduits 615 and 616 communicate with the valve 476 for driving the arm elevating motors in the forward or reverse direction. Hydraulic fluid is exhausted from the valve 476 to the sump 560 by way of the conduits 622—622. The arm positioning valve 476 is shifted to the arm lowering position by the solenoid winding 478 and to the arm raising position by the solenoid winding 477.

The cylinder 145, which actuates the arm shot bolt 88 (FIGURE 4), is operated by the reversible solenoid valve 470. The valve 470 includes a plunger (not shown), which is normally shifted to its bolt retracting position, as indicated, by the coil springs 623. Hydraulic pressure is supplied to valve 470 by conduit 624 and the cylinder and is interconnected with the valve by way of the conduits 625 and 626. In the position shown, hydraulic pressure is supplied to the cylinder by way of line 625 and is exhausted by way of the line 626, through the valve and by way of line 627 to the sump 560. When the solenoid winding 471 is energized by the electrical circuit, the valve plunger is shifted to its second position so as to apply pressure by way of conduit 626 to the cylinder, thereby to advance the shot bolt. In this valve position, pressure is exhausted from the opposite end of the cylinder 145 by way of the conduit 625 through the valve and by way of line 627 to the sump.

The cylinder 300 which shifts the power wrench to its advanced or retracted position (FIGURES 29 and 30) is energized by the solenoid valve 542. This valve includes a plunger (not shown) which is normally shifted to the position indicated by a spring 628 and is shifted in the opposite direction by the solenoid winding 543 previously described.

The position of the piston shown in the diagram represents the power wrench 15 in its retracted position (FIGURE 29). Hydraulic pressure is supplied to the valve 542 by way of the conduit 630 having a check valve 631, which normally locks the power wrench in its retracted position. The solenoid valve includes conduits 632 and 633 communicating with opposite ends of cylinder 300. Hydraulic pressure is supplied to cylinder 300 to retract the wrench by conduit 633. The line 633 includes a flow control valve 634. When the solenoid winding 543 is energized, the plunger of valve 542 is shifted to its second position (wrench advance—FIGURE 30) causing hydraulic pressure to be supplied by way of conduit 632 and exhausted by way of conduit 633, through the valve 542, and by way of exhaust conduit 635 to the sump 560, thus shifting the power wrench to its chuck-engaging position.

The rotatable head 308 (FIGURES 29 and 30) of the power wrench is shifted to its chuck closing or opening position by the hydraulic motor 333, previously described. Operation of this motor is controlled by the valve 546 which is shown in block form. Hydraulic pressure is supplied to the valve 546 by the conduit 636 and is exhausted from the valve by way of the exhaust conduits 637—637. The valve plunger (not shown) is shifted by the solenoid windings 547 and 548 to provide rotation of the motor in forward or reverse direction, thereby to engage or disengage the chuck. Hydraulic pressure is supplied and exhausted with respect to the motor 333 by way of the conduits 638 and 640 in response to energization of the windings 547 or 548. Line 640 includes a flow control valve 641 arranged to retard the speed of head rotation.

*Operation*

As noted earlier, the tool changing cycle, at least in part, takes place during a machining operation so as to set up the jig boring machine for the next successive operation with a minimum of machine idle time. A preferred sequence of operations of the present apparatus is disclosed graphically in FIGURE 72. The vertical lines 650 of the graph, which are numbered #1–#30, represent the steps in the sequence of operations provided by the control system 352 (in response to signals from the programming apparatus), which are executed during a given machining operation.

It will be recalled at this point, that the several components of the tool changing apparatus include limit switches which transmit feedback signals to the control system to monitor the movement of each component. The arrangement is such that the limit switches act as interlocks, requiring each step in the sequence to be completed before the next step can be initiated. The actual initiation of the steps is carried out by the control system 352. In the detailed description of the tool changing operation with reference to the chart (FIGURE 72), the operation of the limit switches has been omitted; however, it will be understood that the limit switches are tripped at the end of each step, which are indicated by the horizonal lines in the chart.

Generally speaking, the horizontal line 651, extending from step #17 to step #30, represents the beginning of a jig boring operation, while the horizontal line 652 (steps #1–#8) indicates the completion of that operation. It will be understood that no machining takes place during the machine cycle, as represented by the line 652 (steps #1–#8) during the initial cycle of operation after a new workpiece has been located on the table. However, after the initial cycle, the machining operations also take place during the tool changing steps #1–#8.

It is to be noted at this point, that during the machining cycle represented by horizontal line 651 (steps #17–#30) the saddle and table will have been positioned with respect to the axis of the spindle to locate the hole center with respect to the workpiece. Also, a new tool will have been transferred from the tool storage rack 6 to the spindle, as explained later. In addition, at step #17, the programming apparatus will have shifted the drill head vertically to accommodate for the plane of the workpiece; the tool length compensating apparatus (if necessary) will have shifted the spindle relative to the drill head to compensate for the length of the tool; and the transmission system will have been conditioned to provide the preselected spindle speed and spindle feed rates. These several machine functions are set up automatically by the programming apparatus, as disclosed in the aforesaid copending applications.

As shown by the chart, as the machine cycle (line 651) continues from step #17 to step #30, several tool changing functions are carried out, as explained later. At step #30 to step #1 the same machine cycle continues (line 652). However the start of a new tool changing cycle is initiated, as indicated by step #1 of the chart, while the machine cycle continues through steps #1–#8 (line 652).

Described in detail with reference to the chart, at the start of the tool changing cycle (steps #1–#2), the programming apparatus transmits a signal to the control system which causes the arm vertical shot bolt 88 (FIGURE 4) to be retracted to permit vertical arm motion (line 653). The system also causes the arm rotary shot bolts 55 and 56 (FIGURE 11) to be retracted to permit rotary column and arm motion (line 654). Thereafter, a signal is transmitted to energize the hydraulic motor 43 (FIGURE 11), causing the column and arm to be rotated from the waiting position D (FIGURE 45) to the position C to align the tool carrier 11 and jaw A radially with respect to a new tool to be withdrawn from the storage rack 6. It is to be noted that the arm is shifted at the rapid rate initially and at the slow positioning rate as the arm approaches the selected new tool (switches 76–81—FIGURE 18). This motion is indicated by the horizontal line 655.

Thereafter the arm elevating motors 87 (FIGURE 6) are energized in a direction to raise or lower the arm to the preselected tool level 7 in response to the tool selection signal. This action is indicated in the diagram by the line 656. The elevating motors 87 are energized by the control system in the proper direction to bring the arm to the preselected level. During this motion, the several limit switches 89 and 90 (FIGURE 2) are tripped by the cam collar 18 in sequence. It will be recalled that the arm elevating motors 87 are driven at the rapid rate during the initial portion of vertical arm motion and at the slow positioning rate as the arm approaches the preselected level 7 (switches 89 and 90).

When jaw A is aligned with the new tool, the arm vertical shot bolt 88 and the arm rotary shot bolts 55 and 56 are shifted outwardly to latch the arm in its selected radial and horizontal position, as indicated by the lines 657 and 658 in the chart.

During these several operations, the jaw A (FIGURES 44 and 45) remains in an open position, as indicated by the line 660 ready to engage the selected tool. The shot bolt 200 (FIGURE 8) which locks the jaw carrier 11 in the rotary position shown in FIGURE 45 also remains in its engaged position as indicated by the line 661.

Slightly beyond step #3, as indicated in the graph, the jaw carrier 11 is advanced longitudinally (FIGURE 47) to the tool pick-up position, as indicated by the line 662. Thereafter, starting at step #4, the jaw A is shifted to the closed position, to engage the new tool (line 663). With the tool gripped (starting at step #5) the jaw carrier 11 is retracted (FIGURE 48) as indicated by the line 664, thus withdrawing the new tool from its storage jaws 8. When the jaw carrier 11 is fully retracted, its limit switch signals the control system to retract the arm vertical shot bolt 88 (FIGURE 4), as indicated by the line 665 to condition the arm to be elevated. The carrier shot bolt 200 is also retracted at this point (line 666) to permit rotary arm motion as indicated by the arrows in FIGURE 49.

With the shot bolts 88 and 200 retracted (step #6), a signal is transmitted which causes the arm to be elevated to its reference position (FIGURE 50) at the top of the tool storage rack 6, as indicated by the line 667. Upon reaching this position, the top limit switch 89 (FIGURE 2) transmits a signal which causes the arm rotary shot bolts 55 and 56 to be retracted (line 668).

After the carrier shot bolt 200 is retracted (line 666—steps #5 and #6), the jaw carrier 11 is rotated through an arc of 90° (FIGURE 49) with the new tool clamped in jaw A. The carrier rotary motion takes place between steps #6 and #7, as indicated by the line 670 with the jaw carrier in its retracted position.

With the arm elevated and the jaw carrier rotated, as at step #7 (FIGURE 49), the arm vertical shot bolt 88 is shifted to its arm latching position (line 671). Thereafter, with the arm rotary shot bolts 55 and 56 in retracted position (line 668), the motor 43 (FIGURE 11) is energized to swing the arm from the storage rack 6 to the waiting position D as shown in FIGURE 45 (line 672).

The arm remains in the waiting position D until a signal is transmitted from the control system calling for a tool change, as indicated at step #8. At this point, the jaw carrier 11 will have been shifted from the retracted to the advanced position (FIGURES 51 and 53) as indicated by the line 673. It will also be observed that the carrier shot bolt 200 (FIGURE 8) will have been shifted to its engaged position, as indicated by the line 674.

As shown by the line 652, the previous machine cycle ends at step #8, assuming that the jig boring machine is ending a preceding cycle, with a previously selected tool mounted in the tool spindle. The spindle and other machine components remain stationary during the tool change cycle, as indicated by the steps #8 to #17, as described below.

Referring to the chart, the position of the drill head will be changed, as indicated by the line 675, when the control system calls for a tool change at step #8, if the plane of the work surface requires vertical readjustment of the head position. In addition, the rotary position of the spindle will be indexed or oriented (FIGURE 36), as indicated by the line 676. As noted earlier, the plunger 317 (FIGURE 36) engages the spindle notch so as to stop the spindle in a position whereby the driving lugs 314 are aligned with the slots or keyways 326 of the tool (FIGURE 27). Engagement of plunger 317 also lines up the flats of the spindle chuck 14 with the power wrench 15 (FIGURES 29 and 30).

Upon being shifted to the waiting position D, the cam sector 13 (FIGURES 2 and 3) of the arm is swung into alignment with the three limit switches 450, 451 and 452. As noted earlier, these switches transmit signals to the control system which control the vertical position of the arm 3 with reference to the tool spindle and drill head. In other words, the vertical switches 89 and 90 along the column regulate the position of the arm with reference to the tool rack levels with the three switches 450–452 inoperative due to the angular displacement of the cam sector 13. However, when the arm is shifted to the waiting position, the cam sector is brought automatically into working relationship with the vertical switches 450–452. In addition, the upper limit of motion of the arm with reference to the drill head is regulated by the limit switch 19 which is tripped by the element 20 carried by the drill head.

As described earlier, the radial positions of the arm during the tool changing operations are regulated by the commutator 72 (FIGURE 14) which is mounted at the base of the column. Briefly, as indicated in the electrical diagram (FIGURE 70), the control system energizes one of the sectors 73 of the commutator and also causes the hydraulic motor 43 (FIGURE 13) to be energized in a direction to rotate the column and arm toward the selected radial position, thus causing the brush 74 to traverse the commutator until the energized sector is contacted.

As noted earlier, the column 4 is also provided with the rotary limit switches 76–81 which are interconnected in the control system. The arrangement is such that the cams 84 trip the limit switches corresponding to the several positions of the arm as it is shifted radially relative to the spindle. Upon being tripped, the limit switches 76–81 transmit a feedback signal which causes the rotary shot bolts 55–56 to be shifted to column latching position. When the shot bolts 55–56 are engaged, the associated limit switches 64–65 (FIGURE 11) transmit a signal to the control system to initiate the next operation in the tool changing sequence.

As noted by the line 677, the arm vertical shot bolt 88 (FIGURE 4) is shifted to the disengaged position when the tool change signal is transmitted at step #8 of the diagram. After disengagement of shot bolt 88, the elevator motors 87 of the arm are energized to shift the arm 3 downwardly to a position below the plane of the drill, indicated by the line 678 (FIGURE 52). At this point, the arm is displaced outwardly from the drill head and spindle for clearance. As indicated by line 680, the arm rotary motor 43 is then energized to shift the arm radially to a position below the drill head and spindle (FIGURE 55) ready to remove the used tool from the spindle. In order to permit rotary arm motion, the arm rotary shot bolts 55–56 are retracted, as indicated by the line 681. In addition, the set of jaws B will have been shifted to the open position, as indicated by the line 682, in order to engage the used tool.

At step #11 (with the open jaw B of the carrier located beneath the spindle—FIGURE 55), the elevator motors 87 are energized at the feed rate to shift the arm upwardly until the switch actuating element 20 trips the limit switch 19, as indicated by the line 683 (FIGURE 56). At this point, the hydraulic cylinder 390 (FIGURES 29 and 30) is energized to shift the power wrench 15 from its retracted position to its chuck-engaging position (FIGURE 57) as indicated by the line 684. This brings the wrench head 308 into engagement with the rotary element of the chuck.

At this point in the cycle, the open jaws B are closed so as to engage the used tool 10 for removal from the spindle, as indicated at line 685. Thus, between steps #12 and #13, the jaws B are closed so as to engage the used tool in the chuck, while the wrench head engages the rotary chuck element 313. Thereafter, fluid pressure to be advanced to the motor 333 of wrench head 308, thus rotating the chuck element 313 in a direction to release the tool, as indicated by the line 686, which extends between steps #13 and #14 (FIGURE 30). The used tool is now ready to be withdrawn from the chuck 14 for replacement with the new one (FIGURE 57).

At step #14 the arm elevating motors 87 are energized to shift the arm and jaw carrier 11 downwardly at a feed rate, as indicated by the line 687 in the chart (FIGURE 58). It will be understood that, at this stage, the new tool is clamped in the jaws A and the chuck 14 is open to permit the used tool to be withdrawn. In the present disclosure, the arm and jaw carrier are shifted downwardly for a distance of 3½" (line 687), such that the upper end of the tool shank is spaced below the lower end of the chuck 14 for lateral transfer (FIGURE 58). At the same time (steps #14–#15), the shot bolt 200 of the jaw carrier 11 is retracted, as indicated by the line 688 so as to permit subsequent rotation of the jaw carrier.

At step #15, the cylinder 172 (FIGURE 4) of the jaw carrier 11 is energized so as to rotate the carrier in the clockwise direction through an arc of 180° (line 690) as shown in FIGURE 60. As noted above, the jaw carrier 11 previously was lowered to a plane below the spindle (line 687) to provide tool clearance. Upon being thus rotated, the jaw A, with the new tool 10 clamped therein, is brought into alignment with the spindle chuck 14, subsequently to be inserted into the chuck, which was previously shifted to the open position for withdrawal of the used tool. After the jaw carrier 11 has been indexed, the carrier shot bolt 300 (FIGURE 7) is shifted to its engaged position to lock the carrier in its new rotary position. This operation is indicated in the chart by the line 691.

After the jaw carrier 11 is latched, the arm elevating motors 87 are energized in a direction to elevate the arm and carrier 11 (with the new tool aligned with the axis of the spindle and chuck) causing the jaw A to insert the shank of the new tool into the open chuck (FIGURE 62). This operation is indicated in the chart by the line 692.

It will be observed, that power wrench 15 remains in its advanced position (FIGURE 60) after its wrench head has rotated the chuck element to its tool disengaging position, as noted earlier with reference to line 686. After the shank of the new tool has been inserted into the chuck as noted above (line 692), the hydraulic motor 333 of power wrench 15 is energized in a direction to rotate the chuck element to its tool-engaging position, as indicated in the chart by the line 693.

After this operation (step #16) the arm rotary shot bolts 55–56 (FIGURE 11) are retracted to permit column and arm rotation (line 694). At about the same time, the jaw A is shifted to the open position (line 695), so as to release the new tool, which is clamped in the chuck.

After the jaws A are opened (step #17), the elevator motors 87 are energized in a direction to lower the arm (with the jaws A open) to a position below the tool, as indicated by the line 696 (FIGURE 63). After the arm is lowered, the arm rotary indexing motor 43 is energized in a direction to swing the arm radially (line 697) in a clockwise direction to an intermediate position displaced from the spindle and drill head (FIGURE 64).

As the arm begins to swing radially from beneath the head, the control circuit causes the vertical arm shot bolt 88 (line 698) to be shifted to its retracted position. It will be understood, at this point, that it is necessary to shift the arm radially to the intermediate position (FIGURE 64) in order to permit the arm to be raised or lowered without interference with the drill head or storage rack.

Upon reaching the intermediate position (vertical shot bolt 88 retracted), the arm is elevated (FIGURE 66) as indicated by the line 700 on the chart. Upon reaching this level, the arm vertical shot bolt 88 is again engaged to lock the arm at the preselected level, as indicated by the line 701.

At about the same time, the carrier shot bolt 200 (FIGURE 7) is disengaged (line 702) to permit rotary carrier motion. It will also be noted that between the steps #17 and #18, the power wrench 15 will have been shifted back to its retracted position (FIGURE 64), as indicated by the line 703.

At step #18, with the arm in its intermediate position as noted earlier, the jaw carrier 11 is retracted (broken lines—FIGURE 64), as indicated by the line 704. Thereafter the arm is swung radially into a position in alignment with the designated tool retainer jaws 8 (FIGURE 67) as indicated by the line 705 of the chart. Upon reaching the selected radial position (with the arm vertical shot bolt 88 retracted), the arm is shifted vertically to the proper tool level 7 as indicated by the line 706. The arm vertical shot bolt 88 is now engaged to lock the arm at the selected elevation (line 707) and the arm rotary shot bolts 55–56 are also shifted into engagement, as indicated by the line 708.

The arm is now aligned with the proper set of tool retaining jaws 8 (FIGURE 67), with the carrier retracted. The carrier 11 is now rotated through 90° (line 710) to position the jaw B adjacent the retaining jaws 8 (FIGURE 68). Thereafter, the jaw carrier is shifted to its advanced position (FIGURE 69) as indicated by line 711 thereby to force the used tool into the retainer jaws 8. At this point, the jaw B is shifted to the open position, as indicated by the line 712, thereby to release the tool. It will be noted that the carrier shot bolt 200 will have been shifted to the engaged position during these operations (line 713) to lock the carrier in its indexed position. After the jaw B is opened, the carrier is shifted back to its retracted position as indicated, by the line 714, thus withdrawing the jaw B from the retaining jaws 8.

After the carrier 11 has thus been retracted, the carrier is rotated through an angle of 180° in the clockwise direction (FIGURE 68), as indicated by the line 715 ready to repeat the tool changing cycle. Thereafter, in response to the feedback signal from the jaw carrier, the memory data of the old tool (now returned to its jaws 8) is erased from the programming apparatus (line 716).

In order to save time, the programming apparatus includes two memory storage units, permitting the data for two machining operations to be stored. Upon completion of step #24, the system interconnects the alternate memory unit with the tool changing circuit, as indicated by the line 717. The alternate unit thereby transmits the data for the next tool change cycle while the data for a later tool change is being fed into the memory storage unit which has been cleared, as indicated previously by the line 716.

After this operation, the apparatus carries out steps #26–#30. These operations have been omitted since they are not pertinent to the present disclosure.

Upon completion of step #30, the tool changing apparatus starts a new cycle, as indicated by broken line 718, so as to repeat steps #1–#30. As noted earlier, the machining cycle, as indicated by the horizontal lines 651 and 652 continues without interruption as the tool changing apparatus begins the new cycle of operations.

Having described my invention I claim:

1. A tool changing apparatus for a machine tool having a tool spindle adapted to mount a series of interchangeable cutting tools, said tool changing apparatus comprising, a tool storage rack mounted in spaced relationship to spindle, said storage rack having a plurality of tool storage levels, each level adapted to releasably support a plurality of interchangeable cutting tools, said tools adapted to be mounted selectively in the said tool spindle, a tool changing arm, mounting means for said tool changing arm adapting the arm to be shifted in an arc between the said tool spindle and tool storage rack, said mounting means adapting the tool changing arm to be shifted in a second path parallel with the axis of the spindle and into alignment with selected levels of the tool storage rack, said tool changing arm adapted to engage and withdraw a selected cutting tool from a selected level of the tool storage rack, said arm thereafter adapted to shift through said arc from the storage rack to a position aligning the selected tool with the axis of the spindle and spaced outwardly therefrom, adapting the tool to be mounted in the spindle upon motion of the arm along the second path toward the spindle.

2. A tool changing apparatus as set forth in claim 1 in which there is provided a first power means adapted to shift said tool changing arm through said arc between the tool spindle and tool storage rack, and a second power means adapted to shift the tool changing arm along said second path parallel with the axis of the spindle and into alignment with the selected level of the tool storage rack, said second power means also adapted to shift the arm toward the spindle for mounting the selected tool therein after the first power means has shifted the arm through said arc from the storage rack into alignment with the axis of the spindle with the arm engaging a selected tool withdrawn from the storage rack.

3. A tool changing apparatus as set forth in claim 1 in which each level of the tool storage rack is provided with a plurality of pairs of tool retaining jaws, each adapted to releasably support an interchangeable cutting tool, adapting the arm to engage and withdraw a selected tool from a given pair of tool retaining jaws and to replace a used tool in a predetermined pair of jaws upon transfer of the used tool from the spindle.

4. A tool changing apparatus as set forth in claim 3 in which the said pairs of tool retaining jaws of each level of the storage rack are mounted in an arc corresponding to the arc of motion of the tool changing arm and spaced outwardly therefrom whereby the tool changing arm is adapted to swing through said arc and into a position adjacent a selected tool.

5. A tool changing apparatus for a machine tool having a tool spindle adapted to mount a series of interchangeable cutting tools, said tool changing apparatus comprising, a tool storage rack mounted in spaced relationship to said spindle, said tool storage rack having a plurality of tool storage levels, each of said levels adapted to releasably support a plurality of interchangeable cutting tools to be mounted selectively in said tool spindle, a base, a column rotatably mounted on said base, a tool changing arm mounted for axial motion along said column, said arm being keyed to said column, whereby rotary motion imparted to the column swings said arm in an arc between the tool spindle and tool storage rack, a first power means mounted in said base and connected to the column for imparting said rotary motion to the column and arm, a rack extending longitudinally of said column, a pinion rotatably journalled in the arm and meshing with said rack, and a second power means mounted in the arm and connected to said pinion for rotating the same, said second power means adapted to shift the arm along said column into alignment with a selected level of the tool storage rack, said first power means adapted to shift the column and the arm through said arc into alignment with a selected tool at said tool storage level, said arm adapted to engage and withdraw the selected tool from the storage rack, said first and second power means thereafter adapted to shift said arm from the storage rack to a position aligning the selected tool with the axis of the spindle and spaced outwardly therefrom, adapting the tool to be mounted in the spindle upon motion of the arm along the column toward the spindle with the selected tool ailgned with the axis of the spindle.

6. A tool changing apparatus as set forth in claim 5 in which the lower end portion of the column includes an indexing plate including a plurality of sockets, and a shot bolt mounted in the base and engageable with the sockets of the indexing plate, said sockets adapted to locate the column and the arm in said arc of motion adjacent a selected cutting tool of the tool storage rack upon engagement of one of said sockets by said shot bolt, at least one of said sockets being adapted to locate the column and arm in a position aligning the selected tool with the axis of the spindle after the arm is shifted through said arc toward the spindle with the selected tool engaged in the arm.

7. A tool changing apparatus as set forth in claim 6 including power means adapted to shift the shot bolt to a retracted position during the rotary motion of the column and arm, and to shift the shot bolt to an extended position into engagement with a socket of the indexing plate when the arm is shifted through said arc adjacent a selected tool of the storage rack or into said position aligning the selected tool with the axis of the spindle.

8. A tool changing apparatus as set forth in claim 5 in which there is provided a commutator ring concentric with the column and including electrical contact sectors, a brush adapted to traverse the contact sectors, said commutator ring and brush being mounted relative to the base and column, whereby the rotary motion of the column and arm causes relative motion between the brush and contact sectors, said contact sectors corresponding to the radial positions of the interchangeable cutting tools supported by the levels of the tool storage rack and adapted to control the rotary motion of the column and arm, thereby to locate the arm in said arc of motion in a position adjacent the selected tool of the tool storage rack.

9. A tool changing apparatus as set forth in claim 5 in which there is provided a commutator ring mounted in the base in a position concentric with the column and including electrical contact sectors, a brush mounted on the column, whereby the rotary motion of the column and arm shifts the brush relative to the contact sectors, said contact sectors corresponding to the radial positions of the interchangeable cutting tools supported by the levels of the tool storage rack, and an electrical control system interconnected with the said contact sectors and brush, said control system adapted to control the first power means and rotary motion of the column and arm, thereby to locate the arm in said arc of motion in a position adjacent the selected tool of the tool storage rack.

10. A tool changing apparatus as set forth in claim 6 in which there is provided a plurality of electrical control switches mounted relative to the column, a cam element, said switches and cam element being movable relative to one another during rotary motion of the column and arm, an electrical control system interconnected with said switches, said electrical control system adapted to control the first power means of the base for imparting rotary motion to the column and arm, said electrical switches adapted to locate the arm in its radial position with respect to the spindle during the tool changing cycle.

11. A tool changing apparatus as set forth in claim 6 in which there is provided a plurality of electrical control switches mounted relative to the column, a cam element, said switches and cam element being movable relative to one another during rotary motion of the column and arm, an electrical control system interconnected with said switches, said electrical control system adapted to control the first power means of the base for imparting rotary motion to the column and arm, said electrical switches adapted to locate the arm in its radial position with respect to the spindle during the tool changing cycle, said switches adapted to cause the electrical control system to shift the shot bolt into a extended position into engagement with a socket of the indexing plate after the column and arm is rotated into a position relative to the spindle.

12. A tool changing apparatus as set forth in claim 5 in which the arm is provided with a shot bolt, said shot bolt normally residing in a retracted position, adapting said second power means to shift the arm along the column into alignment with a selected level of the tool storage rack, said shot bolt adapted to be shifted to an extended position into engagement with the rack, thereby to latch the arm relative to the column adjacent a selected level of the tool storage rack.

13. A tool changing apparatus as set forth in claim 12 in which the arm is provided with power means connected to the shot bolt for shifting the same to an extended position into engagement with the rack of the column, and a control system adapted to energize said second power means for shifting the arm along the column into alignment with a selected tool storage level, said control system adapted to energize the power means of the shot bolt when the arm is aligned with the selected tool level, thereby to shift the shot bolt into engagement with the rack of the column to latch the arm to the column at said selected level of the tool storage rack.

14. A tool changing apparatus as set forth in claim 5 in which there is provided a plurality of electrical control switches mounted in spaced relationship to one another along the column, said switches associated with the individual levels of the tool rack, a cam element mounted on the arm and adapted to trip said switches successively during motion of the arm along the column by said second power means, and a control system interconnected with said switches and adapted to deenergize the second power means when the arm is shifted into alignment with a selected level of the tool storage rack.

15. A tool changing apparatus for a machine tool having a machine column, a drill head slidably mounted on the column, power means for shifting the drill head relative to the column, and a tool spindle mounted in said drill head and adapted to mount a series of interchangeable cutting tools, said tool changing apparatus comprising, a tool storage rack mounted in spaced relationship to said drill head, said tool storage rack and adapted to releasably support a plurality of interchangeable cutting tools to be mounted selectively in said tool spindle, a tool changing column, a tool changing arm mounted for axial motion along said column, said arm adapted to swing in an arc between the spindle and tool storage rack, a first power means adapted to impart said arcuate motion to the arm, a second power means adapted to shift the arm along the tool changing column, said first and second power means adapted to shift the arm relative to a selected tool, said arm adapted to engage and withdraw the selected tool from the rack, a plurality of level sensing switches mounted on said drill head in spaced relationship to one another and moveable with the head, cam means on said arm adapted to trip said level sensing switches, said first power means adapted to swing said column and arm through said arc from said tool storage rack with a selected cutting tool carried by said arm to a position aligning said tool with the axis of the spindle and spaced outwardly therefrom, said second power means adapted to shift the arm and the selected tool along the tool changing column toward the spindle, thereby to mount the selected tool in the spindle, said sensing switches of the drill head adapted to be tripped by said cam means and to deenergize the second power means and stop the arm after the selected tool is mounted in the spindle, said level sensing switches adapted to stop said arm at a predetermined position relative to the drill head independently of the position of the drill head along the machine column.

16. A tool changing apparatus as set forth in claim 15 in which the cam means which trips the level sensing switches of the drill head is in the form of a sector, said sector being inoperative with respect to the level sensing switches when the arm is swung to its selecting position with references to the tool rack and being effective to trip the level sensing switches when the arm is shifted through its arc from the tool rack toward the spindle.

17. A tool changing apparatus as set forth in claim 15 in which the drill head is provided with a final limit switch and in which the tool changing arm includes means for tripping the final limit switch upon motion of the arm toward the spindle to its final limit, said final limit switch adapted to deenergize said second power means, thereby to stop the arm below the drill head with the tool mounted in the spindle.

18. In a machine tool having an operating station that receives tools for performing work operations;
   a frame;
   tool storage means mounted on said frame and removably carring a plurality of tools for use in the operating station;
   a carrier mounted on said frame for pivotal movement; and
   a tool change arm supported by said carrier for rotation about an axis that is parallel to the pivotal axis of said carrier, said tool change arm being shifted by the pivotal movement of said carrier between a parked position and an operating position with the rotary movement of said tool change arm while in the operating position serving to transfer tools between the operating station and said storage means to effect a tool change at the operating station.

19. In a machine tool having a rotatable tool spindle that receives tools for performing work operations, tool storage means removably carrying a plurality of tools for use in said tool spindle, a first pivot arm, means pivotally mounting said first pivot arm for pivotal movement about a first axis, a second pivot arm, means pivotally mounting the second arm upon the first arm with the center section of said second arm rotatable about a second axis adjacent to the free end of said first arm, the pivotal axis of said second arm being parallel to the pivotal axis of said first arm, said second arm having tool engaging members respectively disposed at the ends thereof, power means for pivotally shifting said first arm to a position wherein said second axis is disposed relative to said tool spindle, whereby rotation of said second arm is effective to sequentially position each of said tool engaging members in axial alignment with said spindle.

20. In a machine tool having a rotatable tool spindle that receives tools for performing work operations, tool storage means removably carrying a plurality of tools for use in said tool spindle, a first pivot arm, means pivotally mounting said first pivot arm for pivotal movement about a first axis, a second pivot arm, means pivotally mounting the second arm upon the first arm with the center section of said second arm rotatable about a second axis adjacent to the free end of said first arm, the pivotal axis of said second arm being parallel to the pivotal axis of said first arm, said second arm having tool engaging members respectively disposed at the ends thereof, power means for pivotally shifting said first arm to an operating position relative to said tool storage means, and power means for rotating said second pivot arm into a position in which a selected one of the tool engaging members thereof is aligned with a selected tool in said tool storage means.

21. In a machine tool having a rotatable tool spindle that receives tools for performing work operations, tool storage means removably carrying a plurality of tools for use in said tool spindle, a first pivot arm, means pivotally mounting said first pivot arm for pivotal movement about a first axis and for movement longitudinally of said first axis, a second pivot arm, means pivotally mounting the second arm upon the first arm with the center section of said second arm rotatable about a second axis adjacent to the free end of said first arm, the pivotal axis of said second arm being parallel to the pivotal axis of said first arm, said second arm having tool engaging members respectively disposed at the ends thereof, power means for pivotally shifting said first arm to an operating position relative to said tool storage means, and power means for rotating said second pivot arm relative to the first arm.

References Cited

UNITED STATES PATENTS

| | | | |
|---|---|---|---|
| 2,782,689 | 2/1957 | Carlsen | 29—26 |
| 2,901,927 | 9/1959 | Morgan | 29—26 |
| 3,007,097 | 10/1961 | Shelly | 29—26 |
| 3,052,011 | 9/1962 | Brainard | 29—26 |
| 3,099,873 | 8/1963 | Brainard | 29—26 |

RICHARD H. EANES, JR, *Primary Examiner.*

WHITMORE A. WILTZ, *Examiner.*